(12) United States Patent
Faggion

(10) Patent No.: US 7,714,865 B2
(45) Date of Patent: May 11, 2010

(54) COMPOSITING LIST CACHING FOR A RASTER IMAGE PROCESSOR

(75) Inventor: Paul Faggion, Carlton (AU)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 11/070,202

(22) Filed: Mar. 3, 2005

(65) Prior Publication Data

US 2005/0200867 A1 Sep. 15, 2005

(30) Foreign Application Priority Data

Mar. 9, 2004 (AU) ............................... 2004901221

(51) Int. Cl.
*G06T 11/20* (2006.01)
(52) U.S. Cl. ................................................... 345/441
(58) Field of Classification Search ................. 345/441
See application file for complete search history.

(56) References Cited

U.S. PATENT DOCUMENTS

| | | | | | |
|---|---|---|---|---|---|
| 4,783,834 | A | * | 11/1988 | Anderson et al. | 382/245 |
| 4,967,392 | A | * | 10/1990 | Werner et al. | 345/505 |
| 5,517,603 | A | * | 5/1996 | Kelley et al. | 345/426 |
| 6,326,964 | B1 | * | 12/2001 | Snyder et al. | 345/419 |
| 6,456,284 | B1 | * | 9/2002 | Lewis et al. | 345/421 |
| 6,762,756 | B2 | * | 7/2004 | Lewis et al. | 345/419 |
| 6,828,985 | B1 | * | 12/2004 | Long et al. | 345/620 |
| 2003/0006983 | A1 | * | 1/2003 | Lewis et al. | 345/419 |
| 2004/0217962 | A1 | * | 11/2004 | Lewis et al. | 345/506 |
| 2005/0017984 | A1 | * | 1/2005 | Lawther et al. | 345/589 |
| 2005/0200867 | A1 | * | 9/2005 | Faggion | 358/1.9 |
| 2006/0114263 | A1 | * | 6/2006 | Moore | 345/592 |

FOREIGN PATENT DOCUMENTS

WO WO 2004/114223 A1 12/2004

OTHER PUBLICATIONS

Michael Abrash's Ramblings in Realtime, Blue's news Apr. 24, 2000.*
Scanline surfacing: building separating surfaces from planar contours Weinstein, D.; Visualization 2000. Proceedings 13-13 Oct. 2000 pp. 283-289.*
T. Porter, et al., "Compositing Digital Images", Computer Graphics, vol. 18, No. 3, pp. 253-259 (Jul. 1984).

* cited by examiner

*Primary Examiner*—Javid A Amini
(74) *Attorney, Agent, or Firm*—Fitzpatrick, Cella, Harper & Scinto

(57) ABSTRACT

A method of rendering an image one or more pixels at a time in scanline order, wherein the image includes objects described by one or more levels, includes the steps of identifying at least one edge of the objects, with the at least one edge intersecting a first scanline, and building a compositing list for at least one identified edge. The compositing list includes levels that are activated on the first scanline at the identified edge and that contribute to at least one pixel on the first scanline in the rendered image. Additional steps include caching one or more of the compositing lists, wherein each cached compositing list is associated with a corresponding edge, checking, for a current edge intersecting a second scanline subsequent to the first scanline, whether the cached compositing list associated with the current edge is valid for the current edge on the second scanline, retrieving the cached compositing list if the checking step indicates that the cached compositing list is valid, and rendering one or more pixels on the second scanline using the retrieved compositing list.

21 Claims, 44 Drawing Sheets

| Edge 84 | Edge 92 |
|---|---|
| X=10 | X=40 |
| NY = 70 | NY =70 |
| DX = 1 | DX = 0 |
| DDX = 0 | DDX = 0 |
| P = 1 | P = 0 |
| u = (-1) | u = (+1) |
| Addr = Irrelevant in this example | Addr = Irrelevant in this example |

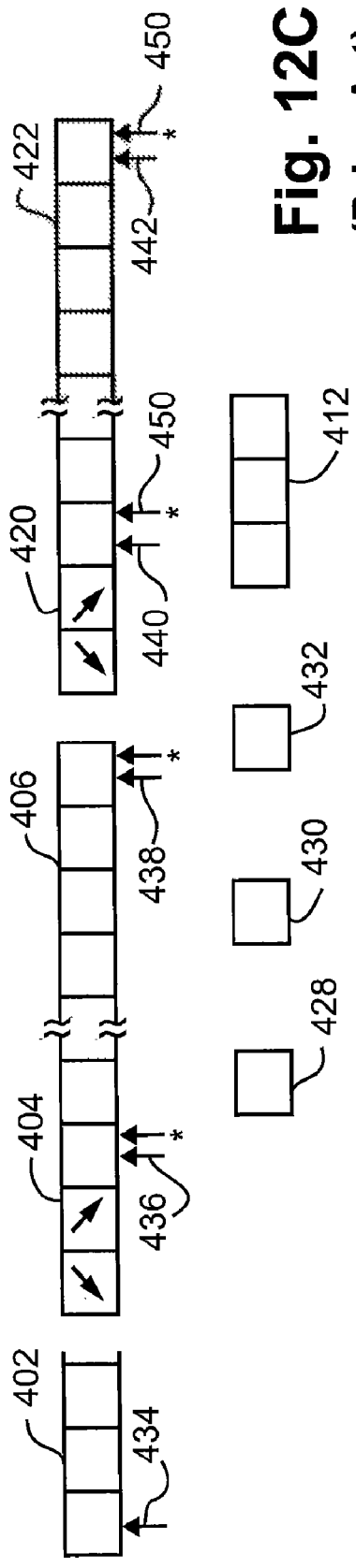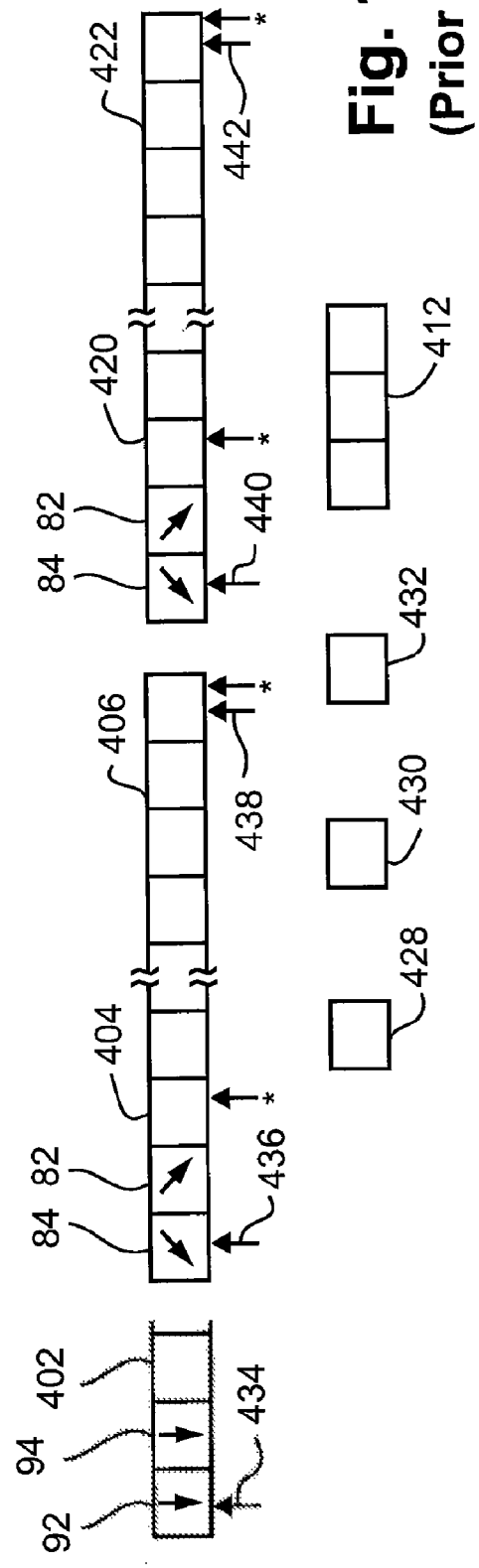
Fig. 12C (Prior Art)
Fig. 12D (Prior Art)

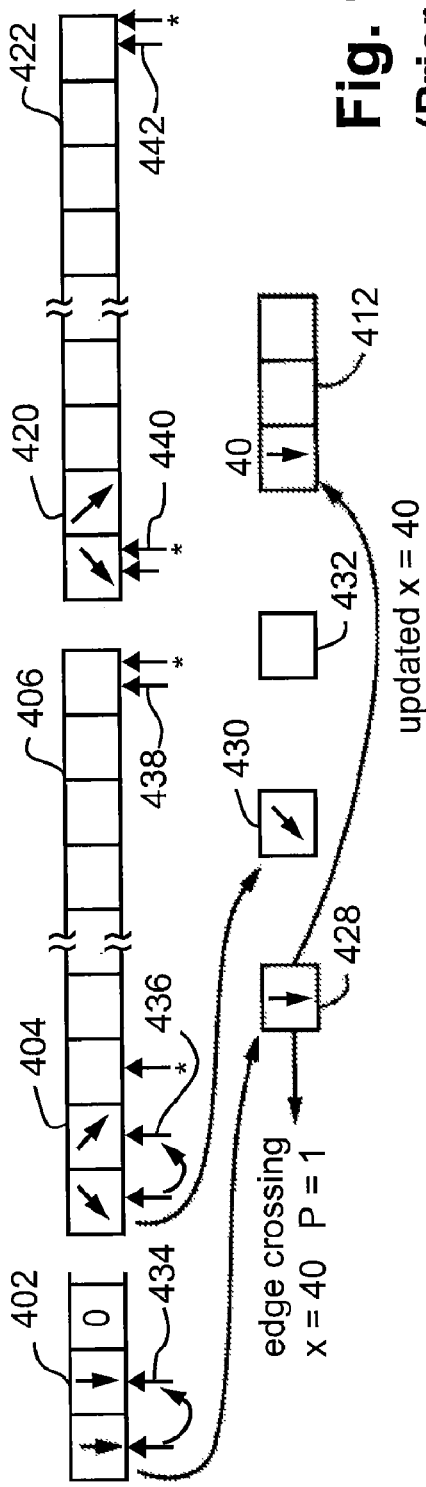
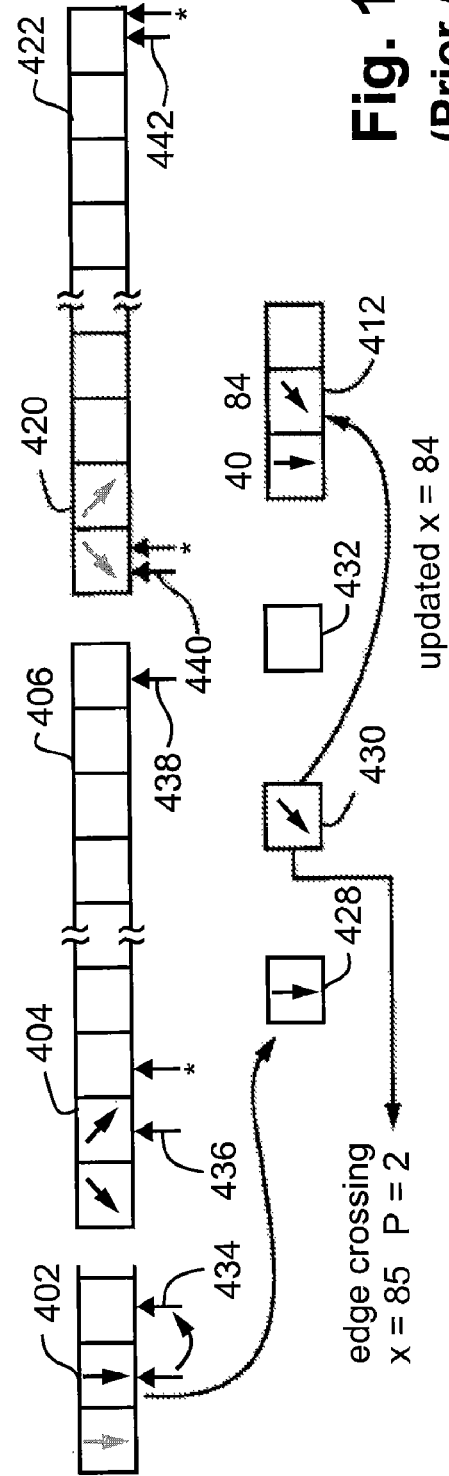
Fig. 12E (Prior Art)
Fig. 12F (Prior Art)

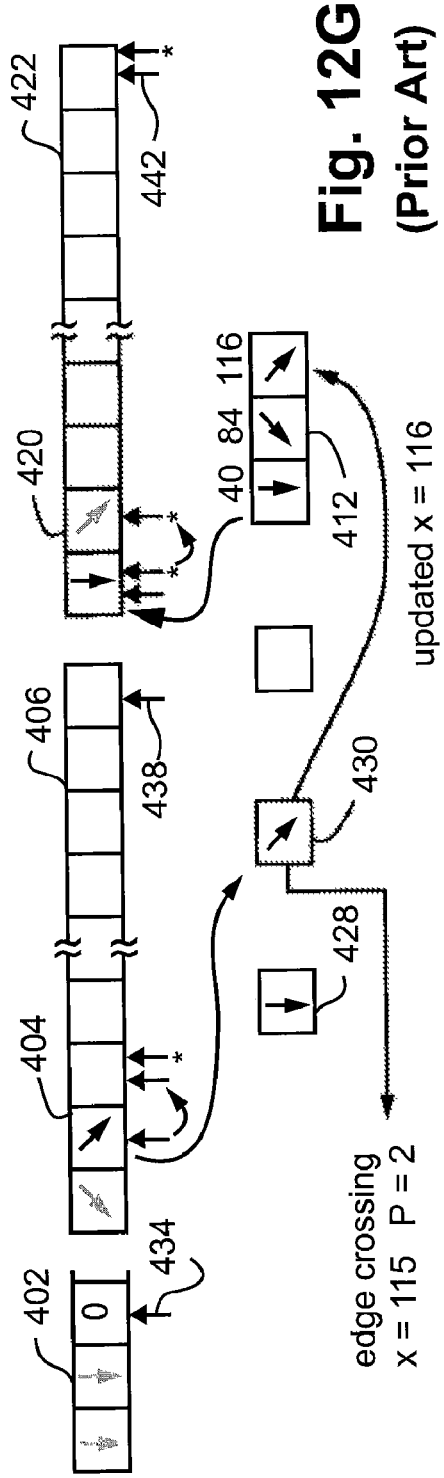
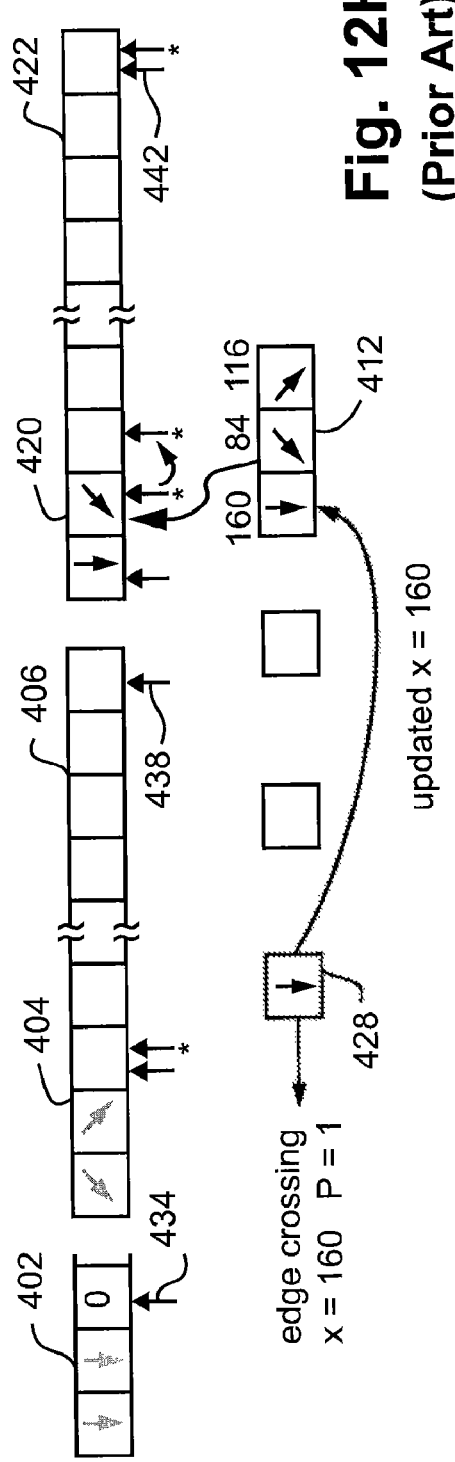

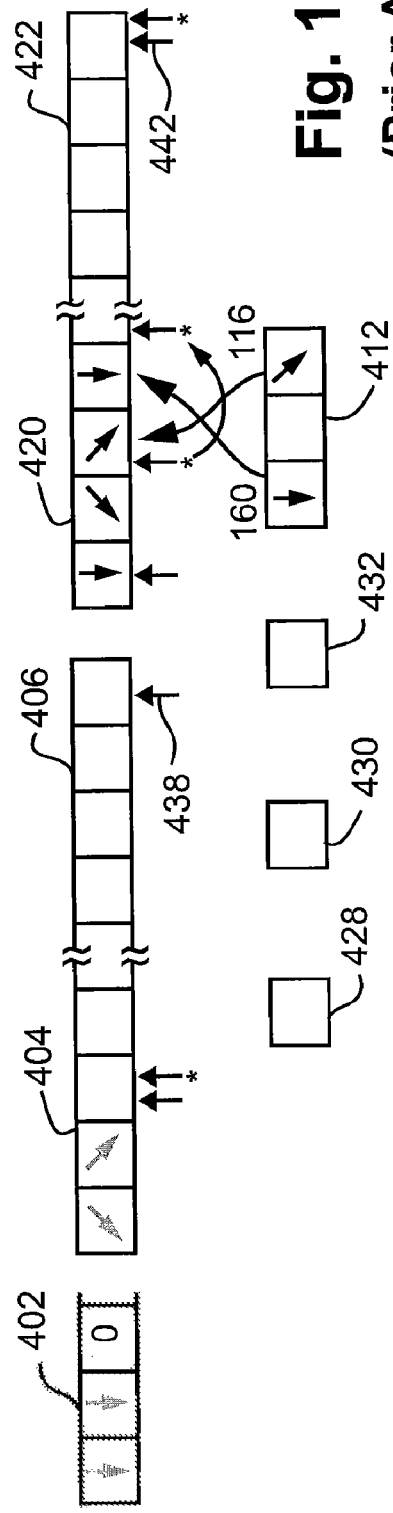
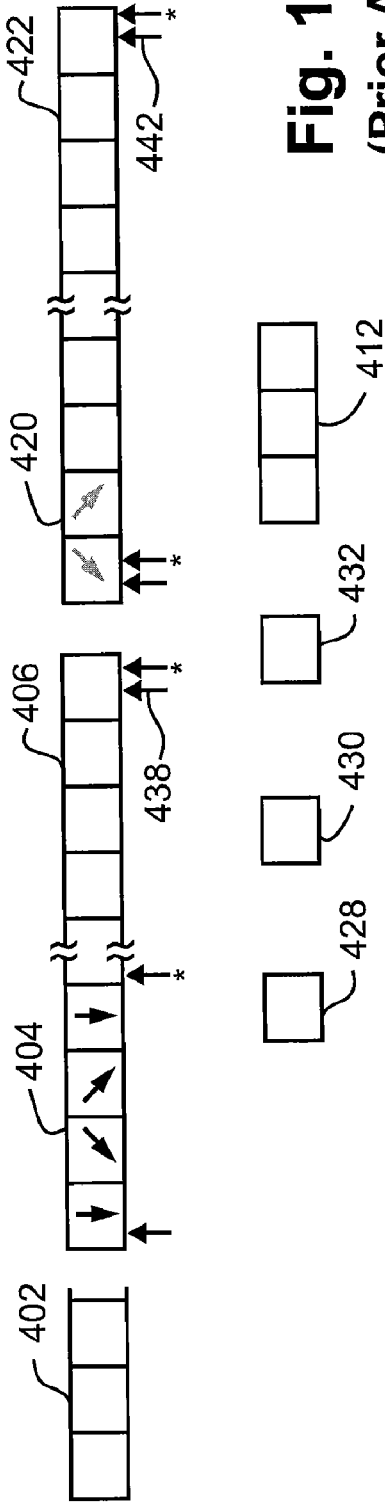
Fig. 12I (Prior Art)
Fig. 12J (Prior Art)

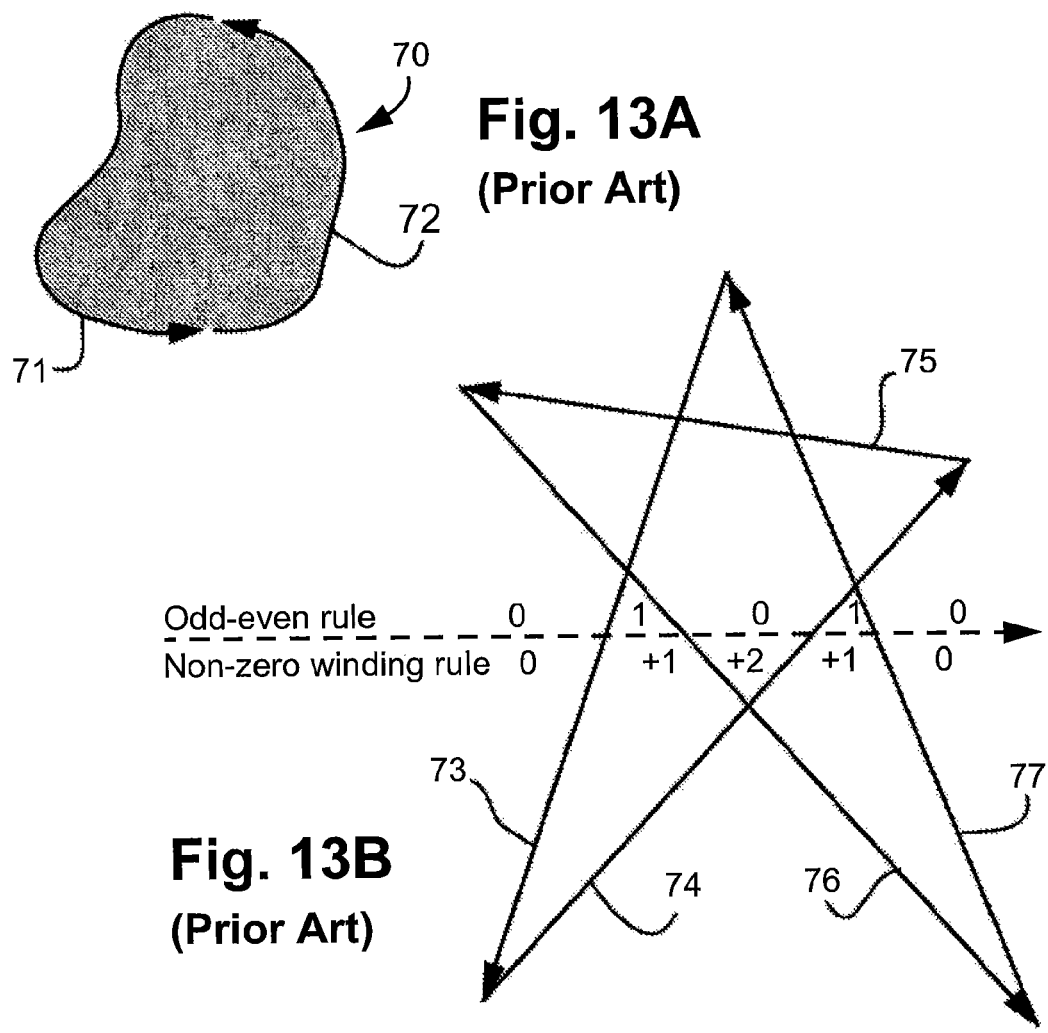
Fig. 13A (Prior Art)
Fig. 13B (Prior Art)
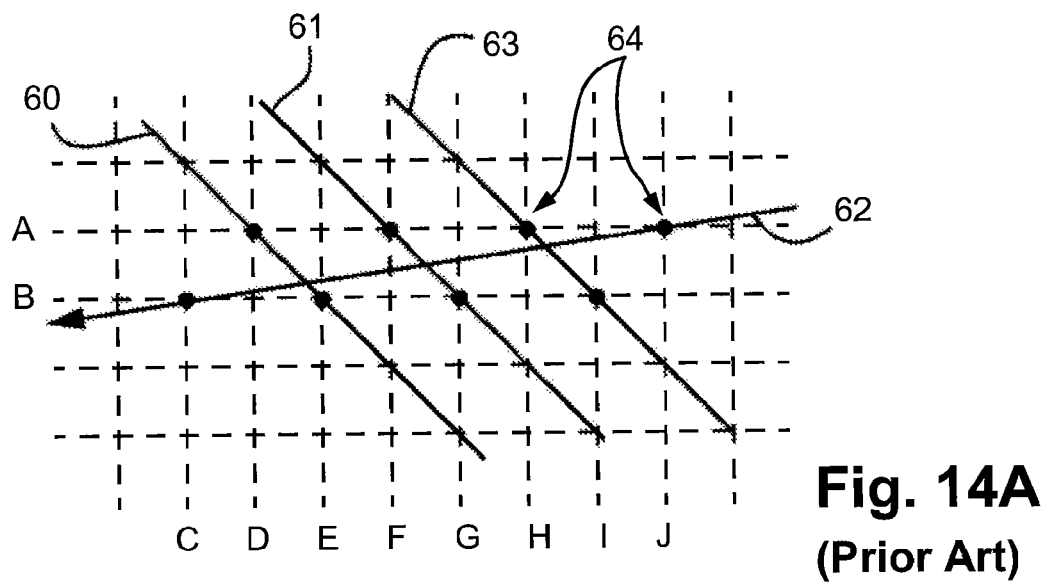
Fig. 14A (Prior Art)

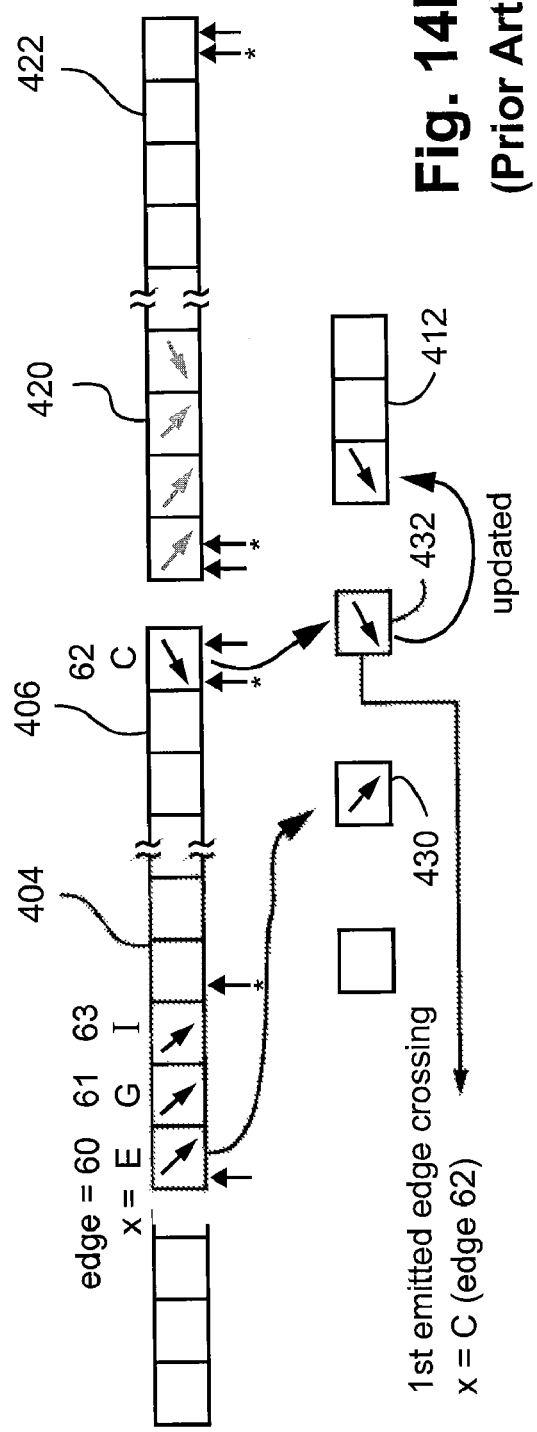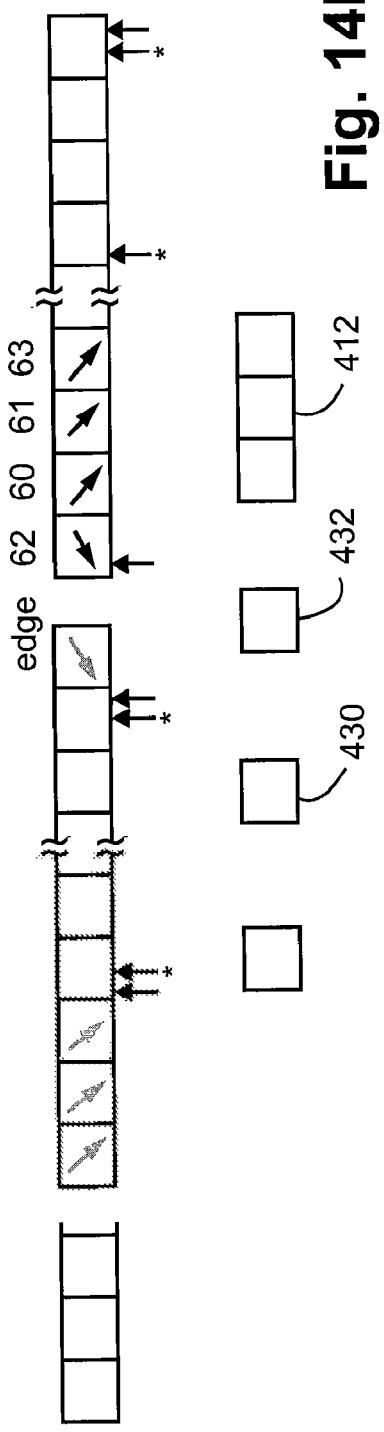

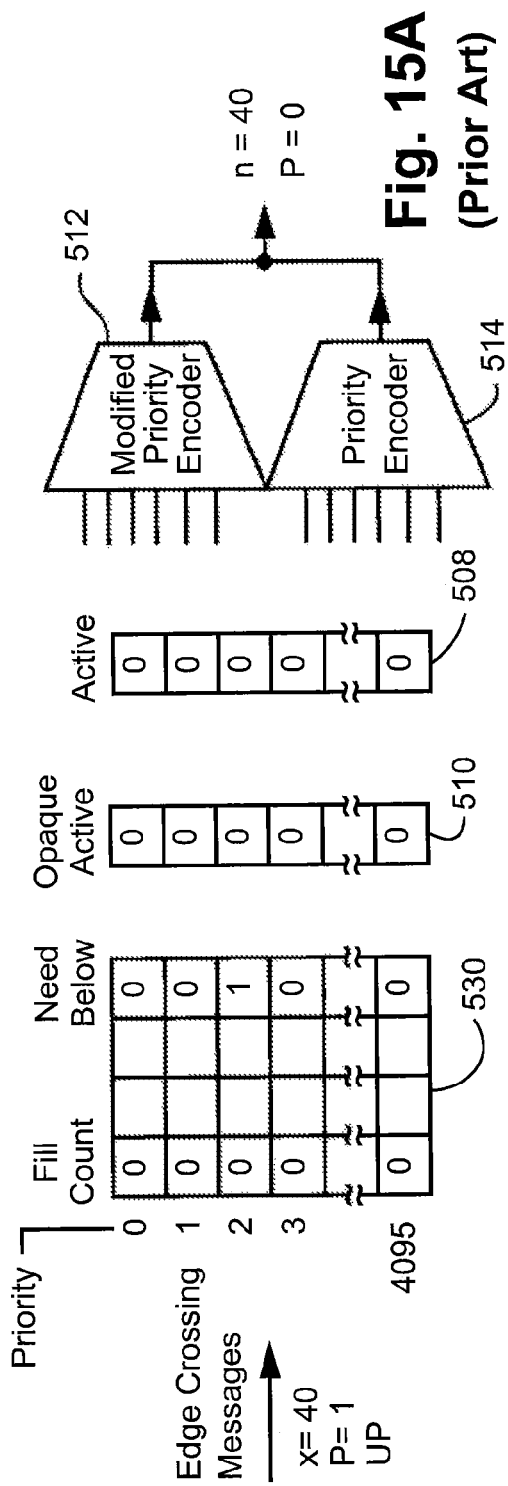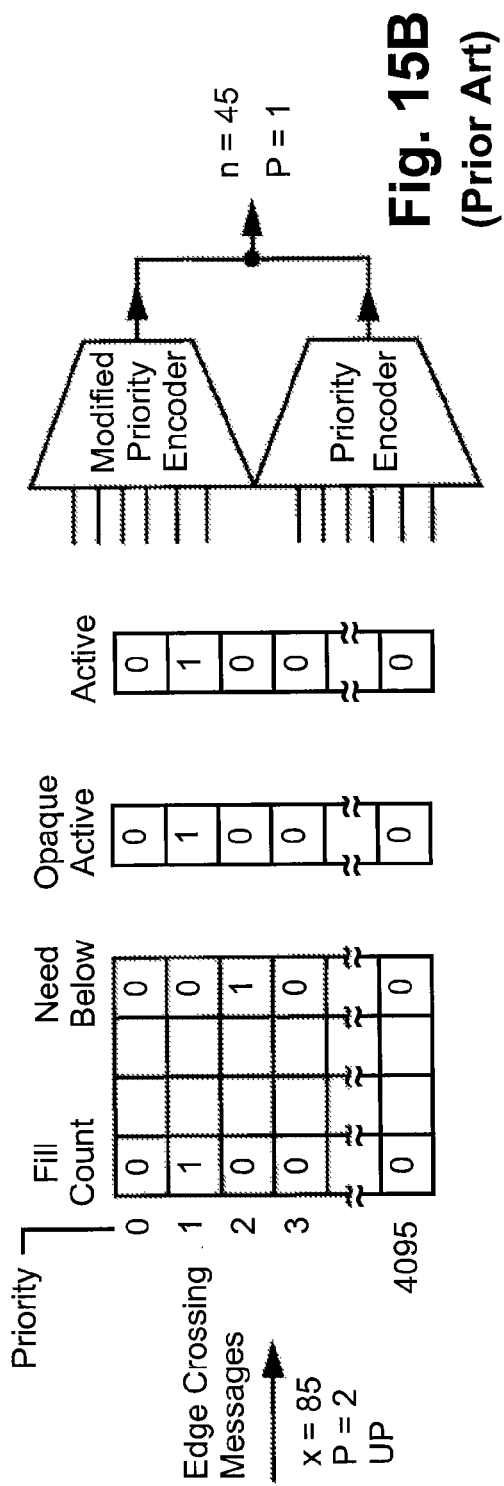

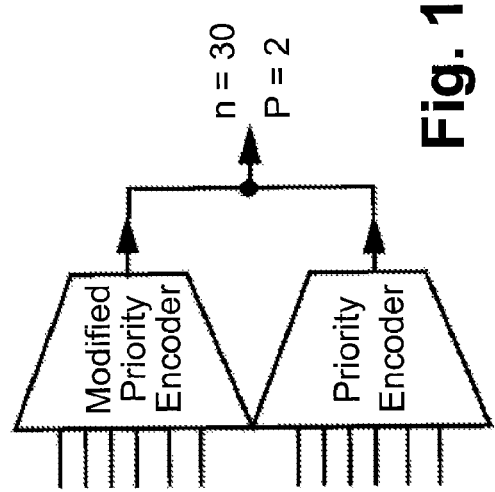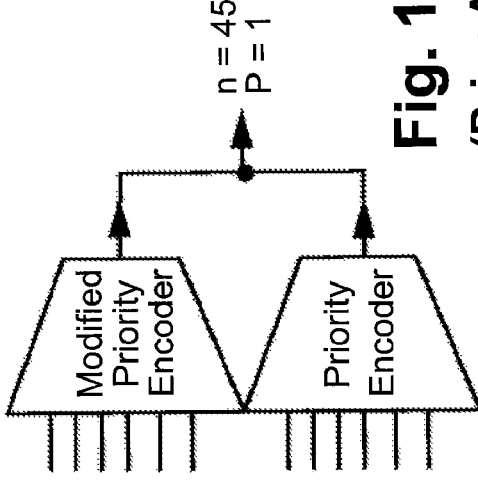
Fig. 15C (Prior Art)
Fig. 15D (Prior Art)
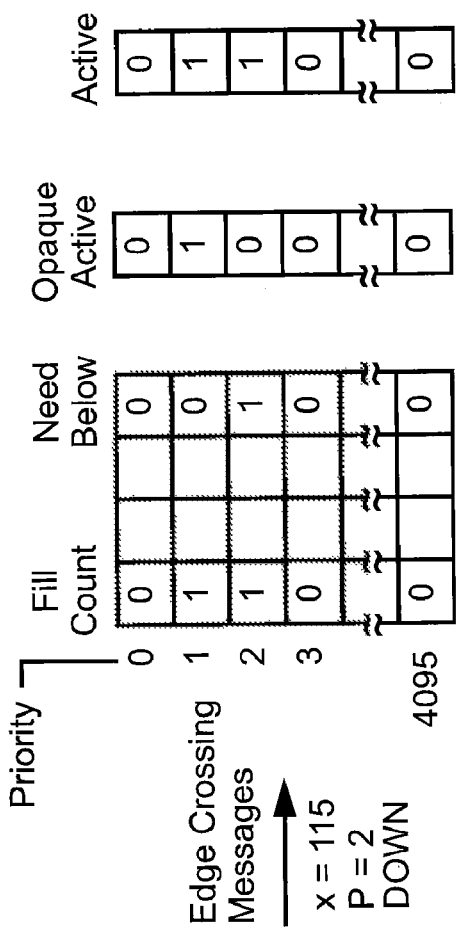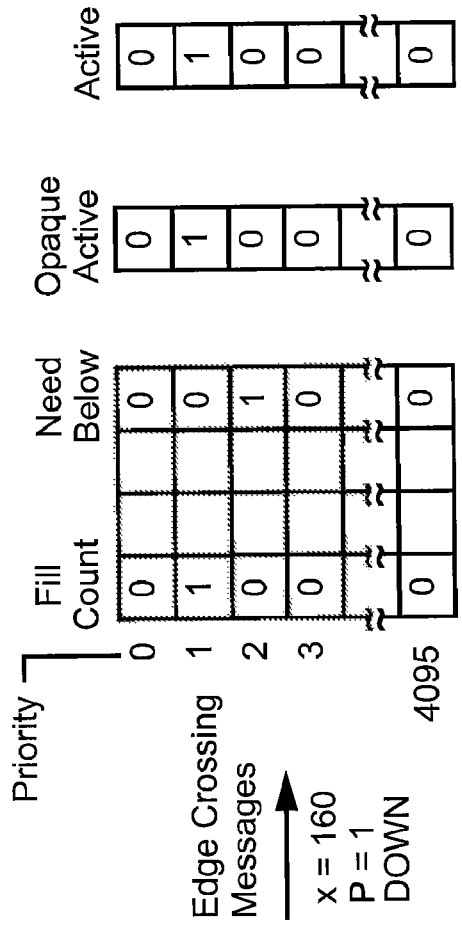

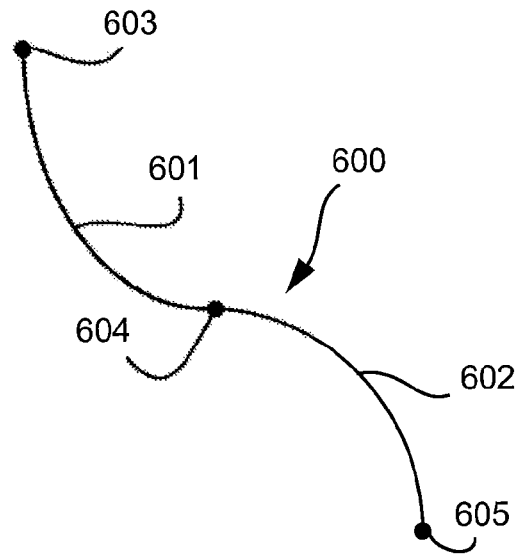
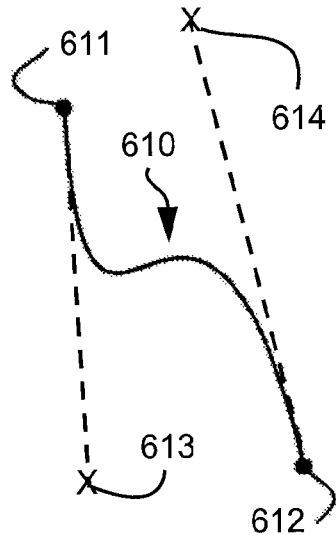
Fig. 16A
(Prior Art)
Fig. 16B
(Prior Art)
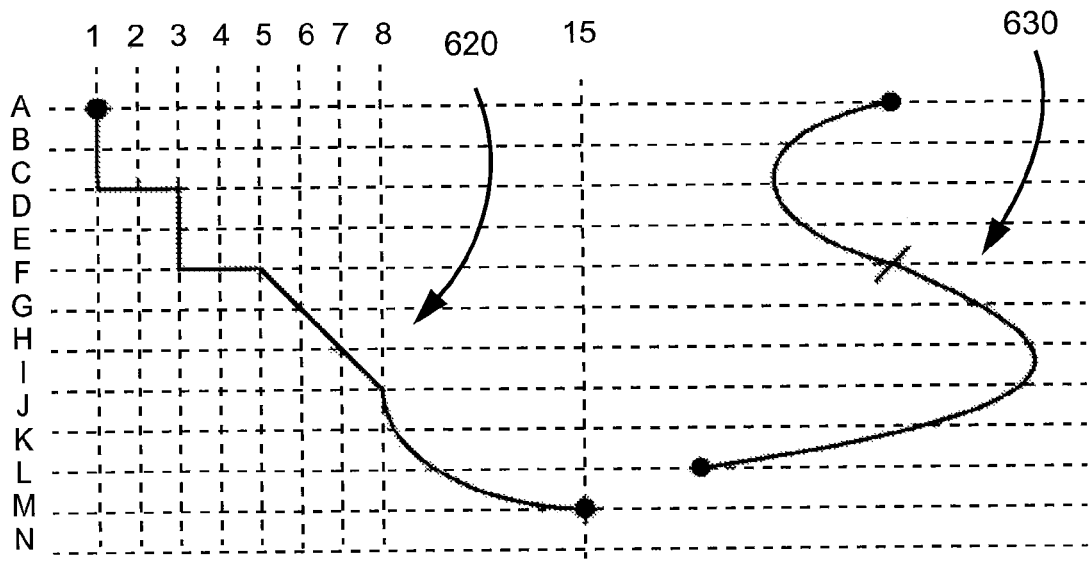
Fig. 16C
(Prior Art)
Fig. 16D
(Prior Art)

Fig. 18

| FILL COUNT | CLIP COUNT | FILL TYPE | CLIPPER | CLIP_OUT | NEED_BELOW | X_INDEPENDENT | STACK_OP | USE_D_OUT_S | USE_S_OUT_D | USE_S_ROP_D | COLOR_OP | FILL_RULE_IS_ODD_EVEN | ATTRIBUTES | FILL INDEX |
|---|---|---|---|---|---|---|---|---|---|---|---|---|---|---|
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |
| | | | | | | | | | | | | | | • |

| Raster operation code | Operation | Operation Name |
|---|---|---|
| 0x00 | r = 0 | LCO_BLACK |
| 0x01 | r = src & dest | LCO_MASKPEN |
| 0x02 | r = src & ~dest | LCO_MASKPENNOT |
| 0x03 | r = src | LCO_COPYPEN |
| 0x04 | r = ~src & dest | LCO_MASKNOTPEN |
| 0x05 | r = dest | LCO_NOP |
| 0x06 | r = src ^ dest | LCO_XORPEN |
| 0x07 | r = src \| dest | LCO_MERGEPEN |
| 0x08 | r = ~(src \| dest) | LCO_NOTMERGEPEN |
| 0x09 | r = ~(src ^ dest) | LCO_NOTXORPEN |
| 0x0a | r = ~dest | LCO_NOT |
| 0x0b | r = src \| ~dest | LCO_MERGEPENNOT |
| 0x0c | r = ~src | LCO_NOTCOPYPEN |
| 0x0d | r = ~src \| dest | LCO_MERGENOTPEN |
| 0x0e | r = ~(src & dest) | LCO_NOTMASKPEN |
| 0x0f | r = 0xff | LCO_WHITE |
| 0x10 | r = min(src, dest) | LCO_MIN |
| 0x11 | r = max(src, dest) | LCO_MAX |
| 0x12 | r = clamp(src + dest) | LCO_PLUS |
| 0x13 | r = src | LCO_COPYPEN_PREMULTIPLIED |
| 0x14 | r = clamp(src - dest) | LCO_SRC_MINUS_DEST |
| 0x15 | r = dest | LCO_NOP_PREMULTIPLIED |
| 0x16 | r = clamp(dest - src) | LCO_DEST_MINUS_SRC |
| 0x17 | r = clamp(src + dest) where dest is signed | LCO_PLUS_SIGNED_DEST |
| 0x18 | r = threshold(dest, src) | LCO_THRESH_DEST_SRC |
| 0x19 | r = threshold(src, dest) | LCO_THRESH_SRC_DEST |
| 0x1a | r = ~dest | LCO_NOT_DATTR |
| 0x1b | o = luminance(dest; src) | LCO_LUMINANCE |
| 0x1c | r = ~src | LCO_NOTCOPYPEN_SATTR |
| 0x1d | o = ckey(dest; src+/-o) | LCO_CKEY |

Fig. 20A

| Operator | COLOR_OP | ALPHA_OP Flags Set | Diagram |
|---|---|---|---|
| clear | not used | none | 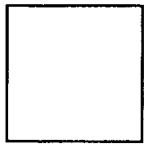 |
| src | LCO_COPYPEN | LAO_USE_S_ROP_D<br>LAO_USE_S_OUT_D | 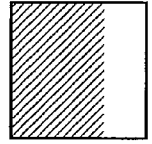 |
| dest | LCO_NOP | LAO_USE_S_ROP_D<br>LAO_USE_D_OUT_S | 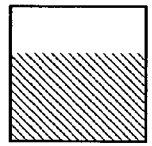 |
| src over dest | LCO_COPYPEN | LAO_USE_S_ROP_D<br>LAO_USE_S_OUT_D<br>LAO_USE_D_OUT_S | 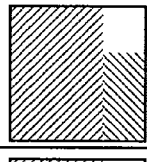 |
| src rover dest<br>(dest over src) | LCO_NOP | LAO_USE_S_ROP_D<br>LAO_USE_S_OUT_D<br>LAO_USE_D_OUT_S | 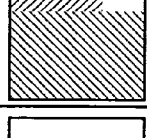 |
| src in dest | LCO_COPYPEN | LAO_USE_S_ROP_D | 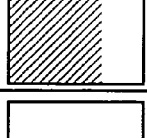 |
| src rin dest<br>(dest in src) | LCO_NOP | LAO_USE_S_ROP_D | 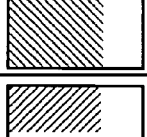 |
| src out dest | not used | LAO_USE_S_OUT_D | 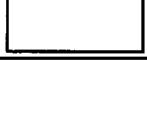 |

Fig. 20B
| Operator | COLOR_OP | ALPHA_OP Flags Set | Diagram |
|---|---|---|---|
| src rout dest (dest out src) | not used | LAO_USE_D_OUT_S |  |
| src atop dest | LCO_COPYPEN | LAO_USE_S_ROP_D LAO_USE_D_OUT_S |  |
| src ratop dest (dest atop src) | LCO_NOP | LAO_USE_S_ROP_D LAO_USE_S_OUT_D | 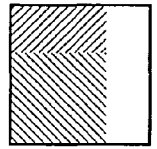 |
| src xor dest | not used | LAO_USE_S_OUT_D LAO_USE_D_OUT_S |  |

COMPOSITING LIST CACHING FOR A RASTER IMAGE PROCESSOR

FIELD OF THE INVENTION

The present invention relates generally to rendering graphic object-based images. In particular, the present invention relates to the calculation of active levels in pixel-sequential rendering.

BACKGROUND

When a computer application provides data to a device for printing and/or display, an intermediate description of the page is often given to the device driver software in a page description language, such as PostScript™ or PCL, which provide descriptions of the objects to be rendered onto the page, rather than a raster image of the page to be printed. Equivalently, a set of descriptions of graphics objects may be provided in function calls to a graphics interface, such as the Graphics Device Interface (GDI) in the Microsoft Windows™ operating system, or the X-11 in the UniX™ operating system. The page is typically rendered for printing and/or display by an object-based graphics system (or Raster Image Processor).

Most of these object based graphics systems utilize a large area of memory, known to the art as a framestore or a page buffer, to hold a pixel-based image of the page or screen for subsequent printing and/or display. Typically, the outlines of the graphic objects are calculated, filled and written into the framestore in sequence. For two-dimensional graphics, objects that appear in front of other objects are simply written into the framestore after the background objects, thereby replacing the background on a pixel by pixel basis. Higher priority graphic objects take precedence because they are drawn later than those of lower priority. This is commonly known to the art as "Painter's algorithm". Objects are passed down through the graphics device interface in priority order, from the rearmost object to the foremost object. The rearmost object has the lowest priority (or z-order), and the foremost object has the highest priority (or z-order).

The usual conventions used to describe orientations on a page are shown in FIGS. 25A and 25B, for portrait and landscape pages respectively. Page 2504 has a portrait orientation and page 2508 is in landscape orientation. A three-dimensional coordinate system is used to describe directions. Typically the top left corner of the page is considered the origin. Across the page is an increasing x direction 2502, 2506, and down the page is an increasing y direction 2503, 2507. An axis 2501, 2505 comes out of the page in an increasing z direction. Even though pages 2504, 2508 are two-dimensional, it is useful to have a three dimensional coordinate system. Objects on the page can appear in front of and/or behind other objects so it is sometimes desirable to give objects a z-level to which reference can be made.

Typically, each object is rasterized in scanline order and pixels are written to the framestore in sequential runs (pixel spans) along each scanline. Some graphics interfaces allow a logical or arithmetic operation to be specified, which is performed between one or more graphics objects and the already rendered pixels in the framestore. In these cases, the principle remains the same; objects (or groups of objects) are rasterized in scanline order, and the result of the specified operation is calculated and written to the framestore in sequential runs along each scanline.

There are essentially two problems with this technique. The first is that the technique requires fast random access to all of the pixels in the framestore. This is because each new object could affect any pixel in the framestore. For this reason, the framestore is normally kept in semiconductor random access memory (RAM). For high-resolution color printers the amount of RAM required can be very large, typically in excess of 100 Mbytes, which is relatively costly and difficult to run at high speed. The second problem is that many pixels in the framestore are over-painted (re-rendered) by later objects, often many times. Painting these pixels with the earlier objects can result in considerable wasted computation effort and wasted memory bandwidth. Both result in lower rendering performance.

One method for overcoming the large framestore problem is the use of "banding". When banding is used, only part of the framestore exists in memory at any one time. All of the objects to be drawn are retained in an object list by the rendering application. This object list is considered in object order as above, but the only pixel operations performed are those which fall within the part of the page intersected by the band. After all objects in the object list have been drawn, the band is complete, and can be sent to the printer (or to intermediate storage) and the process repeats for the next band on the page. With this method, the bands are rendered in order, down the page. There are some penalties with this technique, however. It is necessary to retain in a list all objects to be drawn on the page. It may also be necessary to reconsider the objects being drawn many times, possibly once for each band. As the number of bands increases, so too does the repetitious examination of the objects being rendered. Also, the technique of banding does not solve the problem of the cost of over-painting. In some implementations, the overhead of dividing the page into bands can also result in a performance penalty.

In some graphics systems implementing this banding method, the input graphics objects are first converted into a 'simplified' intermediate format, and stored in a "display list". The format and ordering of this display list is chosen to make the rendering process more efficient. For example, the entries in the display list are usually sorted in terms of increasing y co-ordinates and then x co-ordinates. Such use of an intermediate display list can alleviate some of the problems described in earlier methods, but the over-painting problem remains.

Some other graphic systems consider the image in scanline order. Again, all of the objects on the page are retained in a list, which can be an intermediate display list. On each scanline the objects which intersect that scanline are considered in priority order and for each object, spans of pixels between the intersection points of the object edges with the scanline are filled in a line store. This technique overcomes the large framestore problem, but however still suffers from the over-painting problem.

Other graphic systems utilize pixel-sequential rendering to overcome both the large framestore problem and the over-painting problem. In these systems, each pixel is generated in raster order. Again, all objects to be drawn are retained in a list. On each scanline, the edges of objects which intersect that scanline, are held in increasing order of their intersection with the scanline. These points of intersection, or edge crossings, are considered in turn, and are used to decide whether the associated object is being 'activated' or 'de-activated' by the edge. The activation count toggles which object is the topmost object and allows only the contributing objects to be painted onto the page. Some objects may be transparent, in which case the transparent objects and objects lying directly below them in z-order need to be combined to yield the output pixel. This combination using the object's transparency is called Alpha compositing.

Alpha (α) compositing is a mechanism used in computer graphics and image processing as a means of overlaying and combining two layers of two-dimensional color data to obtain a single output layer. Each layer has an array of pixels, with each pixel being formed by a set of values or channels. In alpha compositing, one channel is always the "α channel", which describes the opacity of the pixel to be reproduced. Opacity is the extent to which a pixel in a layer will override or obscure colour information from pixels on layers behind the layer in question. Opacity is often referred to by its conjugate name, transparency. In a normalised system, opacity= (1−transparency).

The remaining channels describe the colour of the pixel. The number of these remaining channels and the manner in which they describe the colour of the pixel is implementation specific. For example, there may be just one colour channel (in the case of greyscale or colour separated images), or there may be multiple colour channels (for example red, green and blue). These different ways of describing colour are often referred to as the colourspace of the image. It is assumed that the colourspace is the same for all pixels on a layer.

Graphic systems which use pixel-sequential rendering have significant advantages in that there is no framestore or line store and no unnecessary over-painting. Inherently less memory and less work in rendering is a result.

In pixel-sequential rendering systems, each scanline has to process edge crossings and determine which levels will be active for the next span. Generally this is done for every edge crossing for every scanline. The retrieval of the levels and sorting into the active level list may be an expensive and time-consuming process in the whole rendering pipeline. Typically, the level retrieval and sorting may consume 20% of the total render time. There is accordingly a need for more efficient methods for managing the lists of active levels.

SUMMARY

It is an object of the present invention to substantially overcome, or at least ameliorate, one or more disadvantages of existing arrangements.

According to one aspect of the invention, there is provided a method of rendering an image one pixel at a time in scanline order, wherein said image comprises objects described by one or more levels, the method comprising the steps of:

identifying a list of edges of said objects that intersect a first scanline;

determining, for at least one identified edge, a first set of levels that are activated on said first scanline at said at least one identified edge;

building a compositing list for said at least one identified edge, wherein said compositing list comprises the levels from said first set that contribute to a pixel on said first scanline in the rendered image;

caching one or more compositing lists wherein each cached compositing list is associated with a corresponding edge;

checking, for a current edge on a second scanline subsequent to said first scanline, whether the cached compositing list associated with said current edge is valid for said current edge on said second scanline;

retrieving said cached compositing list if said checking step indicates that said cached compositing list is valid; and compositing one or more pixels using said retrieved compositing list.

According to a second aspect of the invention there is provided an apparatus for rendering an image one pixel at a time in scanline order, wherein said image comprises objects described by one or more levels, said apparatus comprising:

means for identifying a list of edges of said objects that intersect a first scanline;

means for determining, for at least one identified edge, a first set of levels that are activated on said first scanline at said at least one identified edge;

means for building a compositing list for said at least one identified edge, wherein said compositing list comprises the levels from said first set that contribute to a pixel on said first scanline in the rendered image;

means for caching one or more compositing lists wherein each cached compositing list is associated with a corresponding edge;

means for checking, for a current edge on a second scanline subsequent to said first scanline, whether the cached compositing list associated with said current edge is valid for said current edge on said second scanline;

means for retrieving said cached compositing list if said means for checking indicates that said cached compositing list is valid; and means for compositing one or more pixels using said retrieved compositing list.

According to a third aspect of the invention there is provided a computer program comprising machine-readable program code for controlling the operation of a data processing apparatus on which the program code executes to perform a method of rendering an image one pixel at a time in scanline order, wherein said image comprises objects described by one or more levels, the method comprising the steps of:

identifying a list of edges of said objects that intersect a first scanline;

determining, for at least one identified edge, a first set of levels that are activated on said first scanline at said at least one identified edge;

building a compositing list for said at least one identified edge, wherein said compositing list comprises the levels from said first set that contribute to a pixel on said first scanline in the rendered image;

caching one or more compositing lists wherein each cached compositing list is associated with a corresponding edge;

checking, for a current edge on a second scanline subsequent to said first scanline, whether the cached compositing list associated with said current edge is valid for said current edge on said second scanline;

retrieving said cached compositing list if said checking step indicates that said cached compositing list is valid; and compositing one or more pixels using said retrieved compositing list.

According to a further aspect of the invention there is provided a computer program product comprising machine-readable program code recorded on a machine-readable recording medium, for controlling the operation of a data processing apparatus on which the program code executes to perform a method of rendering an image one pixel at a time in scanline order, wherein said image comprises objects described by one or more levels, the method comprising the steps of:

identifying a list of edges of said objects that intersect a first scanline;

determining, for at least one identified edge, a first set of levels that are activated on said first scanline at said at least one identified edge;

building a compositing list for said at least one identified edge, wherein said compositing list comprises the levels from said first set that contribute to a pixel on said first scanline in the rendered image;

caching one or more compositing lists wherein each cached compositing list is associated with a corresponding edge;

checking, for a current edge on a second scanline subsequent to said first scanline, whether the cached compositing list associated with said current edge is valid for said current edge on said second scanline;

retrieving said cached compositing list if said checking step indicates that said cached compositing list is valid; and compositing one or more pixels using said retrieved compositing list.

According to a further aspect of the invention there is provided a system for rendering an image one pixel at a time in scanline order, wherein said image comprises objects described by one or more levels, the system comprising:

an information store for storing information;

a processing module in communication with said information store, wherein the processing module:

identifies a list of edges of said objects that intersect a first scanline;

stores said list of edges in said information store;

determines, for at least one identified edge, a first set of levels that are activated on said first scanline at said at least one identified edge;

builds a compositing list for said at least one identified edge, wherein said compositing list comprises the levels from said first set that contribute to a pixel on said first scanline in the rendered image;

caches one or more compositing lists in said information store wherein each cached compositing list is associated with a corresponding edge;

checks, for a current edge on a second scanline subsequent to said first scanline, whether the cached compositing list associated with said current edge is valid for said current edge on said second scanline;

retrieves said cached compositing list from said information store if said checking indicates that said cached compositing list is valid; and composites one or more pixels using said retrieved compositing list.

BRIEF DESCRIPTION OF THE DRAWINGS

One or more embodiments of the present invention will now be described with reference to the drawings, in which:

FIGS. 12B to 12J illustrate the edge update routine implemented by the arrangement of FIG. 4 for the example of FIG. 8A;

FIGS. 13A and 13B illustrate the odd-even and non-zero winding fill rules;

FIGS. 14A to 14E illustrate how large changes in X coordinates contribute to spill conditions and how they are handled;

FIGS. 15A to 15E illustrates the priority filling routine implemented by the arrangement of FIG. 5;

FIGS. 16A to 16D provide a comparison between two prior art edge description formats and that used in the described apparatus;

FIG. 18 depicts the priority properties and status table of the priority determination module of FIG. 3;

FIG. 19 shows a table of a number of raster operations;

FIGS. 20A and 20B shows a table of the principal compositing operations and their corresponding raster operations and opacity flags;

DETAILED DESCRIPTION INCLUDING BEST MODE

Figure 1:
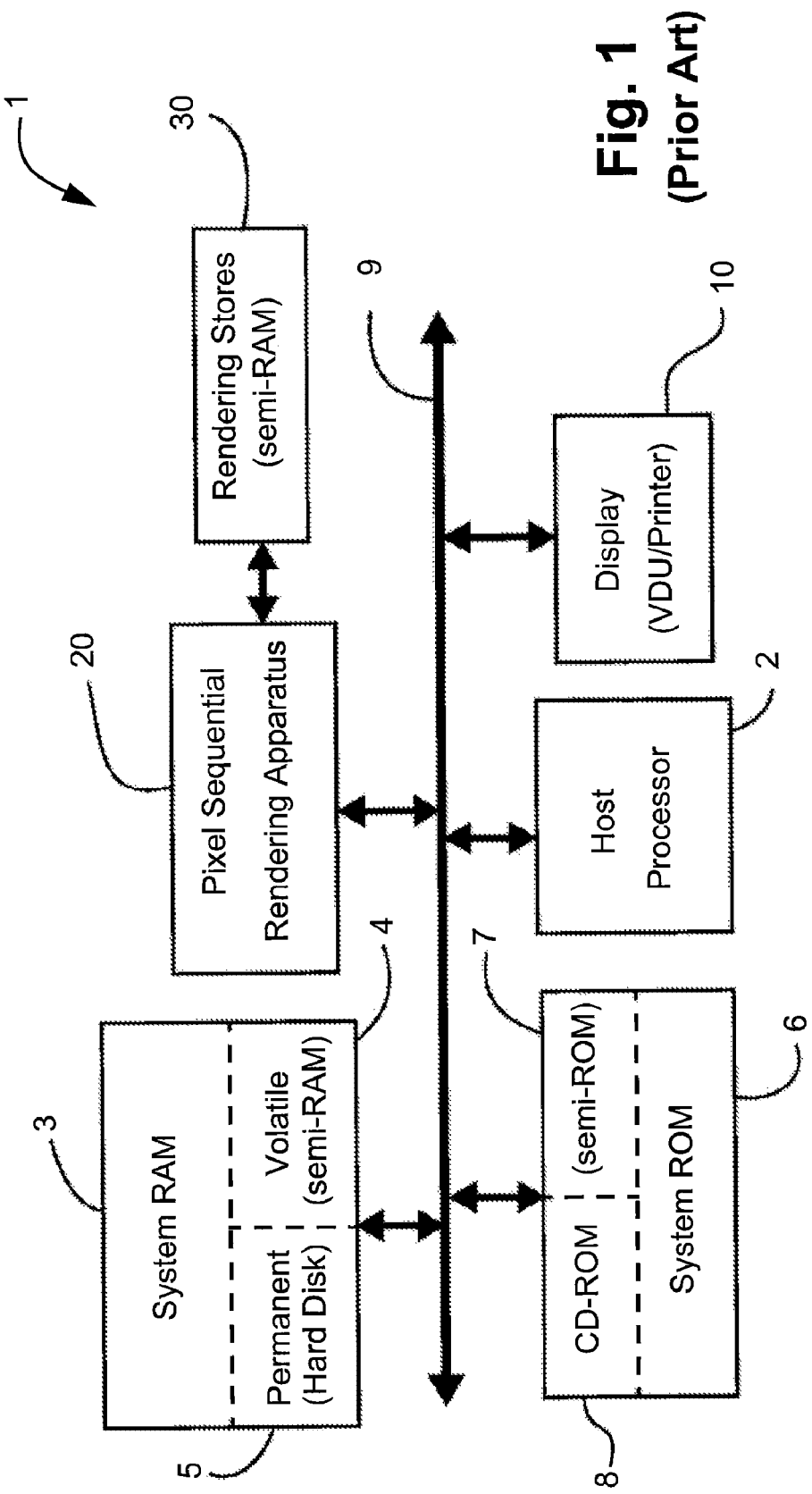
FIG. 1 is a schematic block diagram representation of a computer system incorporating a rendering arrangement.

Where reference is made in any one or more of the accompanying drawings to steps and/or features, which have the same reference numerals, those steps and/or features have for the purposes of this description the same function(s) or operation(s), unless the contrary intention appears.

For a better understanding of the pixel sequential rendering system 1, a brief overview of the system is first undertaken in Section 1.0. Then follows a brief discussion in Section 2.0 of the driver software for interfacing between a third party software application and the pixel sequential rendering apparatus 20 of the system. A brief overview of the pixel sequential rendering apparatus 20 is then discussed in Section 3.0. As will become apparent, the pixel sequential rendering apparatus 20 includes an instruction execution module 300; an edge tracking module 400; a priority determination module 500; a fill color determination module 600; a pixel compositing module 700; and a pixel output module 800. A brief overview of these modules is described in Sections 3.1 to 3.6.

The general principles of the invention have application in caching a compositing list generated by the pixel-sequential rendering apparatus 20 for an active edge on a scanline. In the preferred system, the edge processing module 400 calculates the active edges on a scanline. The priority update module 500 determines which priority levels make a contribution to a current pixel, and caches a list of the contributing levels. Modules 400 and 500 are described in Sections 3.2 and 3.3 respectively, and a method of caching the list of contributing levels (or compositing list) is described in more detail in Section 4.0.

1.0 Pixel Sequential Rendering System

FIG. 1 illustrates schematically a computer system 1 configured for rendering and presentation of computer graphic object images. The system includes a host processor 2 associated with system random access memory (RAM) 3, which may include a non-volatile hard disk drive or similar device 5 and volatile, semiconductor RAM 4. The system 1 also includes a system read-only memory (ROM) 6 typically founded upon semiconductor ROM 7 and which in many cases may be supplemented by compact disk devices (CD ROM) 8. The system 1 may also incorporate some means 10 for displaying images, such as a video display unit (VDU) or a printer, both, which operate in raster fashion.

The above-described components of the system 1 are interconnected via a bus system 9 and are operable in a normal operating mode of computer systems well known in the art, such as IBM PC/AT type personal computers and arrangements evolved therefrom, Sun Sparcstations and the like.

Also seen in FIG. 1, a pixel sequential rendering apparatus 20 (or renderer) connects to the bus 9, and is configured for the sequential rendering of pixel-based images derived from graphic object-based descriptions supplied with instructions and data from the system 1 via the bus 9. The apparatus 20 may utilize the system RAM 3 for the rendering of object descriptions although preferably the rendering apparatus 20 may have associated therewith a dedicated rendering store arrangement 30, typically formed of semiconductor RAM.

Image rendering operates generally speaking in the following manner. A render job to be rendered is given to the driver software by third party software for supply to the pixel sequential renderer 20. The render job is typically in a page description language or in a sequence of function calls to a standard graphics application program interface (API), which defines an image comprising objects placed on a page from a rearmost object to a foremost object to be composited in a manner defined by the render job. The driver software converts the render job to an intermediate render job, which is then fed to the pixel sequential renderer 20. The pixel sequential renderer 20 generates the color and opacity for the pixels one at a time in raster scan order. At any pixel currently being scanned and processed, the pixel sequential renderer 20 composites only those exposed objects that are active at the currently scanned pixel. The pixel sequential renderer determines that an object is active at a currently scanned pixel if that pixel lies within the boundary of the object. The pixel sequential renderer 20 achieves this by reference to a fill counter associated with that object. The fill counter keeps a running fill count that indicates whether the pixel lies within the boundary of the object. When the pixel sequential renderer 20 encounters an edge associated with the object it increments or decrements the fill count depending upon the direction of the edge. The renderer 20 is then able to determine whether the current pixel is within the boundary of the object depending upon the fill count and a predetermined winding count rule. The renderer 20 determines whether an active object is exposed with reference to a flag associated with that object. This flag associated with an object indicates whether or not the object obscures lower order objects. That is, this flag indicates whether the object is partially transparent, and in which case the lower order active objects will thus make a contribution to the color and opacity of the current pixel. Otherwise, this flag indicates that the object is opaque, in which case active lower order objects will not make any contribution to the color and opacity of the currently scanned pixel. The pixel sequential renderer 20 determines that an object is exposed if it is the uppermost active object, or if all the active objects above the object have their corresponding flags set to transparent. The renderer 20 then composites these exposed active objects to determine and output the color and opacity for the currently scanned pixel.

The driver software, in response to the page, also extracts edge information defining the edges of the objects for feeding to the edge tracking module. The driver software also generates a linearized table of priority properties and status information (herein called the level activation table) of the expression tree of the objects and their compositing operations which is fed to the priority determination module. The level activation table contains one record for each object on the page. In addition, each record contains a field for storing a pointer to an address for the fill of the corresponding object in a fill table. This fill table is also generated by the driver software and contains the fill for the corresponding objects, and is fed to the fill determination module. The level activation table together with the fill table are devoid of any edge information and effectively represent the objects, where the objects are infinitively extending. The edge information is fed to the edge tracking module, which determines, for each pixel in raster scan order, the edges of any objects that intersect a currently scanned pixel. The edge tracking module passes this information onto the priority determination module. Each record of the level activation table contains a counter, which maintains a fill count associated with the corresponding object of the record. The priority determination module processes each pixel in a raster scan order. Initially, the fill counts associated with all the objects are zero, and so all objects are inactive. The priority determination module continues processing each pixel until it encounters an edge intersecting that pixel. The priority determination module updates the fill count associated with the object of that edge, and so that object becomes active. The priority determination continues in this fashion updating the fill count of the objects and so activating and de-activating the objects. The priority determination module also determines whether these active objects are exposed or not, and consequently whether they make a contribution to the currently scanned pixel. In the event that they do, the pixel determination module generates a series of messages which ultimately instructs the pixel compositing module to composite the color and opacity for these exposed active objects in accordance with the compositing operations specified for these objects in the level activation so as to generate the resultant color and opacity for the currently scanned pixel. These series of messages do not at that time actually contain the color and opacity for that object but rather an address to the fill table, which the fill determination module uses to determine the color and opacity of the object.

For ease of explanation the location (i.e.: priority level or z-order) of the object in the order of the objects from the rearmost object to the foremost is herein referred to as the object's priority. Preferably, a number of non-overlapping objects that have the same fill and compositing operation, and that form a contiguous sequence in the order of the objects, may be designated as having the same priority. Most often, only one priority level is required per object. However, some objects may require several instructions, and thus the object may require several priority levels. For example, a character with a color fill may be represented by, a bounding box (B) on a first level having the color fill, a one-bit per pixel bitmap (S) which provides the shape of the character on a second level, and the same bounding box (B) on a third level having the color fill, where the levels are composited together ((B xor Page) and S) xor B to produce the color character. For fundamental objects, there is a one-to-one relationship with priority levels.

The pixel sequential renderer 20 also utilizes clip objects to modify the shape of other objects. The renderer 20 maintains an associated clip count for the clip in a somewhat similar fashion to the fill count to determine whether the current pixel is within the clip region.

2.0 Software Driver

A software program, hereafter referred to as the driver, is loaded and executed on the host processor 2 for generating instructions and data for the pixel-sequential graphics rendering apparatus 20, from data provided to the driver by a third-party application. The third-party application may provide data in the form of a standard language description of the objects to be drawn on the page, such as PostScript and PCL, or in the form of function calls to the driver through a standard software interface, such as the Windows GDI or X-11.

The driver software separates the data associated with an object, supplied by the third-party application, into data about the edges of the object, any operation or operations associated with painting the object onto the page, and the color and opacity with which to fill pixels which fall inside the edges of the object.

The driver software partitions the edges of each object into edges which are monotonically increasing in the Y-direction, and then divides each partitioned edge of the object into segments of a form suitable for the edge module described below. Partitioned edges are sorted by the X-value of their starting positions and then by Y. Groups of edges starting at the same Y-value remain sorted by X-value, and may be concatenated together to form a new edge list, suitable for reading in by the edge module when rendering reaches that Y-value.

The driver software sorts the operations, associated with painting objects, into priority order, and generates instructions to load the data structure associated with the priority determination module (described below). This structure includes a field for the fill rule, which describes the topology of how each object is activated by edges, a field for the type of fill which is associated with the object, being painted, and a field, to identify whether data on levels below the current object is required by the operation. There is also a field, herein called clip count, that identifies an object as a clipping object, that is, as an object which is not, itself, filled, but which enables or disables filling of other objects on the page.

The driver software also prepares a data structure (the fill table) describing how to fill object. The fill table is indexed by the data structure in the priority determination module. This allows several levels in the priority determination module to refer to the same fill data structure.

The driver software assembles the aforementioned data into a job containing instructions for loading the data and rendering pixels, in a form that can be read by the rendering system, and transfers the assembled job to the rendering system. This may be performed using one of several methods known to the art, depending on the configuration of the rendering system and its memory.

3.0 Pixel Sequential Rendering Apparatus

Figure 2:
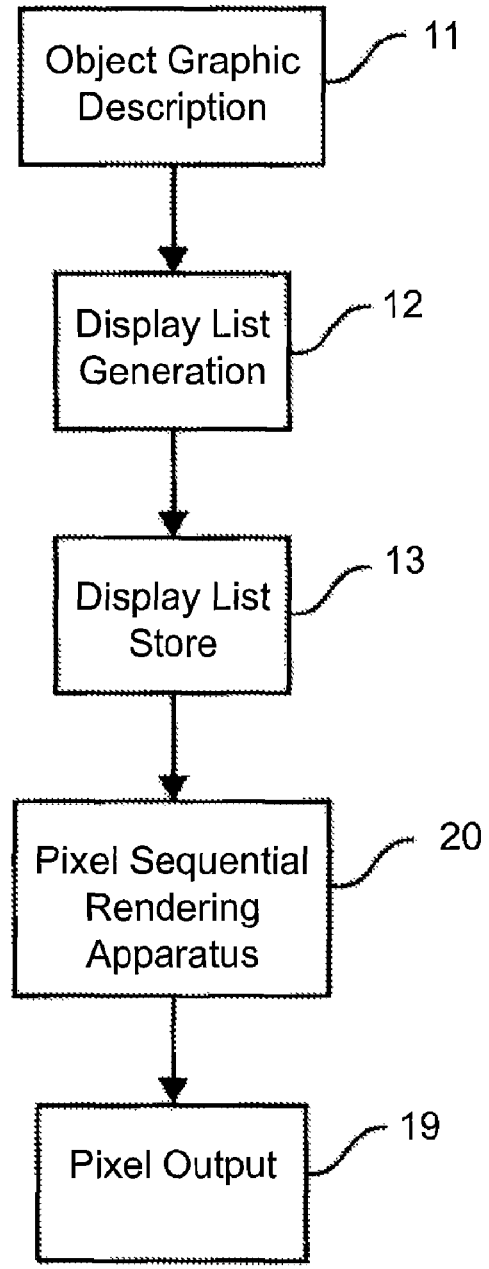
FIG. 2 is a block diagram showing the functional data flow of the rendering arrangement.

Referring now to FIG. 2, a functional data flow diagram of the rendering process is shown. The functional flow diagram of FIG. 2 commences with an object graphic description 11 which is used to describe those parameters of graphic objects in a fashion appropriate to be generated by the host processor 2 and/or, where appropriate, stored within the system RAM 3 or derived from the system ROM 6, and which may be interpreted by the pixel sequential rendering apparatus 20 to render therefrom pixel-based images. For example, the object graphic description 11 may incorporate objects with edges in a number of formats including straight edges (simple vectors) that traverse from one point on the display to another, or an orthogonal edge format where a two-dimensional object is defined by a plurality of edges including orthogonal lines. Further formats, where objects are defined by continuous curves are also appropriate and these can include quadratic polynomial fragments where a single curve may be described by a number of parameters which enable a quadratic based curve to be rendered in a single output space without the need to perform multiplications. Further data formats such as cubic splines and the like may also be used. An object may contain a mixture of many different edge types. Typically, common to all formats are identifiers for the start and end of each line (whether straight or curved) and typically, these are identified by a scan line number thus defining a specific output space in which the curve may be rendered.

For example, FIG. 16A shows a prior art edge description of an edge 600 that is required to be divided into two segments 601 and 602 in order for the segments to be adequately described and rendered. This arises because the prior art edge description, whilst being simply calculated through a quadratic expression, could not accommodate an inflexion point 604. Thus the edge 600 was dealt with as two separate edges having end points 603 and 604, and 604 and 605 respectively. FIG. 16B shows a cubic spline 610 that is described by endpoints 611 and 612, and control points 613 and 614. This format requires calculation of a cubic polynomial for render purposes and thus is expensive of computational time.

FIGS. 16C and 16D show examples of edges applicable to the described arrangement. An edge is considered as a single entity and if necessary, is partitioned to delineate sections of the edge that may be described in different formats, a specific goal of which is to ensure a minimum level of complexity for the description of each section.

In FIG. 16C, a single edge 620 is illustrated spanning between scanlines A and M. An edge is described by a number of parameters including start_x, start_y, one or more segment descriptions that include an address that points to the next segment in the edge, and a finish segment used to terminate the edge. Preferably, the edge 620 may be described as having three step segments, a vector segment, and a quadratic segment. A step segment is simply defined as having a x-step value and a y-step value. For the three step segments illustrated, the segment descriptions are [0, 2], [+2, 2], and [+2, 0]. Note that the x-step value is signed thereby indicating the direction of the step, whilst the y-step value is unsigned as such is always in a raster scan direction of increasing scanline value. The next segment is a vector segment which typically requires parameters start_x (X), start_y (Y), num_of_scanlines (NY) and slope (DX). In this example, because the vector segment is an intermediate segment of the edge 620, the start_x and start_y may be omitted because such arise from the preceding segment(s). The parameter num_of_scanlines (NY) indicates the number of scanlines the vector segment lasts. The slope value (DX) is signed and is added to the x-value of a preceding scanline to give the x-value of the current scanline, and in the illustrated case, DX=+1. The next segment is a quadratic segment which has a structure corresponding to that of the vector segment, but also a second order value (DDX) which is also signed and is added to DX to alter the slope of the segment.

FIG. 16D shows an example of a cubic curve which includes a description corresponding to the quadratic segment save for the addition of a signed third-order value (DDDX), which is added to DDX to vary the rate of change of slope of the segment. Many other orders may also be implemented.

It will be apparent from the above that the ability to handle plural data formats describing edge segments allows for simplification of edge descriptions and evaluation, without reliance on complex and computationally expensive mathematical operations. In contrast, in the prior art system of FIG. 16A, all edges, whether orthogonal, vector or quadratic were required to be described by the quadratic form.

The operation of the rendering arrangement will be described with reference to the simple example of rendering an image 78 shown in FIG. 8 which is seen to include two graphical objects, in particular, a partly transparent blue-colored triangle 80 rendered on top of and thereby partly obscuring an opaque red colored rectangle 90. As seen, the rectangle 90 includes side edges 92, 94, 96 and 98 defined between various pixel positions (X) and scan line positions (Y). Because the edges 96 and 98 are formed upon the scan lines (and thus parallel therewith), the actual object description of the rectangle 90 can be based solely upon the side edges 92 and 94, such as seen in FIG. 9A. In this connection, edge 92 commences at pixel location (40,35) and extends in a raster direction down the screen to terminate at pixel position (40,105). Similarly, the edge 94 extends from pixel position (160,35) to position (160,105). The horizontal portions of the rectangular graphic object 90 may be obtained merely by scanning from the edge 92 to the edge 94 in a rasterized fashion.

The blue triangular object 80 however is defined by three object edges 82, 84 and 86, each seen as vectors that define the vertices of the triangle. Edges 82 and 84 are seen to commence at pixel location (100,20) and extend respectively to pixel locations (170,90) and (30,90). Edge 86 extends between those two pixel locations in a traditional rasterized direction of left to right. In this specific example because the edge 86 is horizontal like the edges 96 and 98 mentioned above, it is not essential that the edge 86 be defined. In addition to the starting and ending pixel locations used to describe the edges 82 and 84, each of these edges will have associated therewith the slope value in this case +1 and −1 respectively.

Returning to FIG. 2, having identified the data necessary to describe the graphic objects to the rendered, the graphic system 1 then performs a display list generation step 12.

Figure 3:
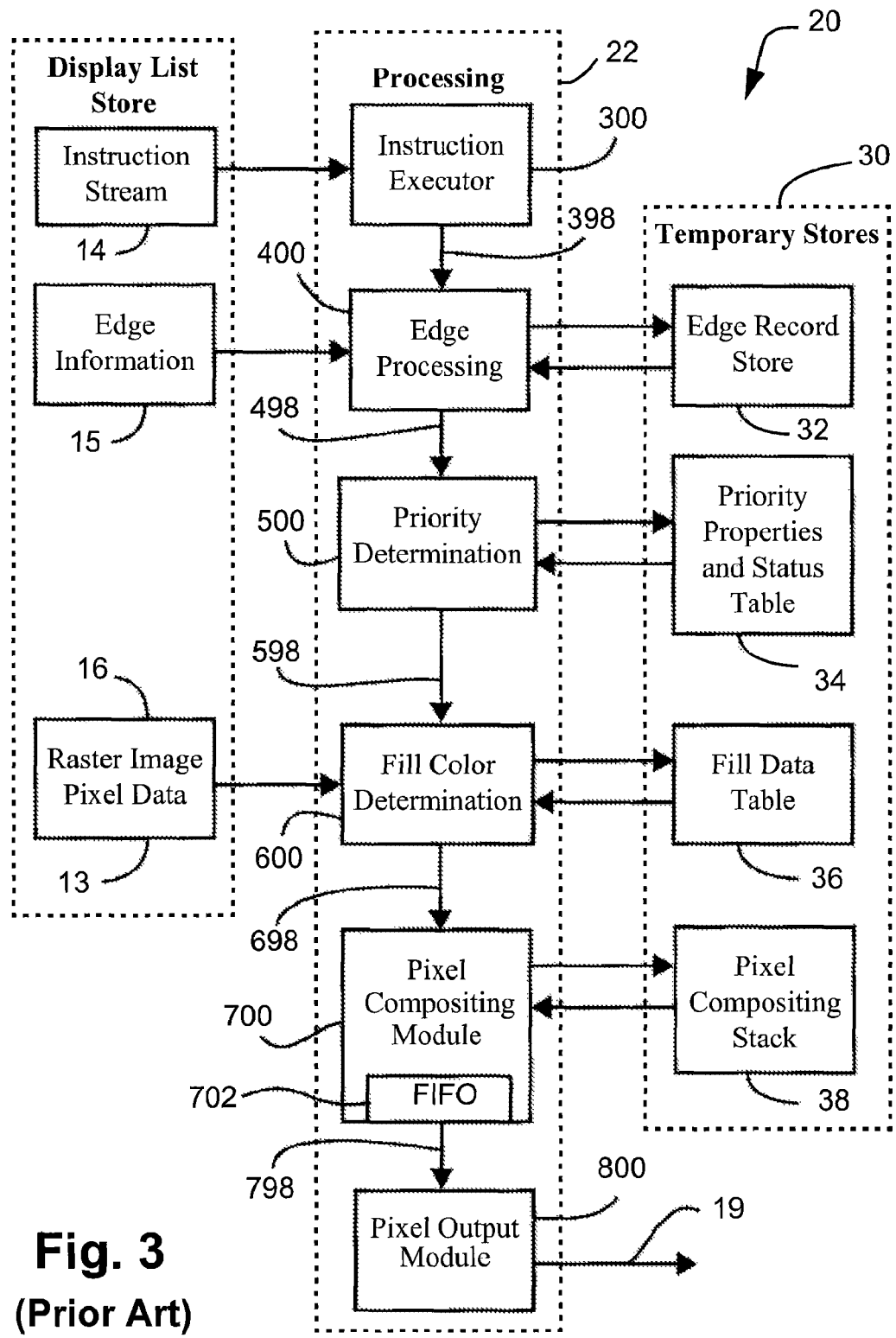
FIG. 3 is a schematic block diagram representation of the pixel sequential rendering apparatus of FIG. 2 and associated display list and temporary stores.

The display list generation 12 is preferably implemented as a software driver executing on the host processor 2 with attached ROM 6 and RAM 3. The display list generation 12 converts an object graphics description, expressed in any one or more of the well known graphic description languages, graphic library calls, or any other application specific format, into a display list. The display list is typically written into a display list store 13, generally formed within the RAM 4 but which may alternatively be formed within the temporary rendering stores 30. As seen in FIG. 3, the display list store 13 can include a number of components, one being an instruction stream 14, another being edge information 15 and where appropriate, raster image pixel data 16.

The instruction stream 14 includes code interpretable as instructions to be read by the pixel sequential rendering apparatus 20 to render the specific graphic objects desired in any specific image. For the example of the image shown in FIG. 8, the instruction stream 14 could be of the form of:

(1) render (nothing) to scan line 20;
(2) at scan line 20 add two blue edges 82 and 84;
(3) render to scan line 35;
(4) at scan line 35 add two red edges 92 and 94; and
(5) render to completion.

Similarly, the edge information 15 for the example of FIG. 8 may include the following:

(i) edge 84 commences at pixel position 100, edge 82 commences at pixel position 100;
(ii) edge 92 commences at pixel position 40, edge 94 commences at pixel position 160;
(iii) edge 84 runs for 70 scan lines, edge 82 runs for 70 scanlines;
(iv) edge 84 has slope=−1, edge 84 has slope=+1;
(v) edge 92 has slope=0 edge 94 has slope=0.
(vi) edges 92 and 94 each run for 70 scanlines.

It will be appreciated from the above example of the instruction stream 14 and edge information 15 and the manner in which each are expressed, that in the image 78 of FIG. 8, the pixel position (X) and the scanline value (Y) define a single 2-dimensional output space in which the image 78 is rendered. Other output space configurations however can be realized using the principles of the present disclosure.

FIG. 8 includes no raster image pixel data and hence none need be stored in the store portion 16 of the display list 13, although this feature will be described later.

The display list store 13 is read by a pixel sequential rendering apparatus 20. The pixel sequential rendering apparatus 20 may be implemented as an integrated circuit or as an equivalent software module executing on a general-purpose processing unit. The rendering apparatus 20 converts the display list into a stream of raster pixels which can be forwarded to another device, for example, a printer, a display, or a memory store.

Figure 26A:
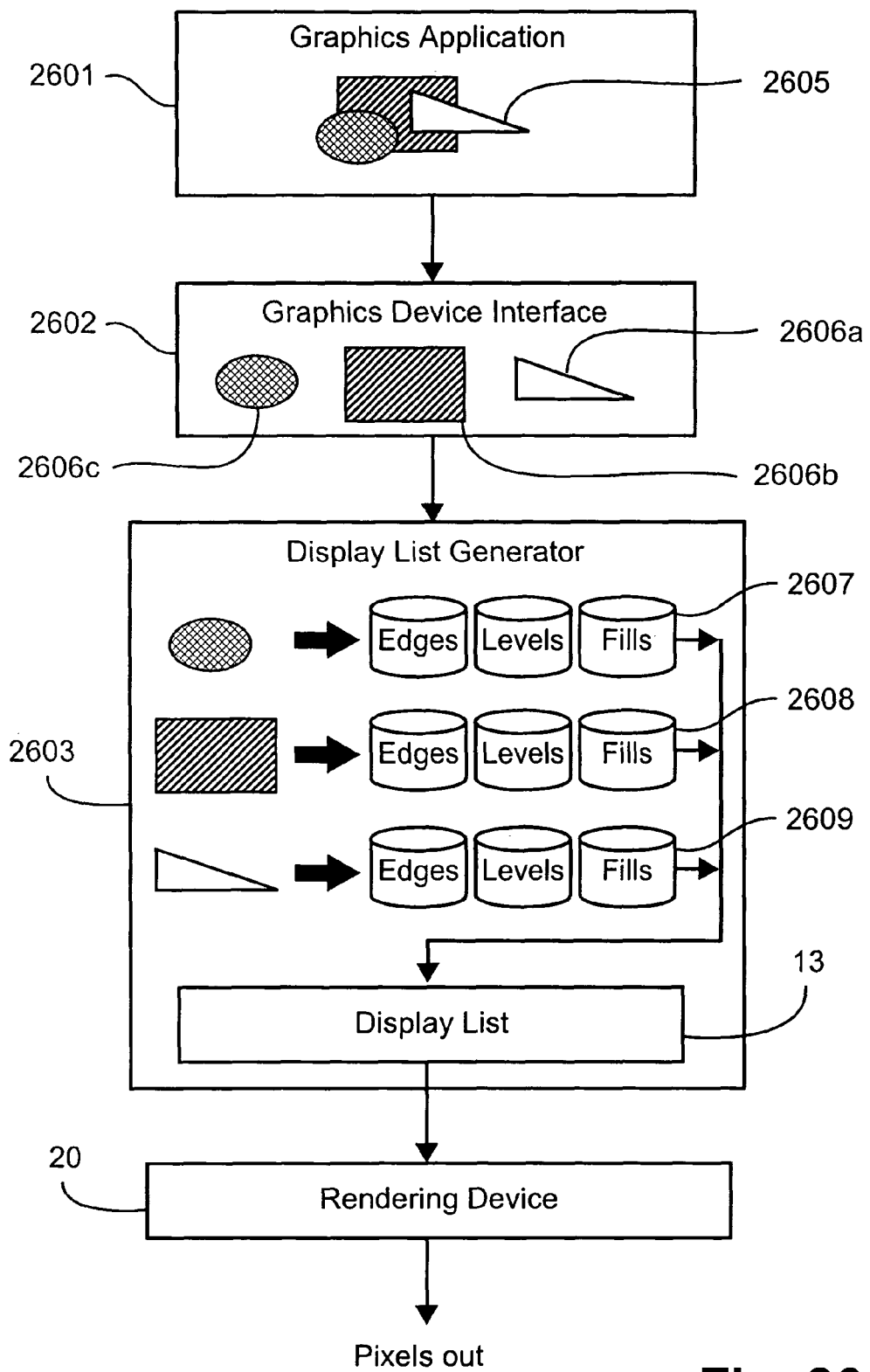
FIG. 26A shows an example of the rendering chain used to convert a representation from a video display device to a printing apparatus.

The process of FIG. 2 is further illustrated in FIG. 26A, in which objects 2605 displayed on a display device by graphics application 2601 are rendered to provide a pixel stream that may be sent to a printer to print the objects. In the example, the displayed objects 2605 consist of a rectangle, an ellipse and a triangle. Each of the three objects has a different fill, and the ellipse and triangle both overlay the rectangle. When a user initiates printing, the graphics application 2601 passes the three objects 2605 into the graphics device interface 2602 as separate objects 2606a, 2606b and 2606c, having different properties from one another.

The graphics device interface 2602 passes the three objects as a set of primitives into the display list generator 2603. Each object primitive contains object properties such as z-order or transparency. The display list generator 2603 breaks the objects into data and instructions suitable for processing by the rendering device 20. In this example the ellipse 2607, rectangle 2608 and triangle 2609 are broken up into information describing series of edges, levels and fills that the rendering device 20 can understand. The edges, levels and fills for the objects are combined into one intermediate file format called a display list, which is stored in store 13. The display list store 13 thus contains instructions that the rendering device 20 can interpret. Finally the display list is passed to the rendering device 20, which generates a pixel stream representing the page to be printed. In a software implementation, the generic algorithm performed on the rendering device 20 is:

```
FOR each scanline
    FOR each edge
        Determine the contributing object(s).
        Render fill
        Update edge
    END FOR
END FOR
```

FIG. 3 shows the configuration of the pixel sequential rendering apparatus 20, the display list store 13 and the temporary rendering stores 30. The processing stages 22 of the pixel-sequential rendering apparatus 20 include an instruction executor 300, an edge processing module 400, a priority determination module 500, a fill color determination module 600, a pixel compositing module 700, and a pixel output module 800. The processing operations use the temporary stores 30 which, as noted above, may share the same device (eg. magnetic disk or semiconductor RAM) as the display list store 13, or may be implemented as individual stores for reasons of speed optimization. The edge processing module 400 uses an edge record store 32 to hold edge information which is carried forward from scan-line to scan-line. The priority determination module 500 uses a priority properties and status table 34 to hold information about each priority, and the current state of each priority with respect to edge crossings while a scan-line is being rendered. The fill color determination module 600 uses a fill data table 36 to hold information required to determine the fill color of a particular priority at a particular position. The pixel compositing module 700 uses a pixel compositing stack 38 to hold intermediate results during the determination of an output pixel that requires the colors from multiple priorities to determine its value.

The display list store 13 and the other stores 32-38 detailed above may be implemented in RAM or any other data storage technology.

The processing steps shown in the arrangement of FIG. 3 take the form of a processing pipeline 22. In this case, the modules of the pipeline may execute simultaneously on different portions of image data in parallel, with messages passed between them as described below. In another arrangement, each message described below may take the form of a synchronous transfer of control to a downstream module, with upstream processing suspended until the downstream module completes the processing of the message.

3.1 Instruction Executor

The instruction executor 300 reads and processes instructions from the instruction stream 14 and formats the instructions into messages that are transferred via an output 398 to the other modules 400, 500, 550, 600 and 700 within the pipeline 22. Preferably, the instruction stream 13 may include the following instructions:

LOAD_PRIORITY_PROPERTIES: This instruction is associated with data to be loaded into the priority properties and status table 34, and an address in that table to which the data is to be loaded. When this instruction is encountered by the instruction executor 300, the instruction executor 300 issues a message for the storage of the data in the specified location of the priority properties and status table 34. This may be accomplished by formatting a message containing this data and passing it down the processing pipeline 22 to the priority determination module 500 which performs the store operation.

LOAD_FILL_DATA: This instruction is associated with fill data associated with an object to be loaded into the fill data table 36, and an address in that table to which the data is to be loaded. When this instruction is encountered by the instruction executor 300, the instruction executor 300 issues a message for the storage of the data at the specified address of the fill data table 36. This may be accomplished by formatting a message containing this data and passing it down the processing pipeline 22 to the fill color determination module which performs the store operation.

LOAD_NEW_EDGES_AND_RENDER: This instruction is associated with an address in the display list store 13 of new edges 15 which are to be introduced into the rendering process when a next scanline is rendered. When this instruction is encountered by the instruction executor 300, the instruction executor 300 formats a message containing this data and passes it to the edge processing module 400. The edge processing module 400 stores the address of the new edges in the edge record store 32. The edges at the specified address are sorted on their initial scanline intersection coordinate before the next scanline is rendered. In one arrangement, they are sorted by the display list generation process 12. In another arrangement, they are sorted by the pixel-sequential rendering apparatus 20.

SET_SCANLINE_LENGTH: This instruction is associated with a number of pixels which are to be produced in each rendered scanline. When this instruction is encountered by the instruction executor 300, the instruction executor 300 passes the value to the edge processing module 400 and the pixel compositing module 700.

SET_OPACITY_MODE: This instruction is associated with a flag, which indicates whether pixel compositing operations will use an opacity channel, also known in the art as an alpha or transparency channel. When this instruction is encountered by the instruction executor 300, the instruction executor 300 passes the flag value in the pixel compositing module 700.

SET_BUF: This instruction sets the address of external memory buffers used by the pixel sequential rendering apparatus 20. Preferably, at least the input, output and spill buffers of the edge processing module 400 are stored in external memory.

The instruction executor 300 is typically formed by a microcode state machine that maps instructions and decodes them into pipeline operations for passing to the various modules. A corresponding software process may alternatively be used.

3.2 Edge Tracking Module

Figure 4:
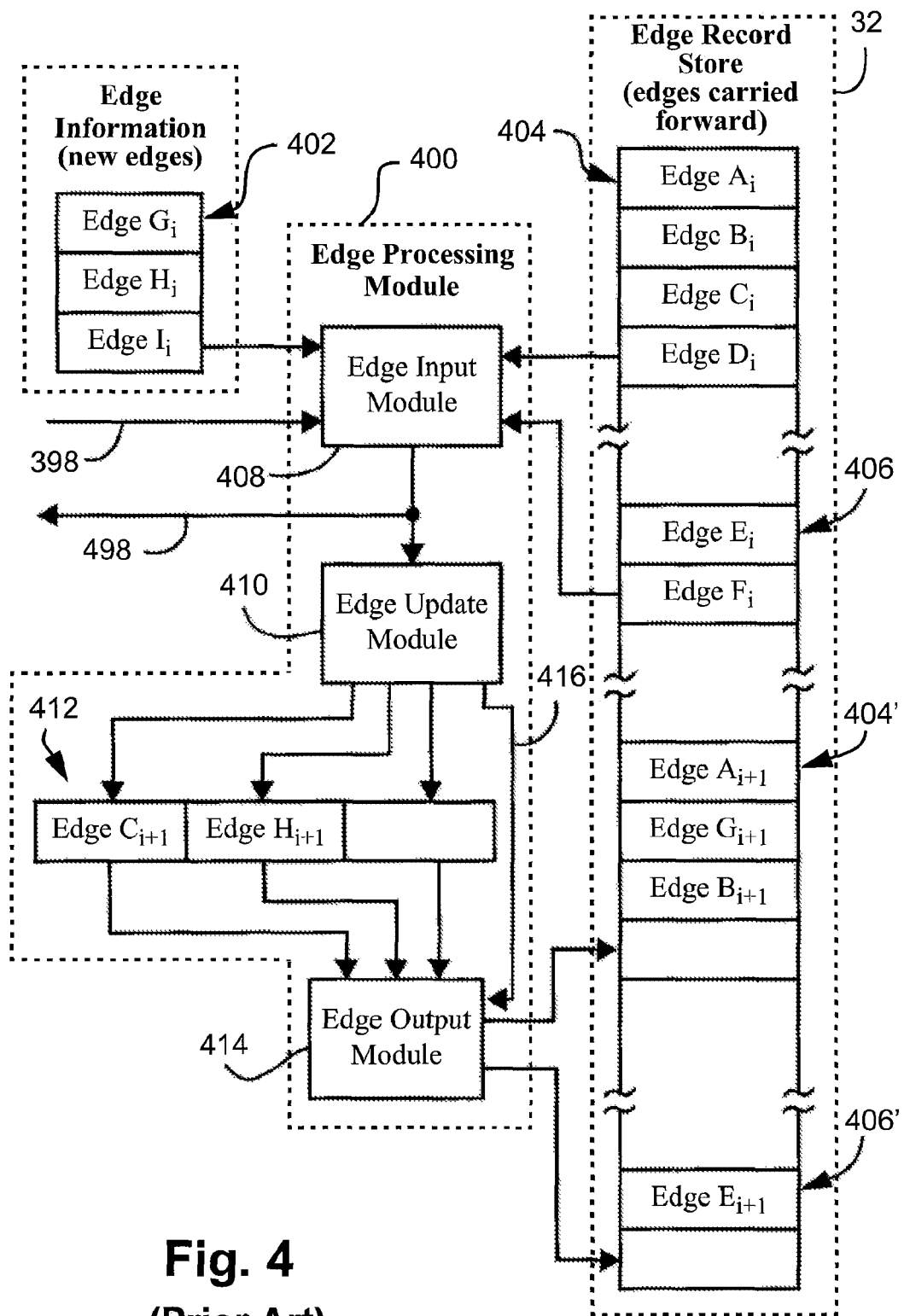
FIG. 4 is a schematic functional representation of the edge processing module of FIG. 3.

The operation of the edge processing module 400 during a scanline render operation will now be described with reference to FIG. 4. The initial conditions for the rendering of a scanline is the availability of three lists of edge records. Any or all of these lists may be empty. These lists are a new edge list 402, obtained from the edge information 15 and which contains new edges as set by the LOAD_NEW_EDGES_AND_RENDER instruction, a main edge list 404 which contains edge records carried forward from the previous scanline, and a spill edge list 406 which also contains edge records carried forward from the previous scanline.

Figure 12A:
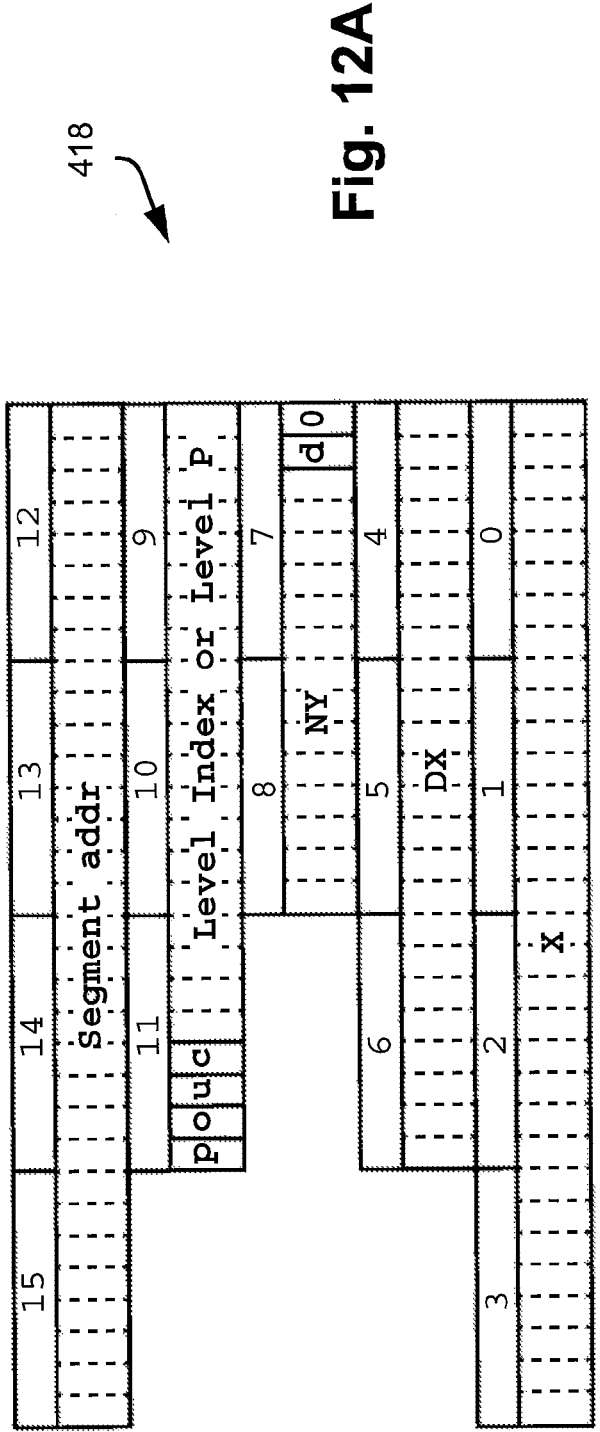
FIG. 12A depicts the format of an active edge record created by the edge processing module 400 of FIG. 4.

Turning now to FIG. 12A, there is shown the data format of such an edge record, which may include:
 (i) a current scanline intersection coordinate (referred to here as the X coordinate),
 (ii) a count (referred to herein as NY) of how many scanlines a current segment of this edge will last for (in some arrangements this may be represented as a Y limit),
 (iii) a value to be added to the X coordinate of this edge record after each scanline (referred to here as the DX),
 (iv) a priority level number (P) or an index (P) to a list of priority numbers,
 (v) an address (addr) of a next edge segment in the list; and
 (vi) a number of flags, marked p, o, u, c and d. The flag d determines whether the edge effects the clipping counter or the fill counter. The flag u determines whether the fill counter is incremented or decremented by the edge. The remaining flags are not significant in the rendering process and need not be described.

Such a data format may accommodate vectors, and orthogonally arranged edges. The format may also include a further parameter herein called DDX, which is a value to be added to the DX value of this edge record after each scanline. The latter enables the rendering of edges describing quadratic curves. The addition of further parameters, DDDX for example, may allow such an arrangement to accommodate cubic curves. In some applications, such as cubic Bezier spline, a 6-order polynomial (ie: up to DDDDDDX) may be required. The flag (u) indicates whether a winding count is to be incremented or decremented by an edge. The winding count is stored in a fill counter and is used to determine whether a currently scanned pixel is inside or outside the object in question.

Figures 8A, 8B:
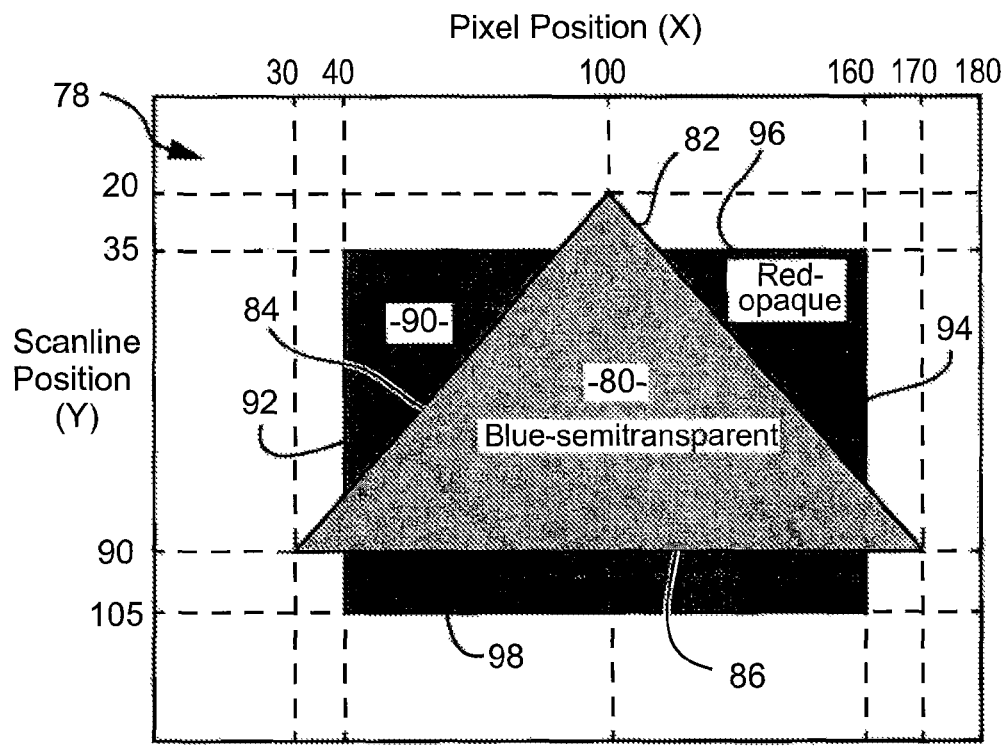
FIG. 8A illustrates a two-object image used as an example for explaining the operation of the rendering arrangement.
FIG. 8B shows a table of a number of edge records of the two-object image shown in FIG. 8A.
Figure 9A:
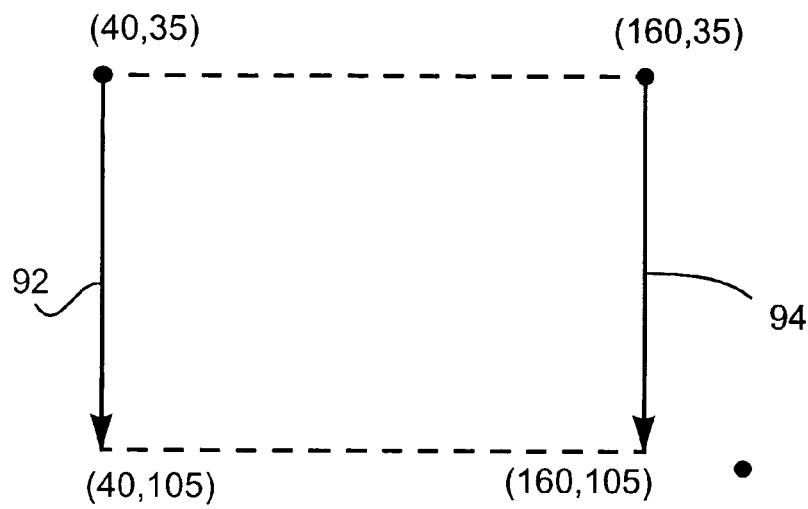
FIGS. 9A and 9B illustrate the vector edges of the objects of FIG. 8A.

In the example of the edges 84 and 94 of FIG. 8A, the corresponding edge records at scanline 20 could read as shown in the Table of FIG. 8B.

In this description, coordinates which step from pixel to pixel along a scanline being generated by the rendering process will be referred to as X coordinates, and coordinates which step from scanline to scanline will be referred to as Y coordinates. Preferably, each edge list contains zero or more records placed contiguously in memory. Other storage arrangements, including the use of pointer chains, are also possible. The records in each of the three lists 402, 404 and 406 are arranged in order of scanline intersection, this being the X coordinate. This is typically obtained by a sorting process, initially managed by an edge input module 408 which receives messages, including edge information, from the instruction executor 300. It is possible to relax the sort to only regard the integral portion of each scanline intersection coordinate as significant. It is also possible to relax the sort further by only regarding each scanline intersection coordinate, clamped to the minimum and maximum X coordinates which are being produced by the current rendering process. Where appropriate, the edge input module 408 relay messages to modules 500, 600 and 700 downstream in the pipeline 22 via an output 498.

The edge input module 408 maintains references into, and receives edge data from, each of the three lists 402, 404, and 406. Each of these references is initialized to refer to the first edge in each list at the start of processing of a scanline. Thereafter, the edge input module 408 selects an edge record from one of the three referenced edge records such that the record selected is the one with the least X coordinate out of the three referenced records. If two or more of the X-records are equal, each is processed in any order and the corresponding edge crossings output in the following fashion. The reference, which was used to select that record, is then advanced to the next record in that list. The edge just selected is formatted into a message and sent to an edge update module 410. Also, certain fields of the edge, in particular the current X, the priority numbers, and the direction flag, are formatted into a message which is forwarded to the priority determination module 500 via an output 498 of the edge processing module 400. Arrangements that use more or fewer lists than those described here are also possible.

Upon receipt of an edge, the edge update module 410 decrements the count of how many scanlines a current segment will last. If that count has reached zero, a new segment is read from the address indicated by the next segment address. A segment preferably specifies:
 (i) a value to add to the current X coordinate immediately the segment is read,
 (ii) a new DX value for the edge,
 (iii) a new DDX value for the edge, and
 (iv) a new count of how many scanlines for which the new segment will last.

If there is no next segment available at the indicated address, no further processing is performed on that edge. Otherwise, the edge update module 410 calculates the X coordinate for the next scanline for the edge. This typically would involve taking the current X coordinate and adding to it the DX value. The DX may have the DDX value added to it, as appropriate for the type of edge being handled. The edge is then written into any available free slot in an edge pool 412, which is an array of two or more edge records. If there is no free slot, the edge update module 410 waits for a slot to become available. Once the edge record is written into the edge pool 412, the edge update module 410 signals via a line 416 to an edge output module 414 that a new edge has been added to the edge pool 412.

As an initial condition for the rendering of a scanline, the edge output module 414 has references to each of a next main edge list 404' and a next spill edge list 406'. Each of these references is initialized to the location where the, initially empty, lists 404' and 406' may be built up. Upon receipt of the signal 416 indicating that an edge has been added to the edge pool 412, the edge output module 414 determines whether or not the edge just added has a lesser X coordinate than the edge last written to the next main edge list 404' (if any). If this is true, a "spill" is said to have occurred because the edge cannot be appended to the main edge list 404 without violating its ordering criteria. When a spill occurs, the edge is inserted into the next spill edge list 406', preferably in a manner that maintains a sorted next spill edge list 406'. For example this may be achieved using a insertion sorting routine. In some arrangements the spills may be triggered by other conditions, such as excessively large X coordinates.

If the edge added to the edge pool 412 has an X coordinate greater than or equal to the edge last written to the next main edge list 404' (if any), and there are no free slots available in the edge pool 412, the edge output module 414 selects the edge from the edge pool 412 which has the least X coordinate, and appends that edge to the next main edge list 404', extending it in the process. The slot in the edge pool 412 that was occupied by that edge is then marked as free.

Once the edge input module 408 has read and forwarded all edges from all three of its input lists 402, 404 and 406, it formats a message which indicates that the end of scanline has been reached and sends the message to both the priority determination module 500 and the edge update module 410. Upon receipt of that message, the edge update module 410 waits for any processing it is currently performing to complete, then forwards the message to the edge output module 414. Upon receipt of the message, the edge output module 414 writes all remaining edge records from the edge pool 412 to the next main edge list 404' in X order. Then, the reference to the next main edge list 404' and the main edge list 404 are exchanged between the edge input module 408 and the edge output module 414, and a similar exchange is performed for the next spill edge list 406' and the spill edge list 406. In this way the initial conditions for the following scanline are established.

Rather than sorting the next spill edge list 406' upon insertion of edge records thereto, such edge records may be merely appended to the list 406', and the list 406' sorted at the end of the scanline and before the exchange to the current spill list 406 becomes active in edge rasterization of the next scanline.

It can be deduced from the above that edge crossing messages are sent to the priority determination module 500 in scanline and pixel order (that is, they are ordered firstly on Y and then on X) and that each edge crossing message is labeled with the priority level to which it applies.

FIG. 12A depicts a specific structure of an active edge record 418 that may be created by the edge processing module 400 when a segment of an edge is received. If the first segment of the edge is a step (orthogonal) segment, the X-value of the edge is added to a variable called "X-step" for the first segment to obtain the X position of the activated edge. Otherwise, the X-value of the edge is used. The Xstep value is obtained from the segment data of the edge and is added once to the Xedge value of the next segment to obtain the X position of the edge record for that next segment. This means that the edges in the new edge record will be sorted by Xedge+Xstep. The Xstep of the first segment should, therefore, be zero, in order to simplify sorting the edges. The Y-value of the first segment is loaded into the NY field of the active edge record 418. The DX field of the active edges copied from the DX field identifier of vector or quadratic segments, and is set to zero for a step segment. A u-flag as seen in FIG. 12A is set if the segment is upwards heading (see the description relating to FIG. 13A). A d-flag is set when the edge is used as a direct clipping object, without an associated clipping level, and is applicable to closed curves. The actual priority level of the segment, or a level address is copied from the corresponding field of the new edge record into a level field in the active edge record 418. The address of the next segment in the segment list is copied from the corresponding field of the new edge record into a segment address field (segment addr) of the active edge record 418. The segment address may also be used to indicate the termination of an edge record.

It will be appreciated from FIG. 12A that other data structures are also possible, and necessary for example where polynomial implementations are used. In one alternative data structure, the 'segment addr' field is either the address of the next segment in the segment list or copied from the segments DDX value, if the segment is quadratic. In the latter case, the data structure has a q-flag which is set if the segment is a quadratic segment, and cleared otherwise. In a further variation, the segment address and the DDX field may be separated into different fields, and additional flags provided to meet alternate implementations.

Figure 12B:
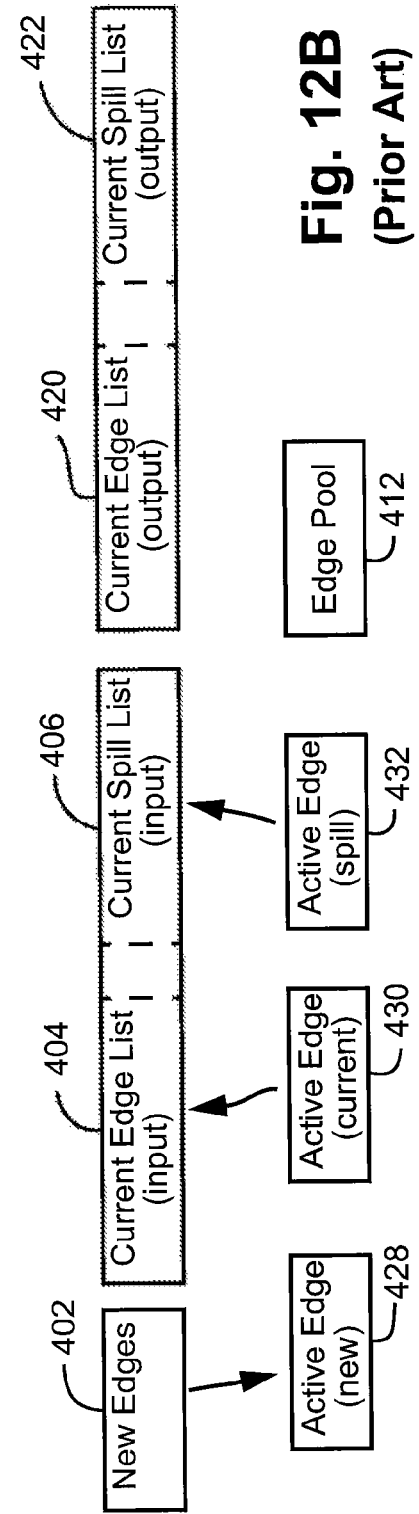
FIG. 12B depicts the arrangement of the edge records used in the edge processing module 400 of FIG. 4.

FIG. 12B depicts the arrangement of the edge records described above and used in the edge processing module 400. A new active edge record 428, a current active edge record 430 and a spill active edge record 432, supplements the edge pool 412. As seen in FIG. 12B, the records 402, 404, 406, 404' and 406' are dynamically variable in size depending upon the number of edges being rendered at any one time. Each record includes a limit value which, for the case of the new edge list 402, is determined by a SIZE value incorporated with the LOAD_EDGES_AND_RENDER instruction. When such an instruction is encountered, SIZE is checked and if non-zero, the address of the new edge record is loaded and a limit value is calculated which determines a limiting size for each of the lists 402, 404, 406, 404' and 406'.

Although the described arrangement utilizes arrays and associated pointers for the handling of edge records, other implementations, such as linked lists for example may be used. These other implementations may be hardware or software-based, or combinations thereof.

Figure 10:
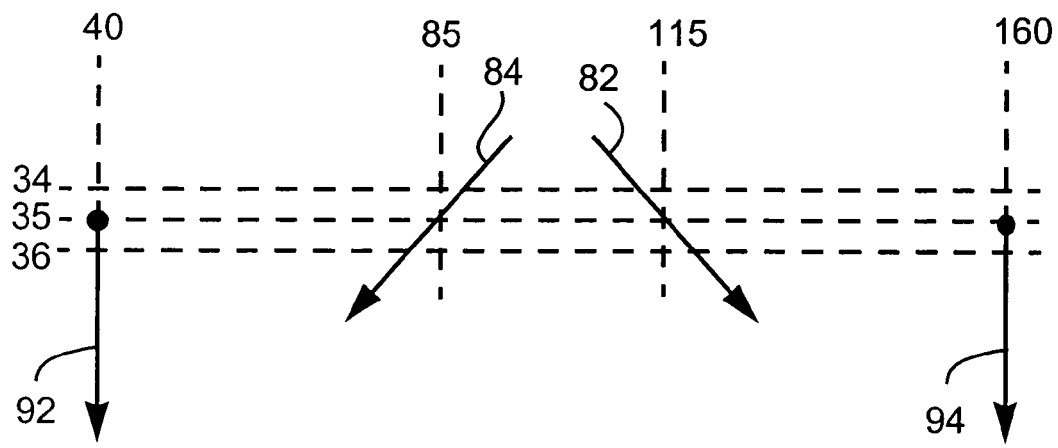
FIG. 10 illustrates the rendering of a number of scan lines of the image of FIG. 8A.
Figure 11:
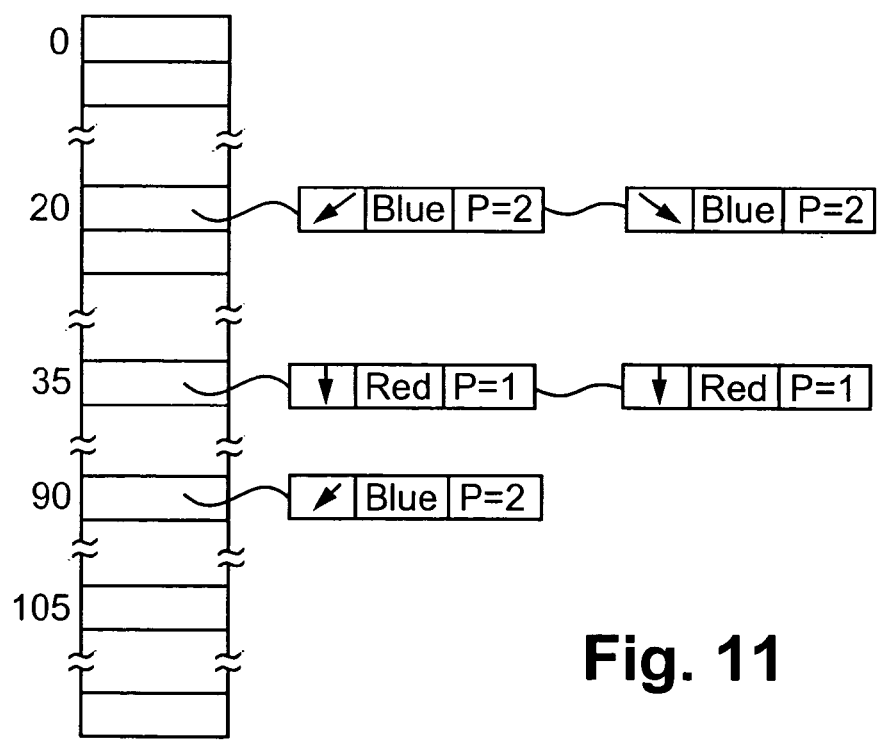
FIG. 11 depicts the arrangement of an edge record for the image of FIG. 8A.

The specific rendering of the image 78 shown in FIG. 8A will now be described with reference to scanlines 34, 35 and 36 shown in FIG. 10. In this example, the calculation of the new X coordinate for the next scanline is omitted for the purposes of clarity, with FIGS. 12C to 12I illustrating the output edge crossing being derived from one of the registers 428, 430 and 432 of the edge poll 412.

FIG. 12C illustrates the state of the lists noted above at the end of rendering scanline 34 (the top portion of the semi-transparent blue triangle 80). Note that in scanline 34 there are no new edges and hence the list 402 is empty. Each of the main edge lists 404 and next main edge list 404' include only the edges 82 and 84. Each of the lists includes a corresponding pointer 434, 436, and 440 which, on completion of scanline 34, points to the next vacant record in the corresponding list. Each list also includes a limit pointer 450, denoted by an asterisk (*) which is required to point to the end of the corresponding list. If linked lists were used, such would not be required as linked lists include null pointer terminators that perform a corresponding function.

As noted above, at the commencement of each scanline, the next main edge list 404' and the main edge list 404 are swapped and new edges are received into the new edge list 402. The remaining lists are cleared and each of the pointers set to the first member of each list. For the commencement of scanline 35, the arrangement then appears as seen in FIG. 12D. As is apparent from FIG. 12D, the records include four active edges which, from FIG. 10, are seen to correspond to the edges 92, 94, 84 and 82.

Referring now to FIG. 12E, when rendering starts, the first segment of the new edge record 402 is loaded into an active edge record 428 and the first active edge records of the main edge list 404 and spill edge list 406 are copied to records 430 and 432 respectively. In this example, the spill edge list 406 is empty and hence no loading takes place. The X-positions of the edges within the records 428, 430 and 432 are then compared and an edge crossing is emitted for the edge with the smallest X-position. In this case, the emitted edge is that corresponding to the edge 92 which is output together with its priority value. The pointers 434, 436 and 438 are then updated to point to the next record in the list.

The edge for which the edge crossing was emitted is then updated (in this case by adding DX=0 to its position), and buffered to the edge pool 412 which, in this example, is sized to retain three edge records. The next entry in the list from which the emitted edge arose (in this case list 402) is loaded into the corresponding record (in this case record 428). This is seen in FIG. 12F.

Further, as is apparent from FIG. 12F, a comparison between the registers 428, 430 and 432 again selects the edge with the least X-value which is output as the appropriate next edge crossing (X=85, P=2). Again, the selected output edge is updated and added to the edge pool 412 and all the appropriate pointers incremented. In this case, the updated value is given by X←X+DX, which is evaluated as 84=85−1. Also, as seen, the new edge pointer 434 is moved, in this case, to the end of the new edge list 402.

In FIG. 12G, the next edge identified with the lowest current X-value is again that obtained from the register 430 which is output as an edge crossing (X=115, P=2). Updating of the edge again occurs with the value be added to the edge pool 412 as shown. At this time, it is seen that the edge pool 412 is now full and from which the edge with the smallest X-value is selected and emitted to the output list 404', and the corresponding limited pointer moved accordingly.

As seen in FIG. 12H, the next lowest edge crossing is that from the register 428 which is output (X=160 P=1). The edge pool 412 is again updated and the next small X-value emitted to the output list 404'.

At the end of scanline 35, and as seen in FIG. 12I, the contents of the edge pool 412 are flushed to the output list 404' in order of smallest X-value. As seen in FIG. 12J, the next main edge list 404' and the main edge list 404 are swapped by exchanging their pointers in anticipation of rendering the next scanline 36. After the swapping, it is seen from FIG. 12J that the contents of the main edge list 404 include all edge current on scanline 36 arranged in order of X-position thereby permitting their convenient access which facilitates fast rendering.

Ordinarily, new edges are received by the edge processing module 400 in order of increasing X-position. When a new edge arrives, its position is updated (calculated for the next scanline to be rendered) and this determines further action as follows:

(a) if the updated position is less than the last X-position output on the line 498, the new edge is insertion sorted into the main spill list 406 and the corresponding limit register updated;

(b) otherwise, if there is space, it is retained in the edge pool 412.

As is apparent from the foregoing, the edge pool 412 aids in the updating of the lists in an ordered manner in anticipation of rendering the next scanline in the rasterized image. Further, the size of the edge pool 412 may be varied to accommodate larger numbers of non-ordered edges. However, it will be appreciated that in practice the edge pool 412 will have a practical limit, generally dependent upon processing speed and available memory with the graphic processing system. In a limiting sense, the edge pool 412 may be omitted which would ordinarily require the updated edges to be insertion sorted into the next output edge list 404'. However, this situation can be avoided as a normal occurrence through the use of the spill lists mentioned above. The provision of the spill lists allows the described arrangement to be implemented with an edge pool of practical size and yet handle relatively complex edge intersections without having to resort to software intensive sorting procedures. In those small number of cases where the edge pool and spill list are together insufficient to accommodate the edge intersection complexity, sorting methods may be used.

An example of where the spill list procedure is utilized is seen in FIG. 14A where three arbitrary edges 60, 61 and 63 intersect an arbitrary edge 62 at a relative position between scanlines A and B. Further, the actual displayed pixel locations 64 for each of scanlines A, B, are shown which span pixel locations C to J. In the above described example where the edge pool 412 is sized to retain three edge records, it will be apparent that such an arrangement alone will not be sufficient to accommodate three edge intersections occurring between adjacent scanlines as illustrated in FIG. 14A.

Figure 14B:
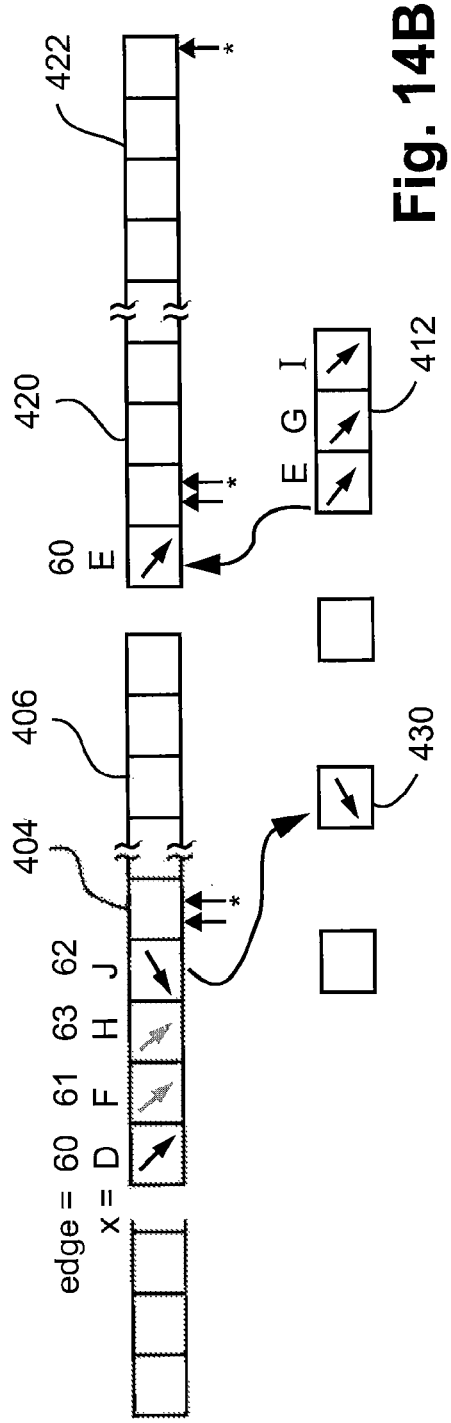

FIG. 14B shows the state of the edge records after rendering the edges 60, 61 and 63 on scanline. The edge crossing H is that most recently emitted and the edge pool 412 is full with the updated X-values E, G and I for the edges 60, 61 and 63 respectively for the next scanline, scanline B. The edge 62 is loaded into the current active edge record 430 and because the edge pool 412 is full, the lowest X-value, corresponding to the edge 60 is output to the output edge list 404'.

Figure 14C:
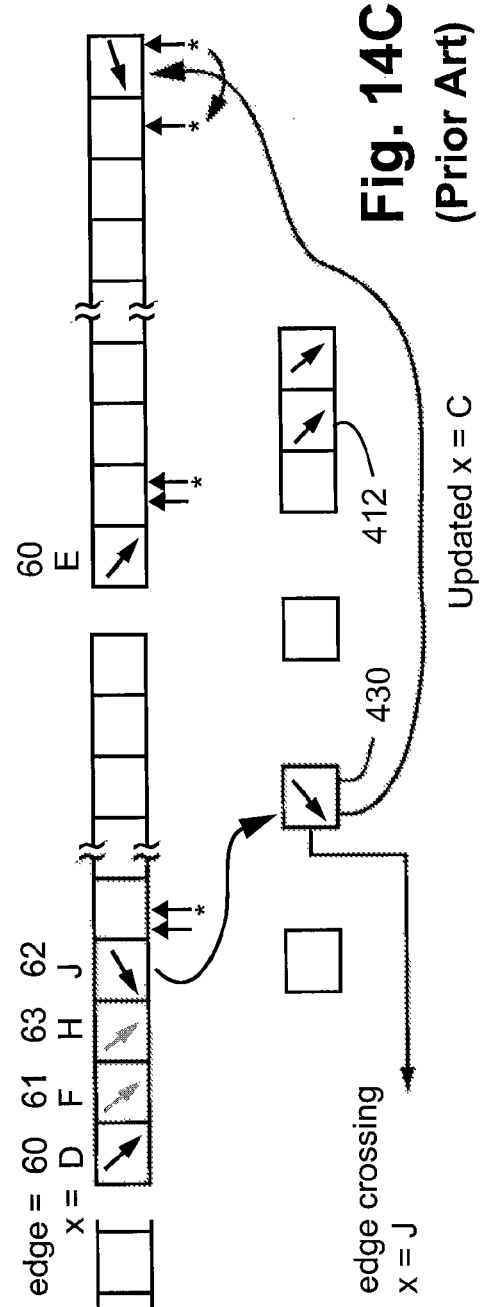

In FIG. 14C, the next edge crossing is emitted (X=J for edge 62) and the corresponding updated value determined, in this case X=C for scanline B. Because the new updated value X=C is less than the most recent value X=E copied to the output list 404', the current edge record and its corresponding new updated value is transferred directly to the output spill list 406'.

FIG. 14D shows the state of the edge records at the start of scanline B where it is seen that the main and output lists, and their corresponding spill components have been swapped. To determine the first emitted edge, the edge 60 is loaded into the current active edge register 430 and the edge 62 is loaded into the spill active edge register 432. The X-values are compared and the edge 62 with the least X-value (X=C) is emitted, updated and loaded to the edge pool 412.

Edge emission and updating continues for the remaining edges in the main edge list 404 and at the end of the scanline, the edge pool 412 is flushed to reveal the situation shown in FIG. 14E, where it is seen that each of the edges 60 to 63 are appropriately ordered for rendering on the next scanline, having been correctly emitted and rendered on scanline B.

As will be apparent from the foregoing, the spill lists provide for maintaining edge rasterization order in the presence of complex edge crossing situations. Further, by virtue of the lists being dynamically variable in size, large changes in edge intersection numbers and complexity may be handled without the need to resort to sorting procedures in all but exceptionally complex edge intersections.

Preferably, the edge pool 412 is sized to retain eight edge records and the lists 404, 404' together with their associated spill lists 406, 406' have a base (minimum) size of 512 bytes which is dynamically variable thereby providing sufficient scope for handling large images with complex edge crossing requirements.

3.3 Priority Determination Module

Figure 5:
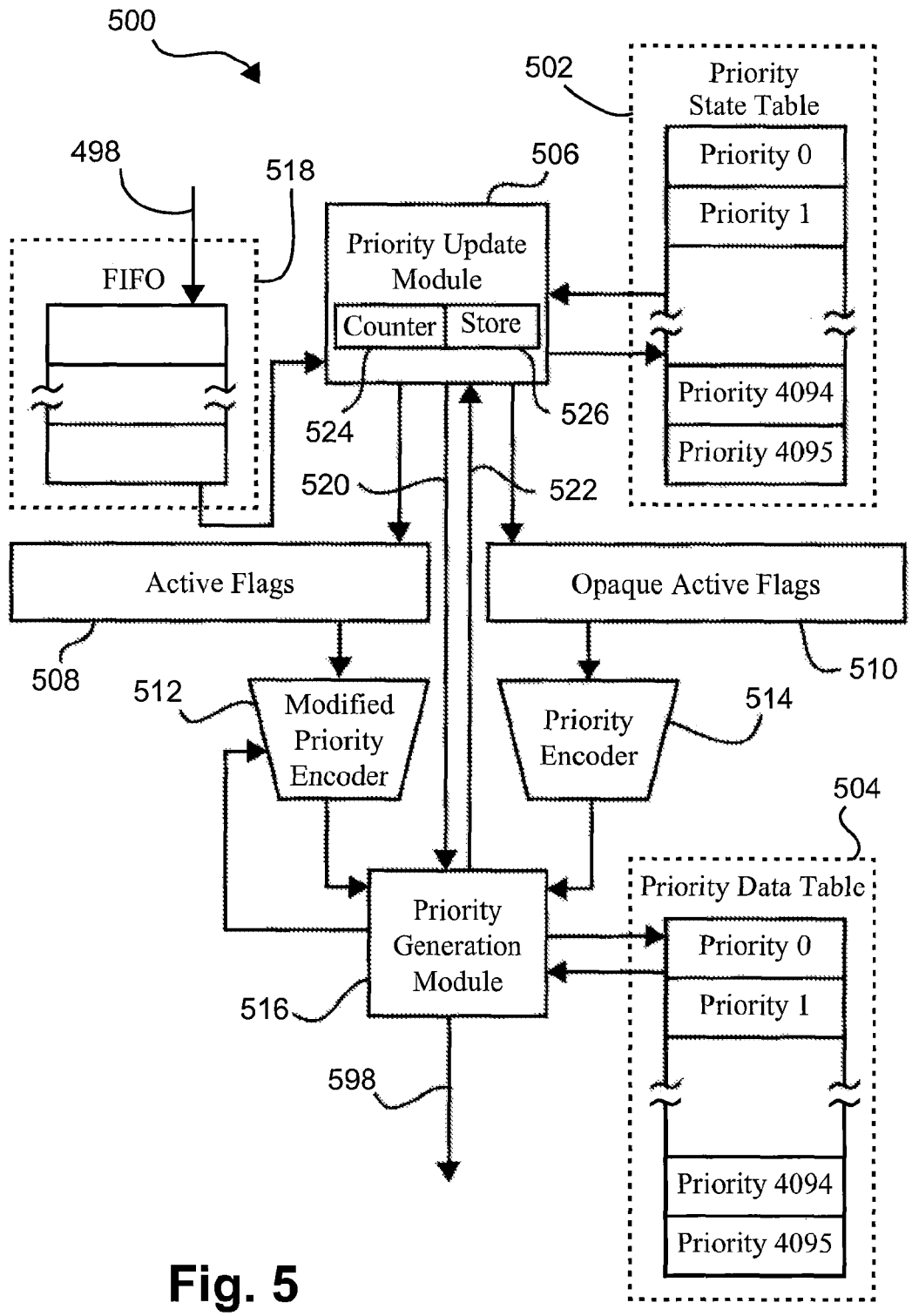
FIG. 5 is a schematic functional representation of the priority determination module of FIG. 3.

The operation of the priority determination module 500 will now be described with reference to FIG. 5. The primary function of the priority determination module 500 is to determine those objects that make a contribution to a pixel currently being scanned, order those contributing objects in accordance with their priority levels, and generate color composite messages for instructing the pixel compositing module 700 to composite the ordered objects to generate the required color and opacity for the current pixel.

The priority determination module 500 receives incoming messages 498 from the edge processing module 400. These incoming messages may include load priority data messages, load fill data messages, edge crossing messages, and end of scanline messages. These messages first pass through a first-in first-out (FIFO) buffer 518 before being read by a priority update module 506. The FIFO 518 acts to de-couple the operation of the edge processing module 400 and the priority determination module 500. Preferably the FIFO 518 is sized to enable the receipt from the edge processing module 400 and transfer of a full scanline of edge-crossings in a single action. Such permits the priority determination module 500 to correctly handle multiple edge-crossings at the same pixel (X) location.

The priority determination module 500 is also adapted to access a priority state table 502, and a priority data table 504. These tables are used to hold information about each priority. Preferably, the priority state and priority data tables 502, 504 are combined in memory as a single level activation table 530, as shown in FIG. 18. Alternatively these tables 502, 504 can be kept separate.

Preferably, the priority properties and status table 34 includes at least the following fields as shown in FIG. 18 for each priority level:

(i) a fill-rule flag (FILL_RULE_IS_ODD_EVEN) which indicates whether this priority is to have its inside versus outside state determined by the application of the odd-even fill rule or the non-zero winding fill rule;

(ii) a fill counter (FILL COUNT) for storing a current fill count which is modified in a manner indicated by the fill rule each time an edge effecting this priority is crossed;

(iii) a clipper flag (CLIPPER) which indicates whether this priority is to be used for clipping or filling;

(iv) a clip type flag (CLIP_OUT) which, for edges which have the clipper flag set, records whether the clipping type is a "clip-in" or a "clip-out";

(v) a clip counter (CLIP COUNT) for storing a current clip count which is decremented and incremented when a clip-in type clip region effecting this priority is entered and exited respectively, and incremented and decremented when a clip-out type clip region effecting this priority is entered and exited respectively; and (vi) a flag (NEED_BELOW) which records whether this priority requires levels beneath it to be calculated first, referred to as the "need-below" flag.

(vii) a fill table address (FILL INDEX), which point to an address where the fill of the priority is stored;

(viii) a fill type (FILL TYPE), (ix) a raster operation code (COLOR_OP), (x) an alpha channel operation code (ALPHA_OP) consisting of three flags (LAO_USE_D_OUT_S, LAO_USE_S_OUT_D and LAO_USE_S_ROP_D), (xi) a stack operation code (STACK_OP), and (xii) a flag (X_INDEPENDENT) which records whether the color of this priority is constant for a given Y, referred to here as the "x-independent" flag; and (xiii) other information (ATTRIBUTES) of the priority.

Clipping objects are known in the art and act not to display a particular new object, but rather to modify the shape of an another object in the image. Clipping objects can also be turned-on and turned-off to achieve a variety of visual effects.

For example, the object 80 of FIG. 8A could be configured as a clipping object acting upon the object 90 to remove that portion of the object 90 that lies beneath the clipping object 80. This may have the effect of revealing any object or image beneath the object 90 and within the clipping boundaries that would otherwise be obscured by the opacity of the object 90. The CLIPPER flag is used to identify whether the priority is a clipping object. Also, the CLIP flag is used to determine whether the priority is a clip-in or a clip-out, and the CLIP COUNT is used in a similar fashion to FILL COUNT to determine whether the current pixel is within the clip region.

FIGS. 13A and 13B demonstrate the application of the odd-even and non-zero winding rules, for activating objects. The relevant rule to be used is determined by means of the fill-rule flag FILL_RULE_IS_ODD_EVEN.

For the purposes of the non-zero winding rule, FIG. 13A illustrates how the edges 71 and 72 of an object 70 are allocated a notional direction, according to whether the edges are downwards-heading or upwards-heading respectively. In order to form a closed boundary, edges link nose-to-tail around the boundary. The direction given to an edge for the purposes of the fill-rule (applied and described later) is independent of the order in which the segments are defined. Edge segments are defined in the order in which they are tracked, corresponding to the rendering direction.

FIG. 13B shows a single object (a pentagram) having two downwards-heading edges 73 and 76, and three upwards-heading edges 74, 75 and 77. The odd-even rule operates by simply toggling a Boolean value in the FILL COUNT as each edge is crossed by the scanline in question, thus effectively turning-on (activating) or turning-off (de-activating) an object's color. The non-zero winding rule increments and decrements a value stored in the fill counter FILL COUNT dependent upon the direction of an edge being crossed. In FIG. 13B, the first two edges 73 and 76 encountered at the scanline are downwards-heading and thus traversal of those edge increment the fill counter, to +1 and +2 respectively. The next two edges 74 and 77 encountered by the scanline are upwards-heading and accordingly decrement the fill counter FILL COUNT, to +1 and 0 respectively. The non-zero winding rule operates by turning-on (activating) an object's color when the fill counter FILL COUNT is non-zero, and turning-off (de-activating) the object's color when the fill counter FILL COUNT is zero.

The NEED_BELOW flag for a priority is established by the driver software and is used to inform the pixel generating system that any active priorities beneath the priority in question do not contribute to the pixel value being rendered, unless the flag is set. The flag is cleared where appropriate to prevent extra compositing operations that would otherwise contribute nothing to the final pixel value.

The raster operation code (COLOR_OP), alpha channel operation (ALPHA_OP) and stack operation (STACK_OP) together form the pixel operation (PIXEL_OP), that is to be performed by the pixel compositing module 700 on each pixel where the priority is active and exposed.

Preferably, most of the information contained in the combined table 34 is directly loaded by instructions from the driver software. In particular, the fill-rule flag, the clipper flag, the clip type flag, and the need-below flag, fill table address, fill type, raster operation, code, alpha channel operation code, stack operation code, x_independent flag, and other attributes may be handled in this manner. On the other hand, the fill counter, and clip counter are initially zero and are changed by the priority determination module 500 in response to edge crossing messages.

The priority determination module 500 determines that a priority is active at a pixel if the pixel is inside the boundary edges which apply to the priority, according to the fill-rule for that priority, and the clip count for the priority. A priority is exposed if it is the uppermost active priority, or if all the active priorities above it have their corresponding need-below flags set. In this fashion, pixel values may be generated using only the fill data of the exposed priorities. It is important to note that an object's priority designates the level location of the object in the z-order of the objects from the rearmost object to the foremost object. Preferably, a number of non-overlapping objects that have the same fill and compositing operation, and that form a contiguous sequence, may be designated as having the same priority. This effectively saves memory space in the fill table. Furthermore, the corresponding edge records of objects need only reference the corresponding priority in order to reference the corresponding fill and compositing operation.

Returning now to FIG. 5, the priority update module 506 maintains a counter 524 which records the scanline intersection coordinate up to which it has completed processing. This will be referred to as the current X of the priority update module 506. The initial value at the start of a scanline is zero.

Upon examining an edge crossing message received at the head of the FIFO 518, the priority update module 506 compares the X intersection value in the edge crossing message with its current X. If the X intersection value in the edge crossing message is less than or equal to the current X, the priority update module 506 processes the edge crossing message. Edge crossing message processing comes in two forms. "Normal edge processing" (described below) is used when the record in the priority state table 502 indicated by the priority in the edge crossing message has a clipper flag which indicates that this is not a clip priority. Otherwise, "clip edge processing" (described below) is performed.

"Normal edge processing" includes, for each priority in the edge crossing message and with reference to fields of the record of combined table 34 indicated by that priority, the steps of:
  (i) noting the current fill count of the current priority;
  (ii) either:
    (a) if the fill rule of the current priority is odd-even, setting the fill count to zero if it is currently non-zero, else setting it to any non-zero value, or
    (b) if the fill rule of the current priority is non-zero winding, incrementing or decrementing (depending on the edge direction flag) the fill count; and
  (iii) comparing the new fill count with the noted fill count and if one is zero and the other is non-zero performing an "active flag update" (described below) operation on the current priority.

Some arrangements may use a separate edge crossing message for each priority rather than placing a plurality of priorities in each edge crossing message.

An active flag update operation includes first establishing a new active flag for the current priority. The active flag is non-zero if the fill count for the priority in the priority state table 502 is non-zero and the clip count for the priority is zero, else the active flag is zero. The second step in the active flag update operation is to store the determined active flag in an active flags array 508 at the position indicated by the current priority, then if the need-below flag in the priority state table for the current priority is zero, also storing the active flag in an opaque active flags array 510 at the position indicated by the current priority.

"Clip edge processing" includes, with reference to fields of the priority state table record indicated by the first priority in the edge crossing message, the steps of:
  (i) noting the current fill count of the current priority;
  (ii) either:
    (a) if the fill rule of the current priority is odd-even, setting the fill count to zero if it is currently non-zero else setting it to any non-zero value, or
    (b) if the fill rule of the current priority is non-zero winding, incrementing or decrementing (depending on the edge direction flag) the fill count; and
  (iii) comparing the new fill count with the noted fill count and determining a clip delta value of:
    (a) zero, if both the new fill count is zero and the noted fill count is zero, or both the new fill count is non-zero and the noted fill count is non-zero,
    (b) plus one, if the clip type flag of the current priority is clip-out and the noted fill count is zero and the new fill count is non-zero, or the clip type flag of the current priority is clip-in and the noted fill count is non-zero and the new fill count is zero, or otherwise,
    (c) minus one; and
  (iv) for every subsequent priority after the first in the edge crossing message, add the determined clip delta value to the clip count in the record in the priority state stable indicated by that subsequent priority, and if the clip count either moved from non-zero to zero, or from zero to non-zero in that process, performing an active flag update operation as described above on that subsequent priority. It should be noted that the initial value of each clip count is set by the LOAD_PRIORITY_PROPERTIES instruction described previously. The clip count is typically initialized to the number of clip-in priorities, which affect each priority.

Some arrangements do not associate a priority with a clip, but instead directly increment and decrement the clip count of all priorities given in the edge crossing message. This technique can be used, for example, when clip shapes are simple and do not require the application of a complex fill rule. In this specific application, the clip count of the level controlled by an edge is incremented for an upwards heading edge or decremented for a downwards heading edge. A simple closed curve, described anticlockwise, acts a clip-in, whereas a simple closed curve, described clockwise, acts as a clip-out.

When the X intersection value in the edge crossing message is greater than the current X of the priority update module 506, the priority update module 506 forms a count of how many pixels to generate, being the difference between the X intersection value in the edge crossing message and the current X, this count is formatted into a priority generation message, which is sent via a connection 520 to a priority generation module 516. The priority update module 506 then waits for a signal 522 from the priority generation module 516 indicating that processing for the given number of pixels has completed. Upon receipt of the signal 522, the priority update module 506 sets its current X to the X intersection value in the edge crossing message and continues processing as described above.

Upon receipt of a priority generation message 520, the priority generation module 516 performs a "pixel priority generation operation" (described below) a number of times indicated by the count it has been supplied, thereupon it signals 522 the priority update module 506 that it has completed the operation.

Each pixel priority generation operation includes firstly using a priority encoder 514 (eg. a 4096 to 12 bit priority encoder) on the opaque active flags array 510 to determine the priority number of the highest opaque active flag. This priority (if any) is used to index the priority data table 504 and the contents of the record so referenced is formed into a fill priority message output 598 from the priority generation module 516 and sent to the fill color determination module 600. Further, if a priority was determined by the previous step (ie. there was at least one opaque active flag set), the determined priority is held, and is referred to as the "current priority". If no priority was determined the current priority is set to zero. The priority generation module 516 then repeatedly uses a modified priority encoder 512 on the active flag array 508 to determine the lowest active flag which is greater than the current priority. The priority so determined (if any) is used to index the level activation table 530 and the contents of the record so referenced is formed into a fill priority message. This fill priority message is then sent via the output 598 to the fill color determination module 600, then the determined priority is used to update the current priority. This step is used repeatedly until there is no priority determined (that is, there is no priority flagged in the active flags which is greater than the current priority). Then the priority generation module 516 forms an end of pixel message and sends it to the fill color determination module 600. The priority determination module 500 then proceeds to the next pixel to generate another series of fill priority messages in similar fashion.

Figure 22A:
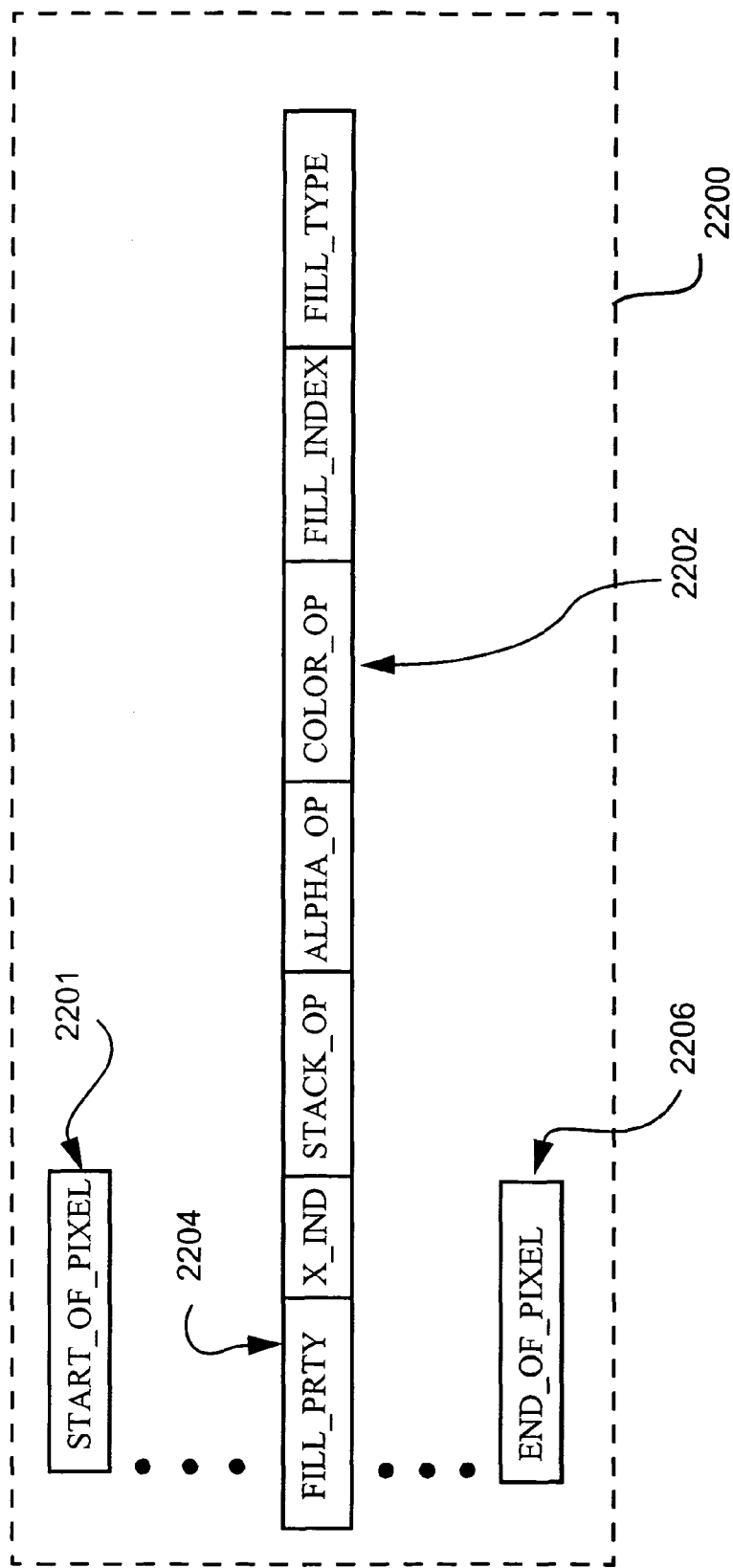
FIG. 22A shows a series of fill priority messages generated by the priority determination module 500.

Turning now to FIG. 22A, there is shown an example of such a series of fill priority messages 2200 generated by the priority determination module 500 for a single current pixel. As described above, these fill priority messages 2202 are first preceded by a START_OF_PIXEL command 2201. The fill priority messages 2202 are then sent in priority order commencing with the lowest exposed active priority level. When there are no more fill priority messages 2202 for the current pixel, the priority determination module 500 then sends an END_OF_PIXEL message 2206.

Each of one these fill priority messages 2202 preferably includes at least the following fields:

(i) An identifier code FILL_PRTY 2204 for identifying the message as a fill priority message. This code also includes an index LEVEL_INDEX to the corresponding record in the level activation table 530, and also a code FIRST_PIXEL indicating whether or not this fill priority message belongs to a first pixel in a run of pixels having the same fill priority messages. The priority determination module 500 asserts the FIRST_PIXEL code for all those fill priority messages of a currently scanned pixel that is intersected by an edge as indicated by the edge crossing messages. The FIRST_PIXEL code is de-asserted for all fill priority messages of a currently scanned pixel if there are no edges intersecting that pixel as indicated by the edge crossing messages.
(ii) A fill table address FILL_INDEX,
(iii) A fill type FILL_TYPE,
(iv) A raster operation code COLOR_OP,
(v) An alpha channel operation code ALPHA_OP,
(vi) A stack operation code STACK_OP, and
(vii) A flag X_IND which records whether the color of this priority is constant for a given Y, referred to here as the "x-independent" flag. This flag is asserted when the color for this priority is constant.

The values of fields (ii) to (vii) for the fill priority message are retrieved from the corresponding record in the combined table 530.

Preferably, the priority generation module 516 notes the value of the x-independent flag of each fill priority message that it forwards to the fill color determination module 600 while it processes the first pixel of a sequence. If all the forwarded messages have the x-independent flag specified, all subsequent messages in the span of pixels between adjacent edge intersections can be replaced by a single repeat specification of count minus one. This is done by producing a repeat message and sending it to the fill color determination module 600 in place of all further processing in this sequence. It will be appreciated that if all the fill priority messages of a first pixel in a span of pixels between adjacent edges have their x-independent flag asserted, then the color and opacity of the pixels in the span of pixels will be constant. Thus in these cases, the pixel compositing module 700 need only composite the first pixel in the span of pixels to generate the required constant color and opacity and pass this onto the pixel output module 800. The generated repeat command is then passed to the pixel output module 800 which reproduces the constant color and opacity for the subsequent pixels in the span of pixels from the color and opacity of the first pixel. In this fashion, the number of compositing operations performed by the pixel compositing module 700 is reduced.

As another preferred feature to the basic operation described above, the priority generation module 516 sends the highest opaque priority via the connection 522 to the priority update module 506 after each edge crossing message. The priority update module 506 holds this in a store 526. The priority determination module 506 then, instead of a simple test that the X intersection in the message is greater than the current X, performs a test that the X intersection in the message is greater than the current X and that at least one of the levels in the message is greater than or equal to the highest opaque priority, before producing a fill priority message. By doing this, fewer pixel priority determination operations may be done and longer repeat sequences may be generated.

Figure 9B:
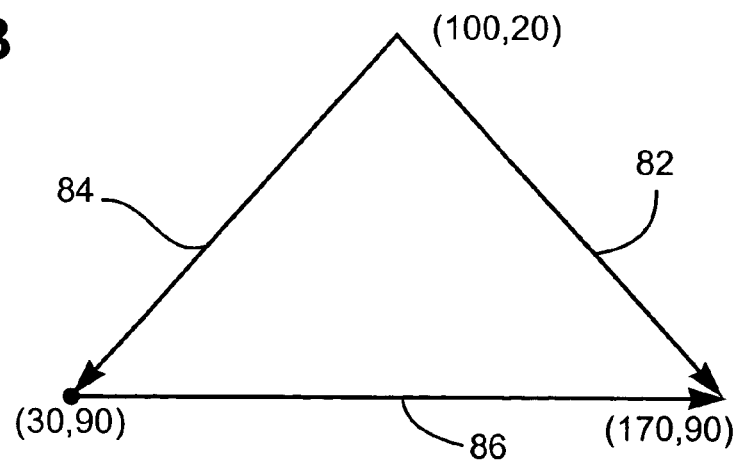

Using the example of the graphic objects shown in FIGS. 8A, 9A and 9B, the priority update process described above can be illustrated, for scanline 35 using the edge crossings seen from FIGS. 12C to 12J, as seen in FIGS. 15A to 15E.

FIGS. 15A to 15E illustrate operation of the priority tables 502 and 504 which, in a preferred implementation are merged into a single table (see FIG. 18), referred to as the level activation table (LAT) 530 and which is depicted together with arrays 508, 510 and encoders 512 and 514.

As seen in FIG. 15A, edge crossing messages are received in order for a scanline from the edge processing module 400 and are loaded into the table 530, which is arranged in priority order. The edge crossing messages include, in this example, an incrementing direction according to the non-zero winding rule of the edge traversal. It is possible for no entries in the level activation table 530 to be set.

The level activation table 530 includes column entries for fill count, which are determined from the edge according to the non-zero winding rule or, where appropriate, the odd-even rule. The need-below flag is a property of a priority and is set as part of the LOAD_PRIORITIES_PROPERTIES instruction. The need-below is set for all priority levels when the table 530 is loaded. Other columns such as "clip count" and "fill index table" may be used, but for this example are omitted for simplicity of explanation. Where no level is active the corresponding entries are set to zero. Further, the values of the arrays 510 and 508 are updated from the table 530 after receiving a subsequent edge crossing.

From FIG. 15A, it will be apparent that, for convenience, a number of records have been omitted for clarity. As described previously, the contents of the table 530, where not used in the priority determination module 500, are passed as messages to each of the fill color determination module 600 for pixel generation, and to the pixel compositing module 700 for compositing operations.

The first edge crossing for scanline 35 (FIG. 12E) is seen in FIG. 15A where for P=1, the fill count is updated to the value of the edge according to the non-zero winding rule. The "need-below" flag for this level has been set to zero by the driver software as the object in question is opaque.

Because a previous state of the table 530 was not set, the arrays 510 and 508 remain not set and the priority encoder 514 is disabled from outputting a priority. This is interpreted by priority generation module 516 which outputs a count n=40 (pixels) for a "no object" priority (eg: P=0), being the first, blank, portion of the scanline 35.

FIG. 15B shows the arrangement when the edge crossing of FIG. 12F is received. The fill count is updated. The arrays 510 and 508 are then set with the previous highest level from the table 530. At this time, the module 516 outputs a count n=45, P=1 representing the edge 96 of the opaque red object 90 before intersection with the semitransparent triangle 80.

FIG. 15C shows the arrangement when the edge crossing of FIG. 12G is received. Note that the fill count has been adjusted downwardly because of the non-zero winding rule. Because the object that is valid prior to receiving the current edge crossing is not opaque, the modified priority encoder 512 is used to select the priority P=2 as the highest active level which is output as is current for n=(115−85)=30 pixels.

FIG. 15D shows the arrangement when the edge crossing of FIG. 12H is received. Note that previously changed "need-below" for P=2 has been transferred to the active array 508, thus permitting the priority encoder to output a value P=1 current for n=(160−115)=45 pixels.

Figure 15E:
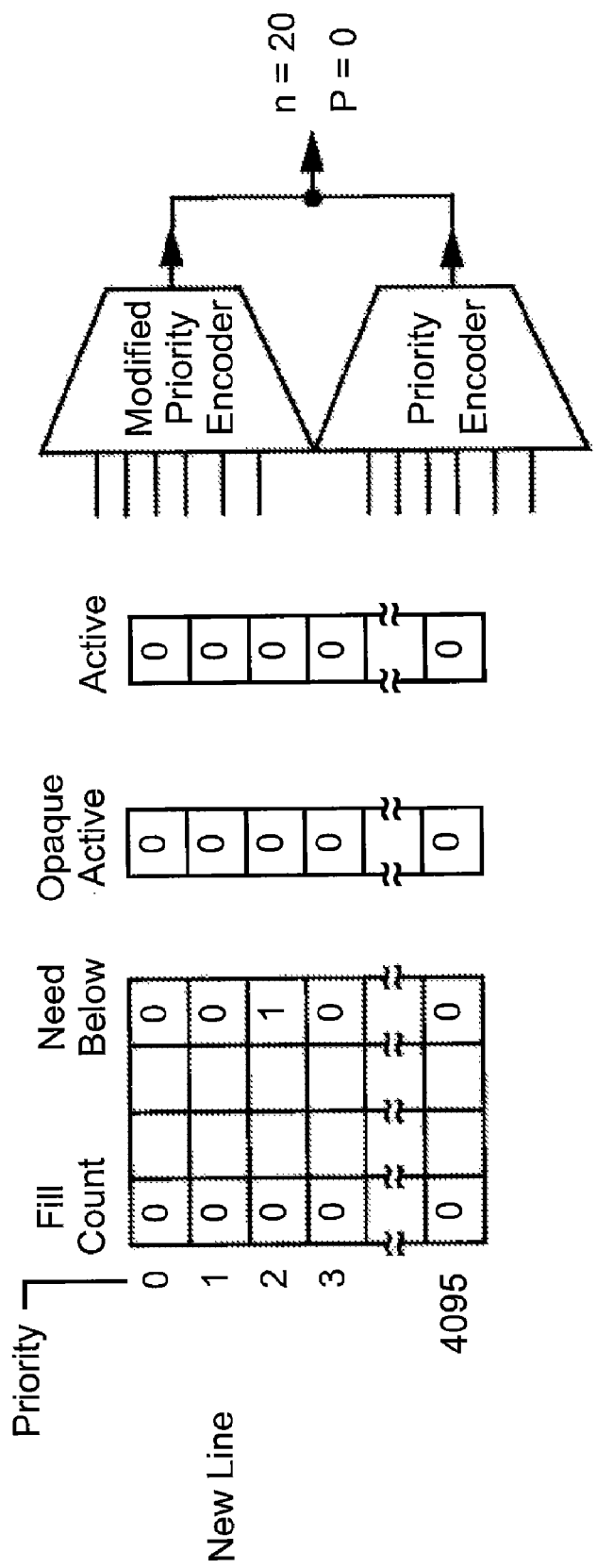

FIG. 15E shows the result when the edge crossing of FIG. 12I is received, providing for an output of P=0 for n=(180−160)=20 pixels.

As such, the priority module 500 outputs counts of pixels and corresponding priority display values for all pixels of a scanline.

The foregoing describes how the Priority Determination Module 500 calculates the active priorities for each edge crossing message received from the Edge Processing Module 400. In a further arrangement, described in Section 4.0, a list of contributing active levels as calculated by the module 500 is cached with the edges. If certain conditions are met on subsequent scanlines, the module 500 does not have to calculate a new list of active levels for the subsequent scanlines, but may instead retrieve the cached list. In this case, the operations of the priority generation module 516 are replaced by a single 'retrieve' operation.

3.4 Fill Color Determination Module

Figure 6:
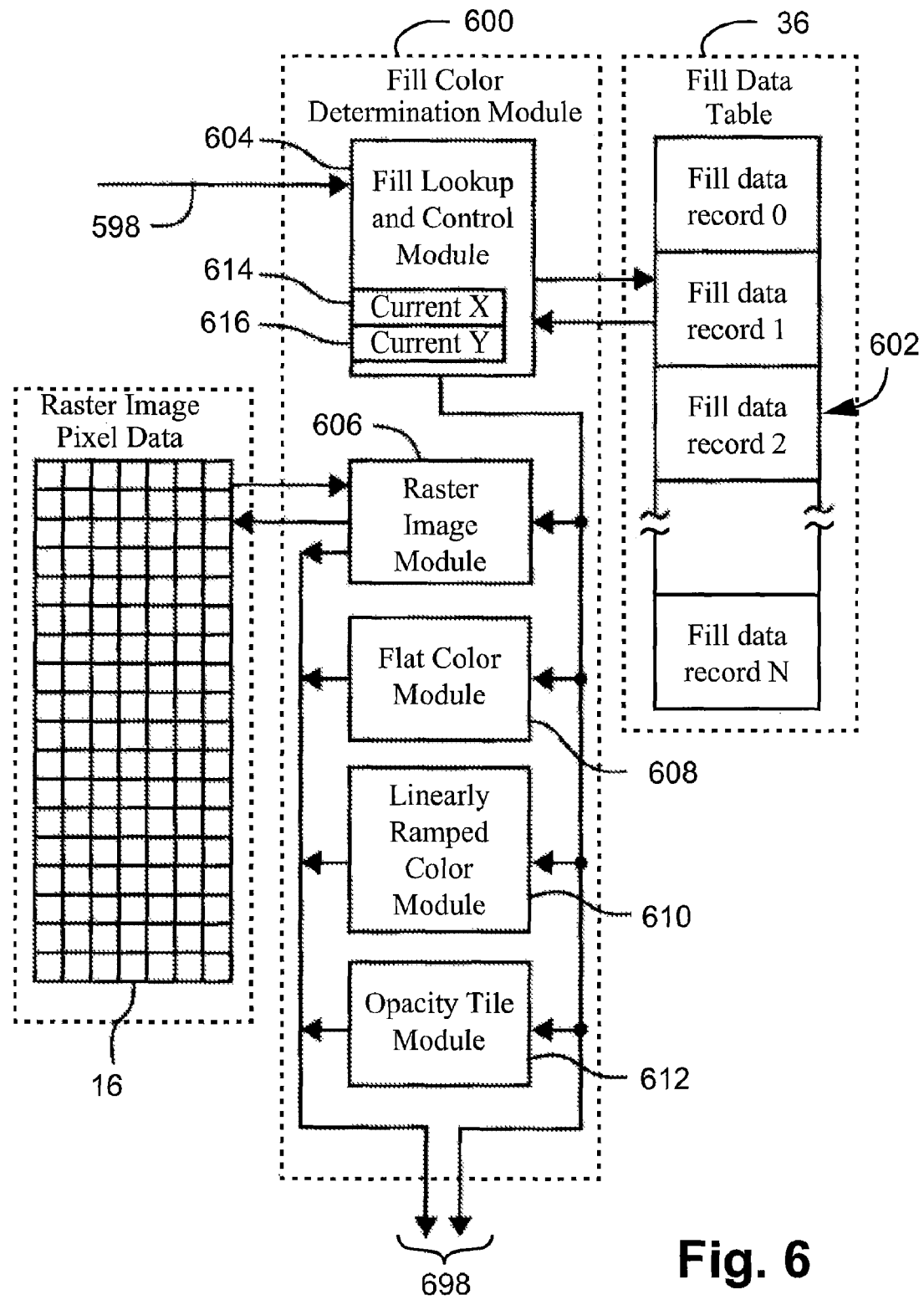
FIG. 6 is a schematic functional representation of the fill color determination module of FIG. 3.

The next module in the pipeline is the fill color determination module 600, the operation of which will now be described with reference to FIG. 6. Incoming messages 598 from the priority determination module 500, which include set fill data messages, repeat messages, fill priority messages, end of pixel messages, and end of scanline messages, first pass to a fill lookup and control module 604. The fill lookup and control module 604 maintains a current X position counter 614 and a current Y position counter 616 for use by various components of the fill color determination module 600.

Upon receipt of an end of scanline message, the fill lookup and control module 604 resets the current X counter 614 to zero and increments the current Y counter 616. The end of scanline message is then passed to the pixel compositing module 700.

Upon receipt of a set fill data message, the fill lookup and control module 604 stores the data in the specified location 602 of the fill data table 36.

Upon receipt of a repeat message, the fill lookup and control module 604 increments the current X counter 614 by the count from the repeat message. The repeat message is then passed to the pixel compositing module 700.

Upon receipt of an end of pixel message 2202, the fill lookup and control module 604 again increments the current X counter 614, and the end of pixel message is then passed to the pixel compositing module 700.

Upon receipt of a fill priority message, the fill lookup and control module 604 performs operations which include:

(i) the fill type from the fill priority message is used to select a record size in the fill data table 36;

(ii) the fill table address from the fill priority message, and the record size as determined above, is used to select a record from the fill data table 36;

(iii) the fill type from the fill priority message is used to determine and select a sub-module to perform generation of the fill color. The sub-modules may include a raster image module 606, a flat color module 608, a linearly ramped color module 610, and an opacity tile module 612;

(iv) the determined record is supplied to the selected sub-module 606-612;

(v) the selected sub-module 606-612 uses the supplied data to determine a color and opacity value;

(vi) the determined color and opacity is combined with remaining information from the fill color message, namely the raster operation code, the alpha channel operation code, the stack operation code, to form a color composite message 2208, which is sent to the pixel compositing module 700 via the connection 698.

Figure 22B:
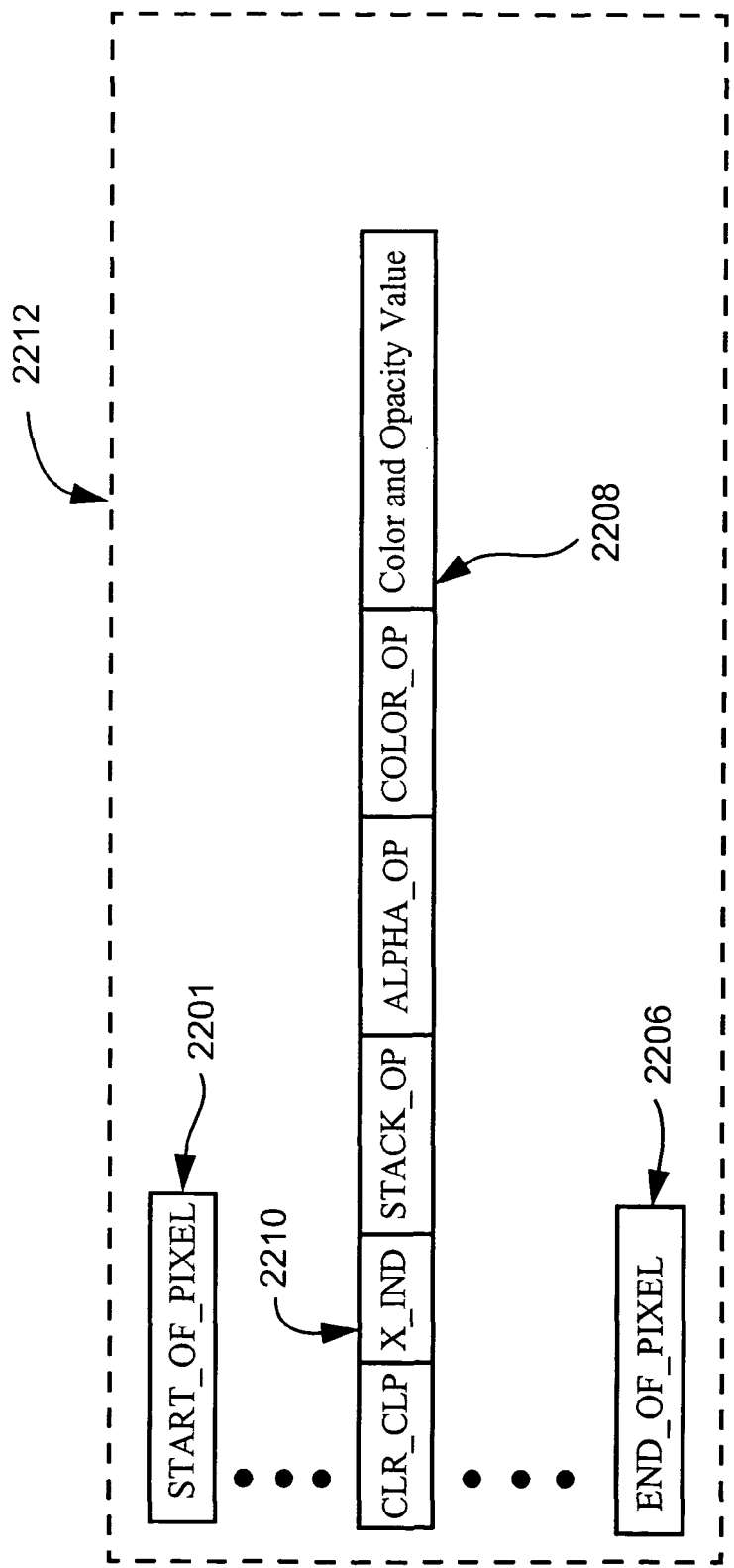
FIG. 22B shows a series of color composite messages generated by the fill color determination module 600.

Thus, a message sequence 2200 of FIG. 22A starting with a start of pixel message 2201 message, then fill priority messages 2202 followed by an end of pixel message 2206 is transformed into a message sequence 2212 of FIG. 22B comprising a start of pixel message 2201, color composite messages 2208 followed by an end of pixel message 2206. These color composite messages 2202 preferably includes the same fields as the fill priority messages 2202, with the following exceptions:

(i) code CLR_CMP 2210 for identifying the message as a color composite message. This CLR_CMP code also includes the index to the corresponding record in the level activation table 530;

(ii) a color and opacity field for containing the color and opacity value of the priority. The latter replaces the fill index and fill type fields of the fill priority messages; and In the preferred arrangement, the determined color and opacity is a red, green, blue and opacity quadruple with 8-bit precision in the usual manner giving 32 bits per pixel. However, a cyan, magenta, yellow and black quadruple with an implied opacity, or one of many other known color representations may alternatively be used. The red, green, blue and opacity case is used in the description below, but the description may also be applied to other cases.

The operation of the raster image module 606, the flat color module 608, the linearly ramped color module 610, and the opacity tile module 612 will now be described.

The flat color module 608 interprets the supplied record as a fixed format record containing three 8-bit color components (typically interpreted as red, green and blue components) and an 8-bit opacity value (typically interpreted as a measure of the fraction of a pixel which is covered by the specified color, where 0 means no coverage, that is complete transparency, and 255 means complete coverage, that is, completely opaque). This color and opacity value is output directly via the connection 698 and forms the determined color and opacity without further processing.

The linearly ramped color module 610 interprets the supplied record as a fixed format record containing four sets of three constants, cx, cy, and d, being associated with the three color and one opacity components. For each of these four sets, a result value r is computed by combining the three constants with the current X count, x, and the current Y count, y, using the formula:

$$r=\text{clamp}(cx*x+cy*y+d)$$

Where the function "clamp" is defined as:

$$\text{clamp}(x) = \begin{cases} 255 & 255 < x \\ \lfloor x \rfloor & 0 <= x <= 255 \\ 0 & x < 0 \end{cases}$$

The four results so produced are formed into a color and opacity value. This color and opacity value is output directly via the connection 698 and forms the determined color and opacity without further processing.

The opacity tile module 612 interprets the supplied record as a fixed format record containing three 8-bit color components, an 8-bit opacity value, an integer X phase, (px), a Y phase, (py), an X scale, (sx), a Y scale, (sy), and a 64 bit mask. These values originate in the display list generation and contained typically in the original page description. A bit address, a, in the bit mask, is determined by the formula:

$$\text{ti } a=((x/2^{sx}+px) \bmod 8)+((y/2^{sy}+py) \bmod 8) \times 8$$

The bit at the address "a" in the bit mask is examined. If the examined bit is one, the color and opacity from the record is copied directly to the output of the module 612 and forms the determined color and opacity. If the examined bit is zero, a color having three zero component values and a zero opacity value is formed and output as the determined color and opacity.

The raster image module 606 interprets the supplied record as a fixed format record containing six constants, a, b, c, d, tx, and ty; an integer count of the number of bits (bpl) in each raster line of the raster image pixel data 16 to be sampled; and a pixel type. The pixel type indicates whether the pixel data 16 in the raster image pixel data is to be interpreted as one of:

(i) one bit per pixel black and white opaque pixels;
(ii) one bit per pixel opaque black or transparent pixels;
(iii) 8 bits per pixel grey scale opaque pixels;
(iv) 8 bits per pixel black opacity scale pixels;
(v) 24 bits per pixel opaque three color component pixels; or
(vi) 32 bits per pixel three color component plus opacity pixels.

Many other formats are possible.

The raster image module 606 uses the pixel type indicator to determine a pixel size (bpp) in bits. Then a bit address, a, in the raster image pixel data 16 is calculated having the formula:

$$a=bpp*\lfloor a*x+c*y+tx \rfloor + bpl*\lfloor b*x+d*y+ty \rfloor$$

A pixel interpreted according to the pixel type from the record 602 is fetched from the calculated address "a" in the raster image pixel data 16. The pixel is expanded as necessary to have three eight bit color components and an eight bit opacity component. By "expanded", it is meant for example, that a pixel from an eight bit per pixel grey scale opaque raster image would have the sampled eight bit value applied to each of the red, green and blue component, and the opacity component set to fully opaque. This then forms the determined color and opacity output 698 to the pixel compositing module 700.

As a consequence, the raster pixel data valid within a displayable object is obtained through the determination of a mapping to the pixel image data within the memory 16. This effectively implements an affine transform of the raster pixel data into the object-based image and is more efficient than prior art methods which transfer pixel data from an image source to a framestore where compositing with graphic object may occur.

As a preferred feature to the above, interpolation between pixels in the raster image pixel data 16 may optionally be performed by first calculating intermediate results p, and q according to the formulae:

$$p=a*x+c*y+tx$$

$$q=b*x+d*y+ty$$

Next the bit addresses, a00, a01, a10, and a11, of four pixels in the raster image pixel data 16 are determined according to the formulae:

$$a00=bpp*\lfloor p \rfloor + bpl*\lfloor q \rfloor$$

$$a01=a00+bpp$$

$$a10=a00+bpl$$

$$a11=a00+bpl+bpp$$

Next, a result pixel component value, r, is determined for each color and opacity component according to the formula:

$$r=\text{interp}(\text{interp}(\text{get}(a00),\text{get}(a01),p),\text{interp}(\text{get}(a10),\text{get}(a11),p),q)$$

where the function "interp" is defined as:

$$\text{interp}(a,b,c)=a+(b-a)*(c-\lfloor c \rfloor)$$

In the above equations, the representation $\lfloor \text{value} \rfloor = \text{floor}(\text{value})$, where a floor operation involves discarding the fractional part of the value.

The get function returns the value of the current pixel component sampled from the raster image pixel data 16 at the given bit address. Note that for some components of some image types this can be an implied value.

As a preferred feature to the above, image tiling may optionally be performed by using x and y values in the above equations which are derived from the current X and Y counters 614,616 by a modulus operation with a tile size read from the supplied record.

Many more such fill color generation sub-modules are possible.

3.5 Pixel Compositing Module

The operation of the pixel compositing module 700 will now be described. The primary function of the pixel compositing module is to composite the color and opacity of all those exposed object priorities that make an active contribution to the pixel currently being scanned.

Figure 21:
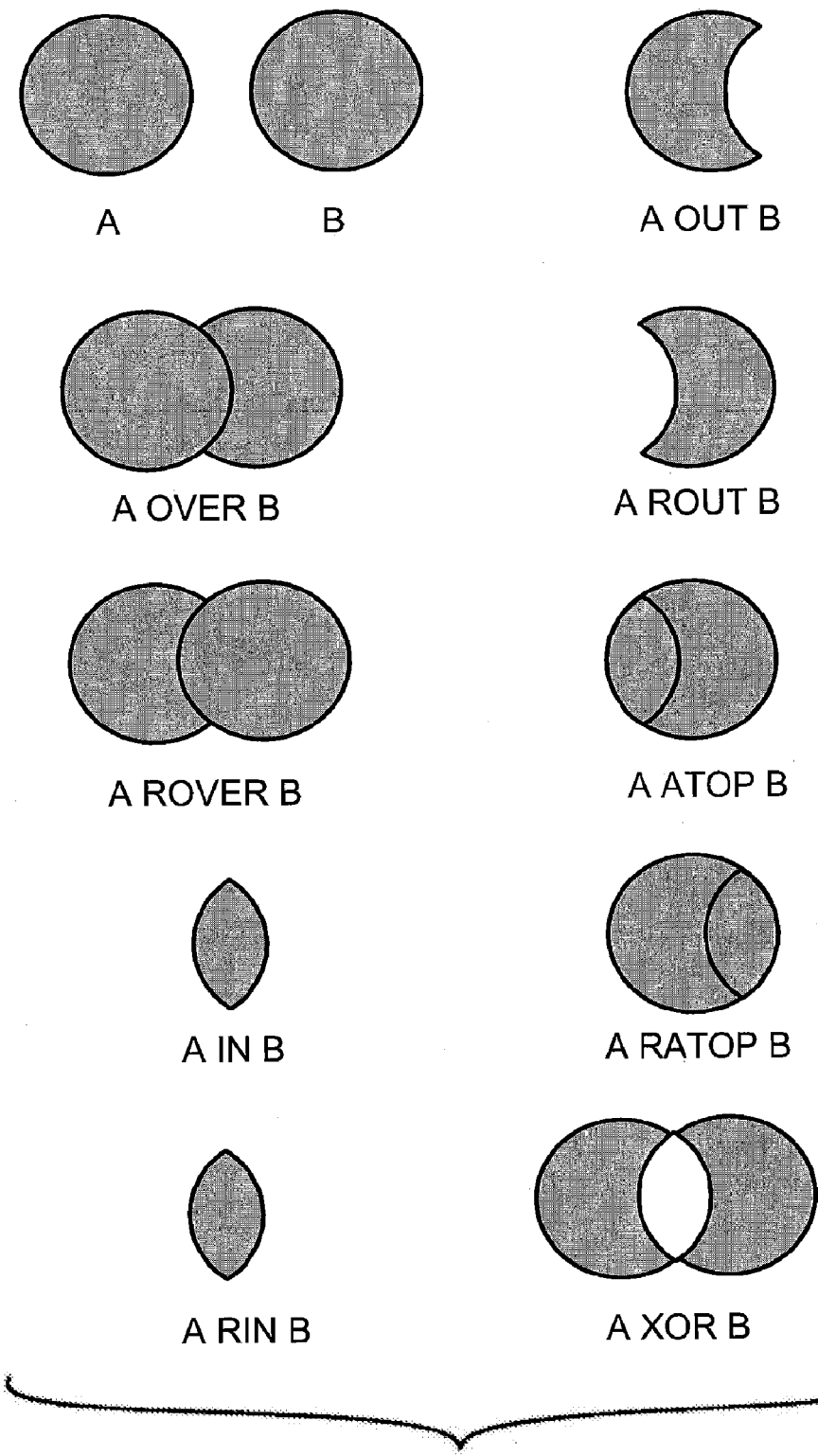
FIG. 21 depicts the result of a number of compositing operations.

Preferably, the pixel compositing module 700 implements a modified form of the compositing approach as described in "Compositing Digital Images", Porter, T: Duff, T; Computer Graphics, Vol 18 No 3 (1984) pp 253-259 ("Porter And Duff"). Examples of Porter and Duff compositing operations are shown in FIG. 21. However, such an approach is deficient in that it only permits handling a source and destination color in the intersection region formed by the composite, and as a consequence is unable to accommodate the influence of transparency outside the intersecting region. In one arrangement this is overcome by effectively padding the objects with completely transparent pixels. Thus the entire area becomes in effect the intersecting region, and reliable Porter and Duff compositing operations can be performed. This padding is achieved at the driver software level where additional transparent object priorities are added to the combined table. These Porter and Duff compositing operations are implemented utilizing appropriate color operations as will be described below in more detail with reference to FIGS. 20A, 20B, and 19.

Preferably, the images to be composited are based on expression trees. Expression trees are often used to describe the compositing operations required to form an image, and typically comprise a plurality of nodes including leaf nodes, unary nodes and binary nodes. A leaf node is the outermost node of an expression tree, has no descendent nodes and represents a primitive constituent of an image. Unary nodes represent an operation which modifies the pixel data coming out of the part of the tree below the unary operator. A binary node typically branches to left and right subtrees; wherein each subtree is itself is an expression tree comprising at least one leaf node. An example of an expression tree is shown in FIG. 17C. The expression tree shown in FIG. 17C comprises four leaf nodes representing three objects A, B, and C, and the page. The expression tree of FIG. 17C also comprises binary nodes representing the Porter and Duff OVER operation. Thus the expression tree represents an image where the object A is composited OVER the object B, the result of which is then composited OVER object C, and the result of which is then composited OVER the page.

Figure 17A:
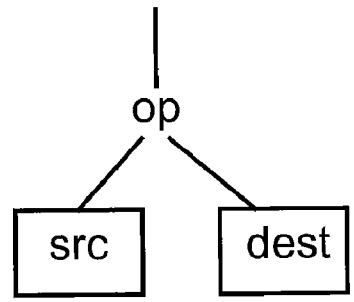
FIGS. 17A and 17B show a simple compositing expression illustrated as an expression tree and a corresponding depiction.
Figure 17B:
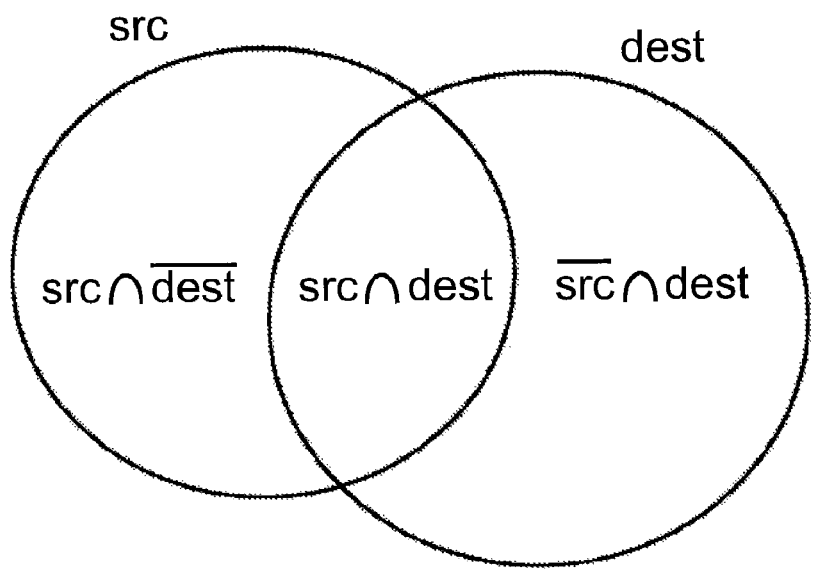
Figure 17C:
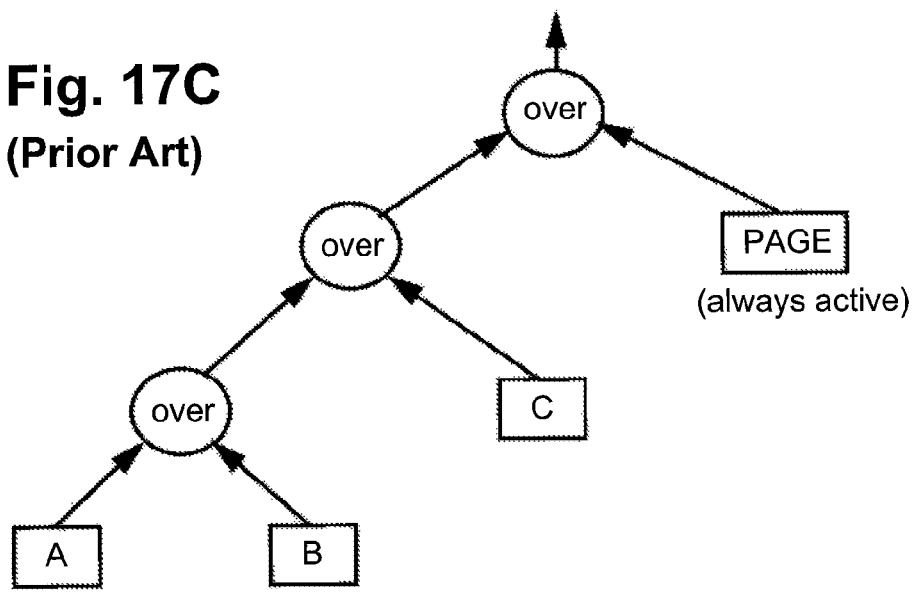
FIG. 17C shows an example of an expression tree.

Turning now to FIGS. 17A and 17B, there is shown a typical binary compositing operation in an expression tree. This binary operator operates on a source object (src) and a destination object (dest), where the source object src resides on the left branch and the destination object (dest) resides on the right branch of the expression tree. The binary operation is typically a Porter and Duff compositing operation. The area src ∩ dest represents the area on the page where the objects src and dest objects intersect (ie both active), the area src∩$\overline{dest}$ where only the src object is active, and the area $\overline{src}$∩dest where only the dest object is active.

The compositing operations of the expression tree are implemented by means of the pixel compositing stack 38, wherein the structure of the expression tree is implemented by means of appropriate stack operations on the pixel compositing stack 38.

Figure 23:
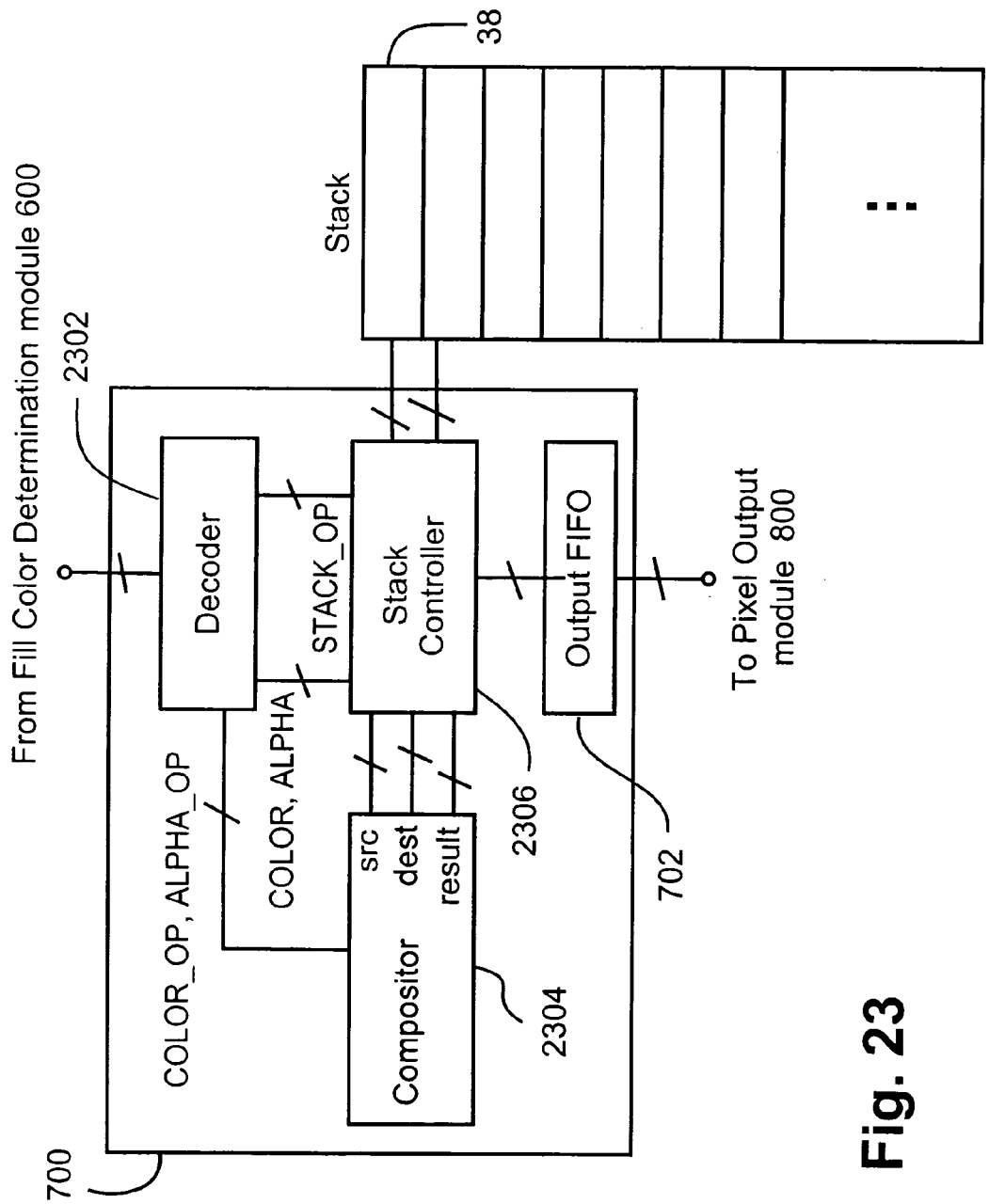
FIG. 23 is a schematic functional representation of one arrangement of the pixel compositing module of FIG. 3.

Turning now to FIG. 23, there is shown the pixel compositing module 700 in more detail. The pixel compositing module 700 receives incoming messages from the fill color determination module 600. These incoming messages include repeat messages, series of color composite messages (see FIG. 22B), end of pixel messages, and end of scanline messages, and are processed in sequence.

The pixel compositing module 700 includes a decoder 2302 for decoding these incoming messages, and a compositor 2303 for compositing the colors and opacities contained in the incoming color composite messages. Also included is a stack controller 2306 for placing the resultant colors and opacities on a stack 38, and an output FIFO 702 for storing the resultant color and opacity.

During the operation of the pixel compositing module 700, the decoder 2302, upon the receipt of a color composite message, extracts the raster operation COLOR_OP and alpha channel operation codes ALPHA_OP and passes them to the compositor 2304. The decoder 2302 also extracts the stack operation STACK_OP and color and opacity values COLOR, ALPHA of the color composite message and passes them to the stack controller 2306. Typically, the pixel composing module 700 combines the color and opacity from the color composite message with a color and opacity popped from the pixel compositing stack 38 according to the raster operation and alpha channel operation from the color composite message. It then pushes the result back onto the pixel compositing stack 38. More generally, the stack controller 2306 forms a source (src) and destination (dest) color and opacity, according to the stack operation specified. If at this time, or during any pop operation from the pixel compositing stack, the pixel compositing stack 38 is found to be empty, an opaque white color value is used without any error indication. These source and destination colors and opacity are then made available to the compositor 2304 which then performs the compositing operation in accordance with the COLOR_OP and ALPHA_OP codes. The resultant (result) color and opacity is then made available to the stack controller 2306, which stores the result on the stack 38 in accordance with the STACK_OP code. These stack operations are described below in more detail below.

During the operation of the pixel compositing module 700, if the decoder 2302 receives an end of pixel message, it then instructs the stack controller 2306 to pop a color and opacity from the pixel compositing stack 38. If the stack 38 is empty an opaque white value is used. The resultant color and opacity is then formed into an pixel output message which is forwarded to the pixel output FIFO 702. If the decoder 2302 receives a repeat message or an end of scanline message, the decoder 2302 by-passes (not shown) the compositor 2304 and stack controller 2306 and forwards the messages to the pixel output FIFO 702 without further processing.

Figure 24A:
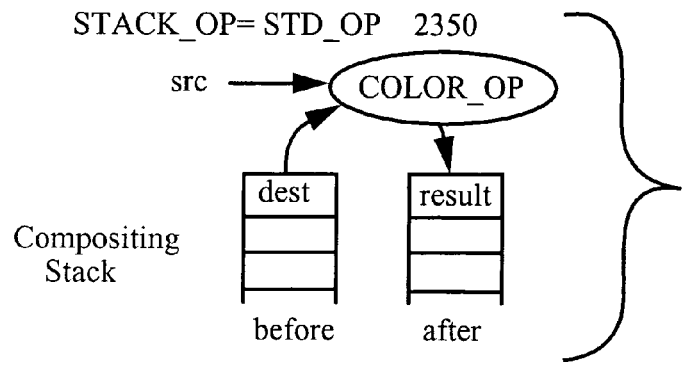
FIGS. 24A-24D show the operation performed on the stack for each of the various stack operation commands in the Pixel Compositing Module 700 of FIG. 3.

FIGS. 24A, B, C, and D show the operation performed on the pixel compositing stack 38 for each of the various stack operation commands STACK_OP in the color composite messages.

FIG. 24A shows the standard operation STD_OP 2350 on the pixel compositing stack 38, where the source color and opacity (src) are obtained from the color composite message, and the destination color and opacity (dest) is popped from the top of the pixel compositing stack 38. The source color and opacity (src) is taken from the value in a current color composite message for the current operation, and destination color and opacity (dest) is popped from the top of the stack 38. The result of the COLOR_OP operation performed by the compositor 2304 is pushed back onto the stack 38.

Figure 24B:
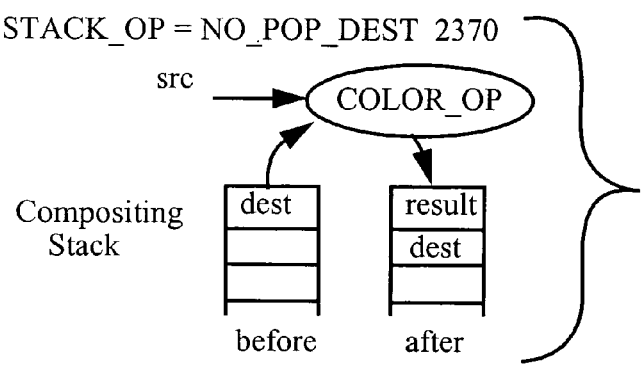

FIG. 24B shows the NO_POP_DEST stack operation 2370 on the pixel compositing stack 38. The source color and opacity (src) is taken from the value in a current composite message for the current operation, and the destination color and opacity (dest) is read from the top of the stack 38. The result of the COLOR_OP operation performed by the compositor 2304 is pushed onto the top of the stack 38.

Figure 24C:
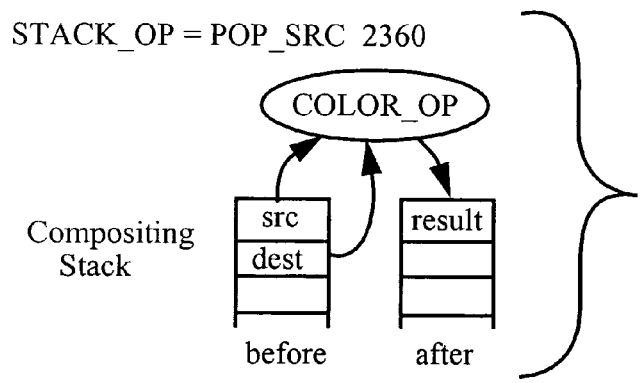

FIG. 24C shows the POP_SRC stack operation, where the source color and opacity are popped from the top of the stack, and the destination color and opacity is popped from the next level down the stack. The result of the COLOR_OP operation performed by the compositor 2304 is pushed onto the top of the stack.

Figure 24D:
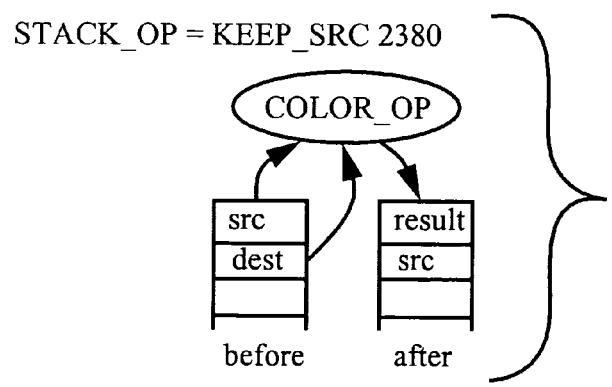
Figure 25A:
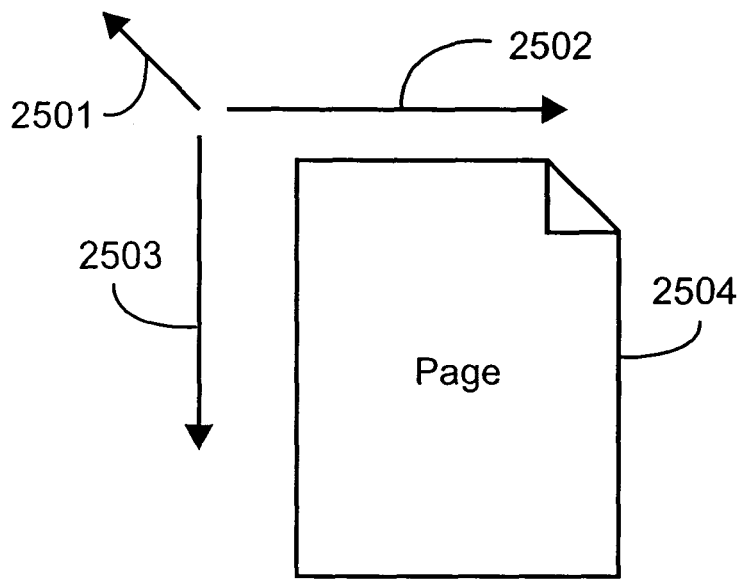
FIGS. 25A and 25B show the co-ordinate systems used for portrait and landscape page orientation.
Figure 25B:
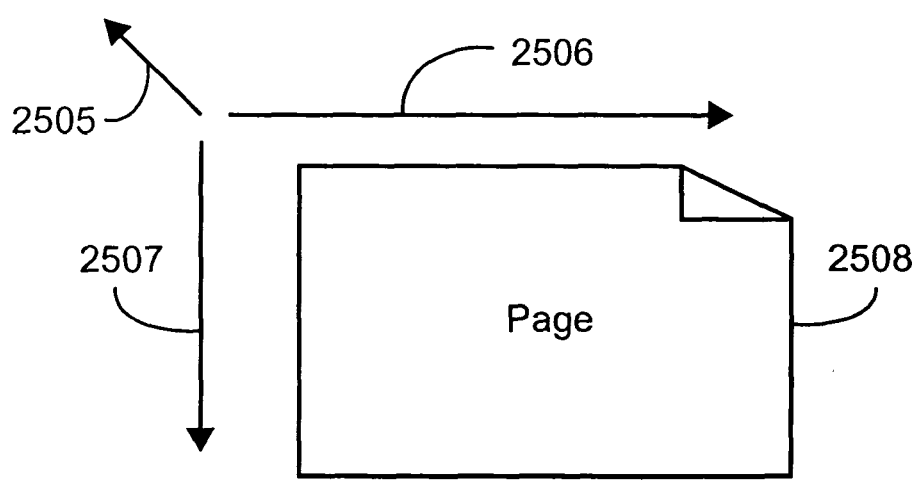

FIG. 24D shows the KEEP_SRC stack operation, where the source color and opacity are popped from the top of the stack, and the destination color and opacity is popped from the next level down the stack. The result of the COLOR_OP operation performed by the compositor 2304 is pushed onto the top of the stack.

Other stack operations can be used.

Figure 7A:
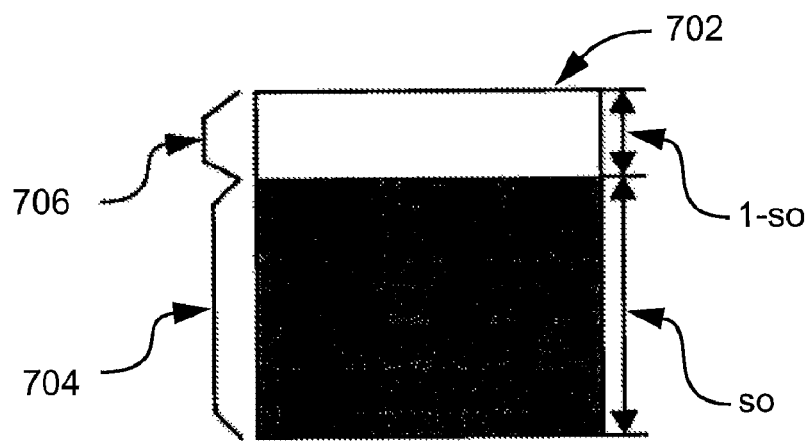
FIGS. 7A to 7C illustrate pixel combinations between source and destination.
Figure 7B:
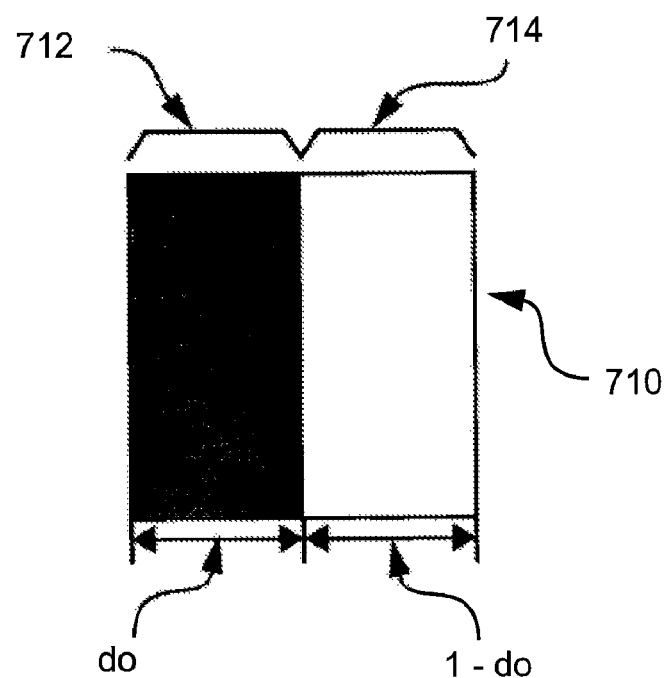
Figure 7C:
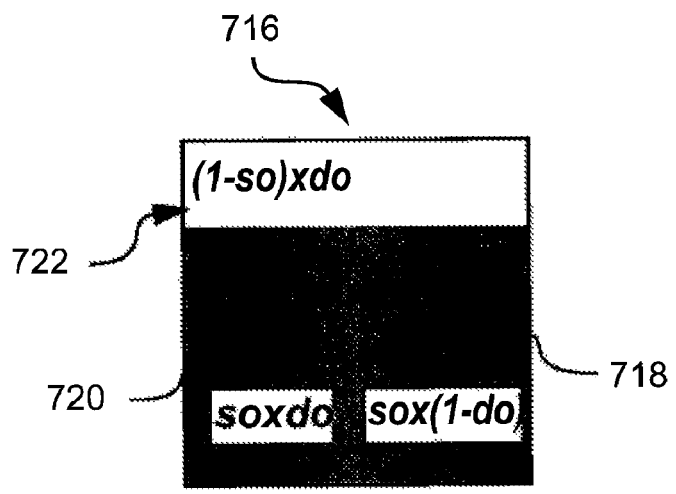

The manner in which the compositor 2304 combines the source (src) color and opacity with the destination (dest) color and opacity will now be described with reference to FIGS. 7A to 7C. For the purposes of this description, color and opacity values are considered to range from 0 to 1, (ie: normalized) although they are typically stored as 8-bit values in the range 0 to 255. For the purposes of compositing together two pixels, each pixel is regarded as being divided into two regions, one region being fully opaque and the other fully transparent, with the opacity value being an indication of the proportion of these two regions. FIG. 7A shows a source pixel 702 which has some three component color value not shown in the Figure and an opacity value, (so). The shaded region of the source pixel 702 represents the fully opaque portion 704 of the pixel 702. Similarly, the non-shaded region in FIG. 7A represents that proportion 706 of the source pixel 702 considered to be fully transparent. FIG. 7B shows a destination pixel 710 with some opacity value, (do). The shaded region of the destination pixel 710 represents the fully opaque portion 712 of the pixel 710. Similarly, the pixel 710 has a fully transparent portion 714. The opaque regions of the source pixel 702 and destination pixel 710 are, for the purposes of the combination, considered to be orthogonal to each other. The overlay 716 of these two pixels is shown in FIG. 7C. Three regions of interest exist, which include a source outside destination 718 which has an area of so*(1−do), a source intersect destination 720 which has an area of so*do, and a destination outside source 722 which has an area of (1−so)*do. The color value of each of these three regions is calculated conceptually independently. The source outside destination region 718 takes its color directly from the source color. The destination outside source region 722 takes its color directly from the destination color. The source intersect destination region 720 takes its color from a combination of the source and destination color.

The process of combining the source and destination color, as distinct from the other operations discussed above is termed a raster operation and is one of a set of functions as specified by the raster operation code from the pixel composite message. Some of the raster operations included in the described arrangement are shown in FIG. 19. Each function is applied to each pair of color components of the source and destination colors to obtain a like component in the resultant color. Many other functions are possible.

The alpha channel operation from the composite pixel message is also considered during the combination of the source and destination color. The alpha channel operation is performed using three flags LAO_USE_D_OUT_S, LAO_USE_S_OUT_D, LAO_USE_S_ROP_D, which respectively identify the regions of interest (1−so)*do, so*(1−do), and so*do in the overlay 716 of the source pixel 702 and the destination pixel 710. For each of the regions, a region opacity value is formed which is zero if the corresponding flag in the alpha channel operation is not set, else it is the area of the region.

The resultant opacity is formed from the sum of the region opacities. Each component of the result color is then formed by the sum of the products of each pair of region color and region opacity, divided by the resultant opacity.

As shown in FIG. 20, the Porter and Duff operations may be formed by suitable ALPHA_OP flag combinations and raster operators COLOR_OP, provided that both operands can be guaranteed to be active together. Because of the way the table is read, if only one of the operands is not active, then the operator will either not be performed, or will be performed with the wrong operand. Thus objects that are to be combined using Porter and Duff operations must be padded out with transparent pixels to an area that covers both objects in the operation. Other transparency operations may be formed in the same way as the Porter and Duff operations, using different binary operators as the COLOR_OP operation.

The resultant color and opacity is passed to the stack controller circuit and pushed onto the pixel compositing stack 38. However, if the stack operation is STACK_KEEP_SRC, the source value is pushed onto the stack before the result of the color composite message is pushed.

When an end of pixel message is encountered, the color and opacity value on top of the stack is formed into a pixel output message, and sent to the pixel output module 800. Repeat pixel messages are passed through the pixel compositing module 700 to the pixel output module 800.

3.6 Pixel Output Module

The operation of the pixel output module 800 will now be described. Incoming messages are read from the pixel output FIFO, which include pixel output messages, repeat messages, and end of scanline messages are processed in sequence.

Upon receipt of a pixel output message the pixel output module 800 stores the pixel and also forwards the pixel to its output. Upon receipt of a repeat message the last stored pixel is forwarded to the output 898 as many times as specified by the count from the repeat message. Upon receipt of an end of scanline message the pixel output module 800 passes the message to its output.

The output 898 may connect as required to any device that utilizes pixel image data. Such devices include output devices such as video display units or printers, or memory storage devices such as hard disk, semiconductor RAM including line, band or framestores, or a computer network. However, as will be apparent from the foregoing, a method and apparatus are described that provide for the rendering of graphic objects with full functionality demanded by sophisticated graphic description languages without a need for intermediate storage of pixel image data during the rendering process.

4.0 Caching A Compositing List

A more optimized rendering path may be obtained if a list of contributing active objects (or compositing list) is cached on an edge by edge basis. If the compositing list does not have to be rebuilt because of edges crossing, starting or terminating, then the cached list may be used for the edges on subsequent scanlines. Retrieving the cached list for an edge as opposed to rebuilding a new compositing list removes many time-consuming steps from the arrangements described in foregoing sections.

An overview of the rendering process described above is shown in FIG. 26B, which illustrates the procedure followed for each edge crossing on a scanline. An example is also shown to schematically depict the process. For each scanline, the active edges determined by the edge processing module 400 are processed one by one and an output is determined for the span of pixels between the current edge and the next edge. In step 2620, the priority determination module 500 determines which priority levels associated with the current edge are activated. The module 500 places the active priority levels into a sorted active level list, i.e. a list of levels that are active due to edge crossings considered thus far when processing the current scanline. The active level list may be implemented as a set of pointers to more detailed level information, such as the information shown in FIG. 18. In the illustrative example there are five active levels, as seen in the schematic depiction 2628 of the active level list. Each of the five differently hatched areas in the depiction 2628 of the active level list represents a level. The depiction 2628 shows the levels in ascending z-order.

Next, in step 2622, the priority generation module 516 determines the topmost opaque level and any transparent levels above the topmost opaque level. Only these levels, which contribute to the final image, are required for further processing. The priority generation module 516 is described in more detail in section 3.3. The determined contributing levels are placed in a list referred to herein as a compositing list. The compositing list may be implemented as a set of pointers to the corresponding level information. In the example, the top two levels are transparent and the third level is opaque. Hence, it is only necessary to place the top three levels in the compositing list, as shown in the schematic depiction 2630 of the compositing list.

In step 2624, the levels in the compositing list are alpha-composited together and the result placed into the output buffer. The compositing is performed by the fill color determination module 600, the pixel compositing module 700 and the pixel output module 800, as described above. In the example the levels in the compositing list 2630 are composited and the result 2632 is placed in the output buffer.

Next, in step 2626, the current edge is updated to its new position in the next scanline. Such updating is performed by the edge update module 410, which is described in section 3.2. As described above, the process of FIG. 26B is repeated for every edge crossing across the scanline and for every scanline of the rendered page. However, the compositing list only needs to be rebuilt when one or more of the following three conditions is met:

1. new edges start and are loaded into the active edge list;
2. edges cross one another; or
3. edges terminate.

Thus, in the ordered list of active edges, the conditions are met if at least one edge is displaced from its position in the ordered list when compared with the list of active edges for the previous scanline.

As described above in Section 3.2, new edges are first added to the new edge list 402, and crossing edges cause edge spills, as processed in the spill list 406. When an edge terminates, the edge update module 410 removes the terminated edge from the main edge list 404.

Figure 27:
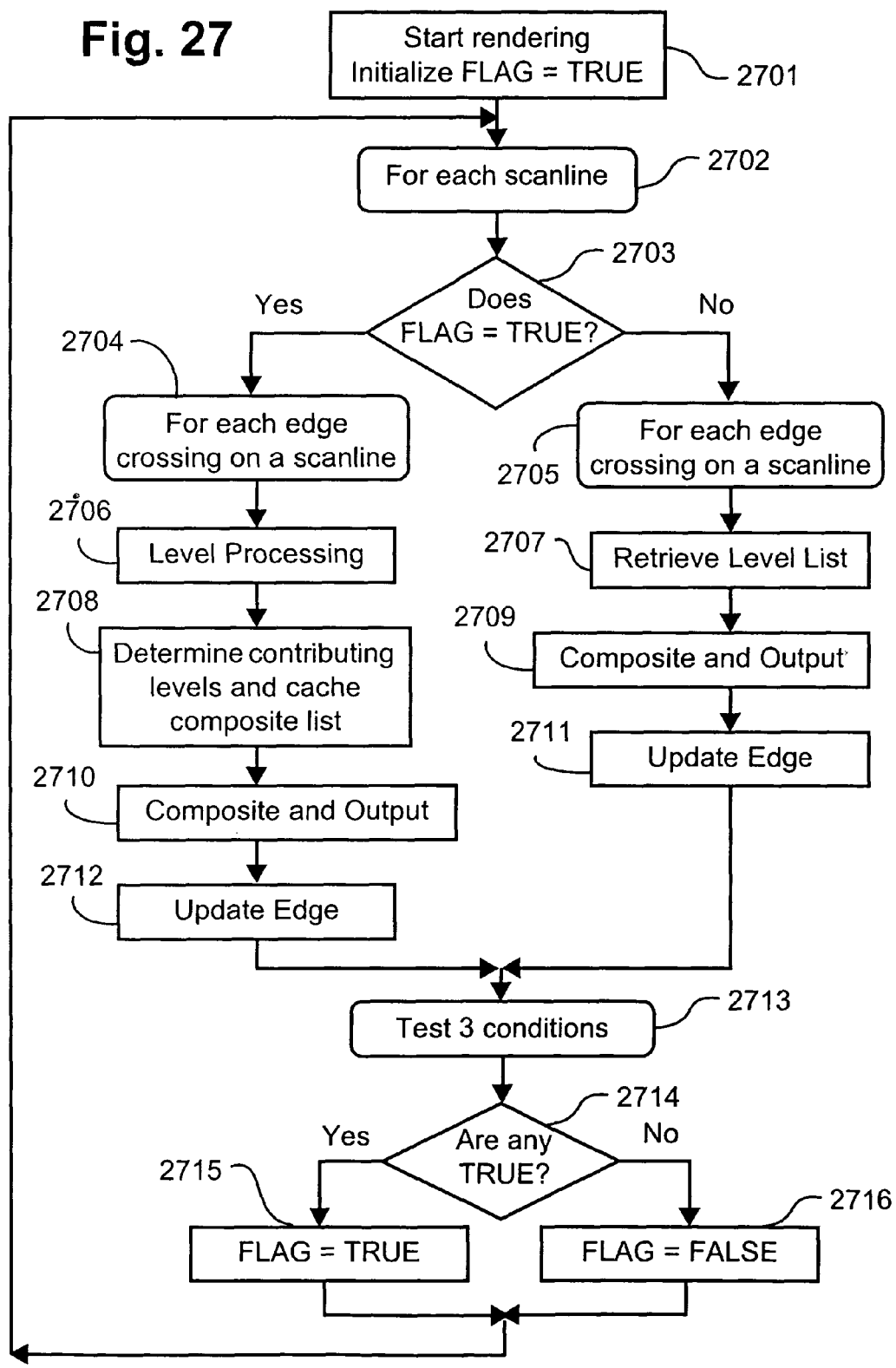
FIG. 27 shows a flow-chart of a method of caching a compositing list in accordance with the present invention.

FIG. 27 shows a flow chart of the preferred method of caching and retrieving a compositing list. The method uses a flag to indicate whether any of the three conditions listed above are met for a current scanline. At startup the flag is set to TRUE in the initialization step 2701. The method then enters a loop 2702 to determine active priority levels for each scanline on the page to be rendered. The steps of determining active levels are performed by the priority determination module 500, which receives edge crossing messages from the edge processing module 400 in scanline and pixel order.

For a current scanline, the module 500 checks in step 2703 whether FLAG is set to TRUE. If so (the YES option of step 2703) then process flow passes to step 2704 to build the compositing lists for the scanline. If, however, FLAG is not set to TRUE (the NO option of step 2703), then suitable compositing lists have already been calculated and process flow passes to step 2705.

In step 2704 the priority determination module 500 enters a further loop to process each active edge for the current scanline. Within the loop, in step 2706 module 506 determines the active priority levels for the current active edge, storing active flags in active flags array 508 as described in Section 3.3. Then, in step 2708, the priority generation module 516 determines the topmost opaque level and any transparent levels above the opaque level. These contributing levels are placed into a compositing list for the current active edge. The compositing list is cached for use with the edge on subsequent scanlines. The compositing list may be stored in the temporary stores 30, and may consist of a list of pointers to the data describing the corresponding contributing levels. The data describing the levels may be stored in the combined table 530 as seen in FIG. 18. The caching is preferably achieved using an additional field within the edge record structure 418 of FIG. 12A. The additional field, which is a pointer to a compositing list, is set to the location of the compositing list within the temporary stores 30.

Next, in step 2710 the contributing levels for the edge are composited together and sent to the output buffer. The compositing and output is performed by the fill color determination module 600, the pixel compositing module 700 and the pixel output module 800, as described above.

Then, in step 2712, the edge update module 410 updates the edge, as described in Section 3.2. Such updating includes checking whether the edge crosses over or displaces another edge on the next scanline, and whether the edge terminates.

Steps 2706, 2708, 2710 and 2712 are performed for each active edge on the current scanline, and thus a cached compositing list is associated with each of the active edges.

If FLAG is not TRUE, then it is not necessary to rebuild the compositing lists for the active edges on the current scanline, since no edges have started, terminated or crossed over one another since the previous scanline. In this case (the NO option of step 2703), the priority determination module 500 enters a loop 2705 to process each active edge of the current scanline. In step 2707, module 500 retrieves the cached compositing list associated with the current active edge.

Then, in step 2709 the retrieved compositing list is used in compositing the contributing levels. Step 2709 performs the same operations as step 2710. Step 2711 then updates the current active edge. Step 2711 performs the same operations as step 2712.

Once all active edges on the current scanline have been processed, either by loop 2704 (i.e. steps 2706, 2708, 2710 and 2712) or by loop 2705 (i.e. steps 2707, 2709 and 2711), process flow passes to step 2713.

In step 2713, the edge processing module 400 tests the three flag-determining conditions for the next scanline, that is, whether any edges have started, terminated or crossed over one another on the next scanline.

Then, in step 2714, the edge processing module 400 checks whether one or more of the flag-determining conditions is satisfied. If any of the conditions is TRUE, then in step 2715 the edge processing module 400 sets FLAG to TRUE, thus ensuring that the compositing lists will be rebuilt for the next scanline. If, however, none of the three conditions is satisfied, then FLAG is set to FALSE in step 2716, indicating that the cached compositing lists are to be used for the next scanline.

After FLAG has been set in either step 2715 or step 2716, process flow returns to step 2702 to process the next scanline.

Figure 26B:
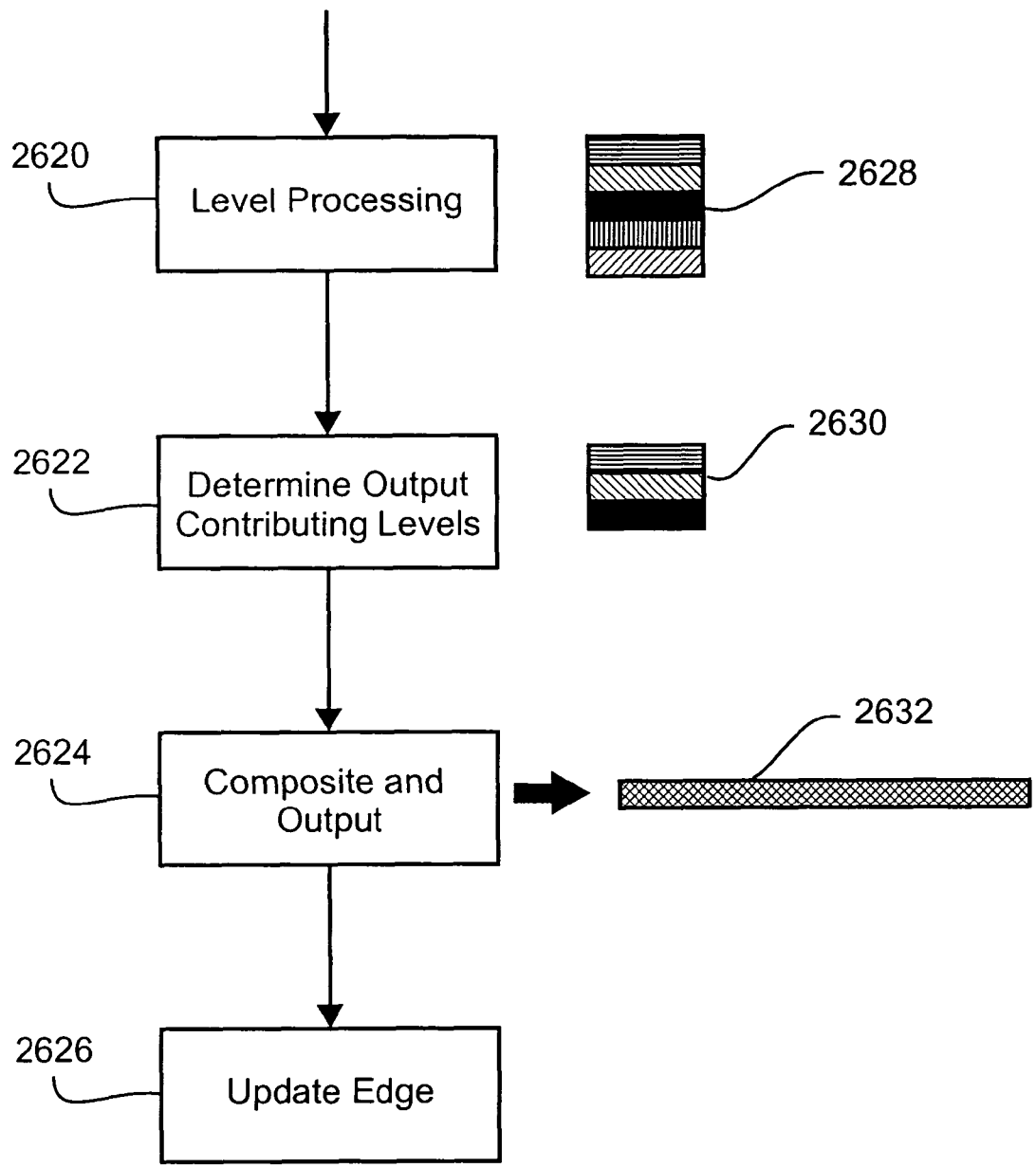
FIG. 26B is a flow chart of a method of priority level processing in the pixel-sequential renderer for each edge crossing on a scanline.
Figure 28:
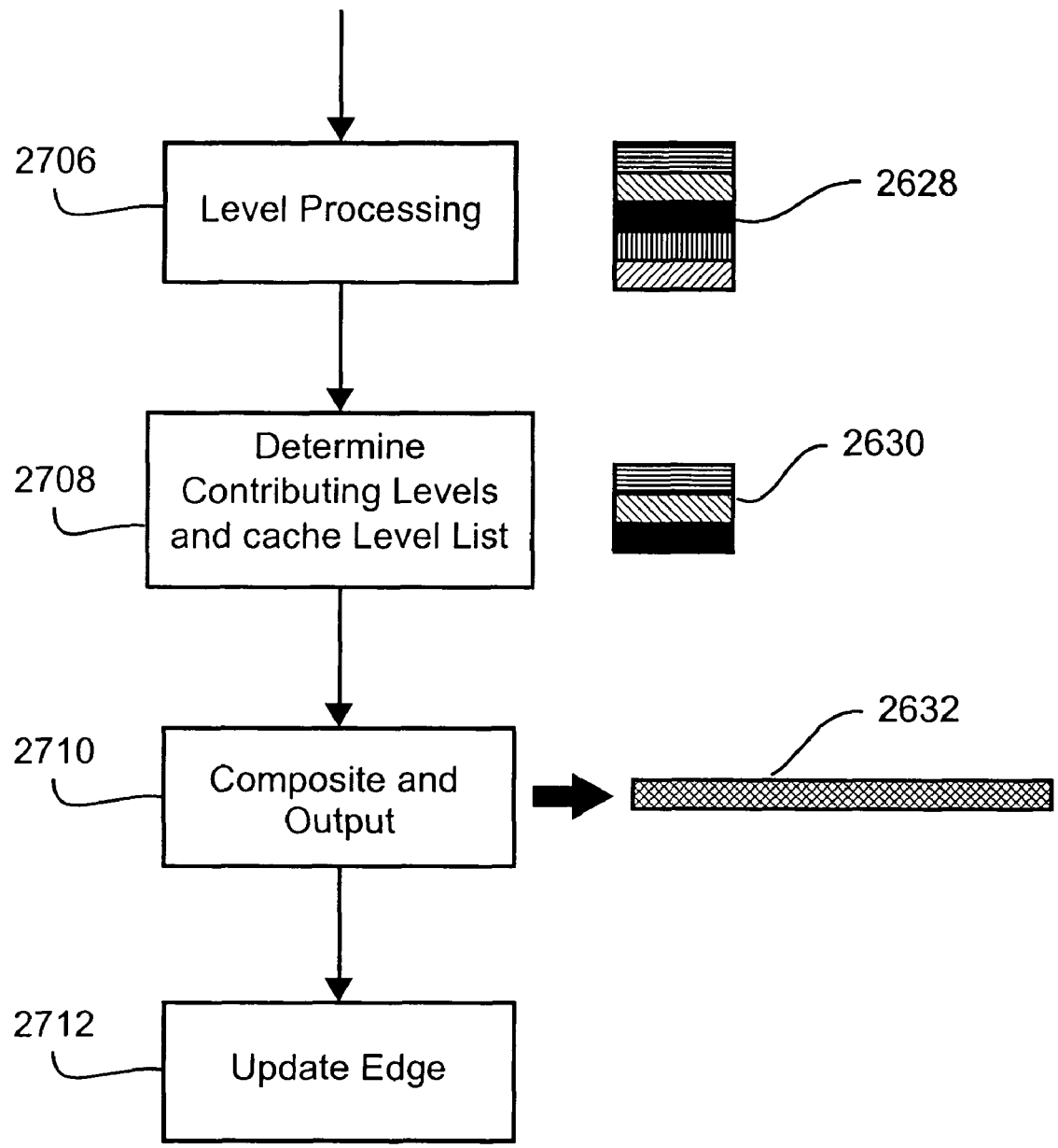
FIG. 28 shows an example of the list caching of FIG. 27.

FIG. 28 illustrates the level processing carried out in steps 2706, 2708, 2710 and 2712, using the same example as shown in FIG. 26B, in which the current active edge is associated with the five active levels of the schematic depiction 2628, of which the top three are contributing levels. It may be seen that the processing is similar to that of steps 2620, 2622, 2624 and 2626 of FIG. 26B. The principal difference is that step 2708 caches the compositing list 2630 for use in following scanlines.

Figure 29:
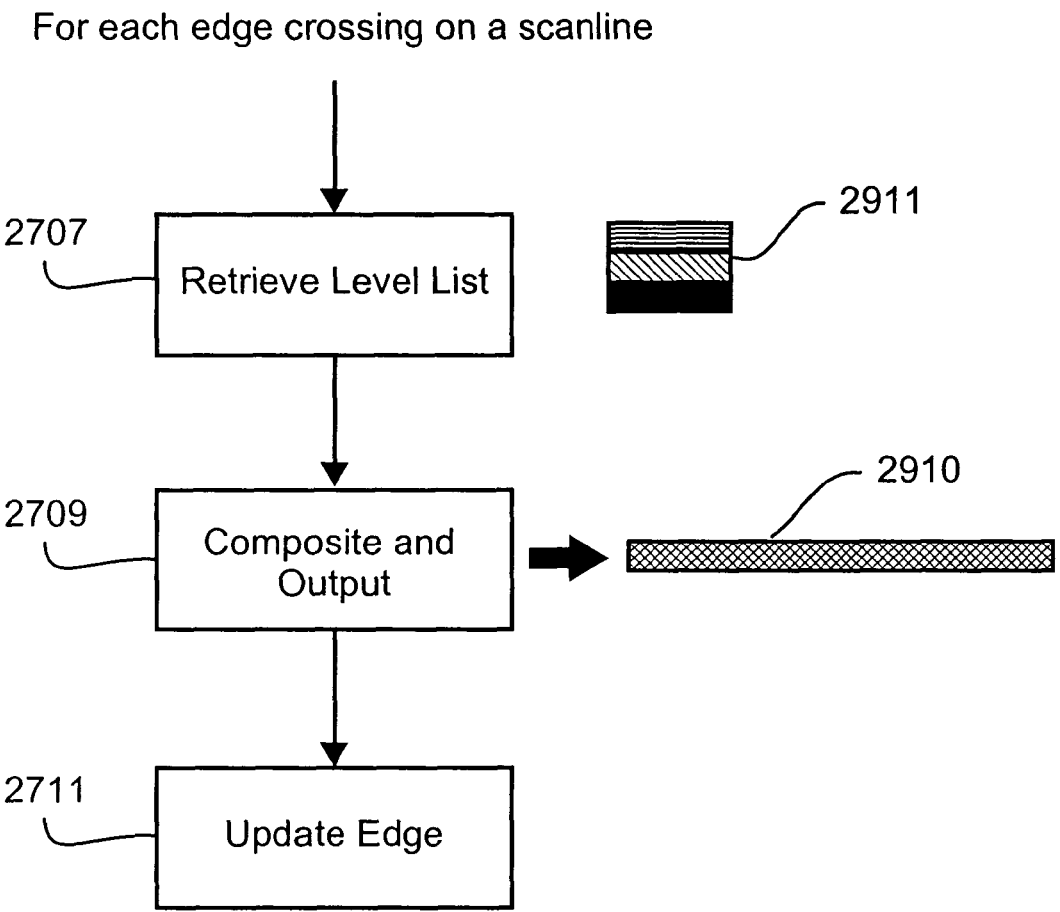
FIG. 29 shows an example of the cached list retrieval in the method of FIG. 27.

FIG. 29 uses the same example to illustrate the operation of steps 2707, 2709 and 2711 for a current edge. Step 2707 retrieves a cached compositing list 2911 that is the same as the compositing list 2630 that was determined and cached in step 2708 for the same edge on an earlier scanline.

Compositing list 2911 is used in step 2709 in compositing the contributing levels and placing the output in buffer 2910. Step 2711 then updates the current active edge.

Figure 30:
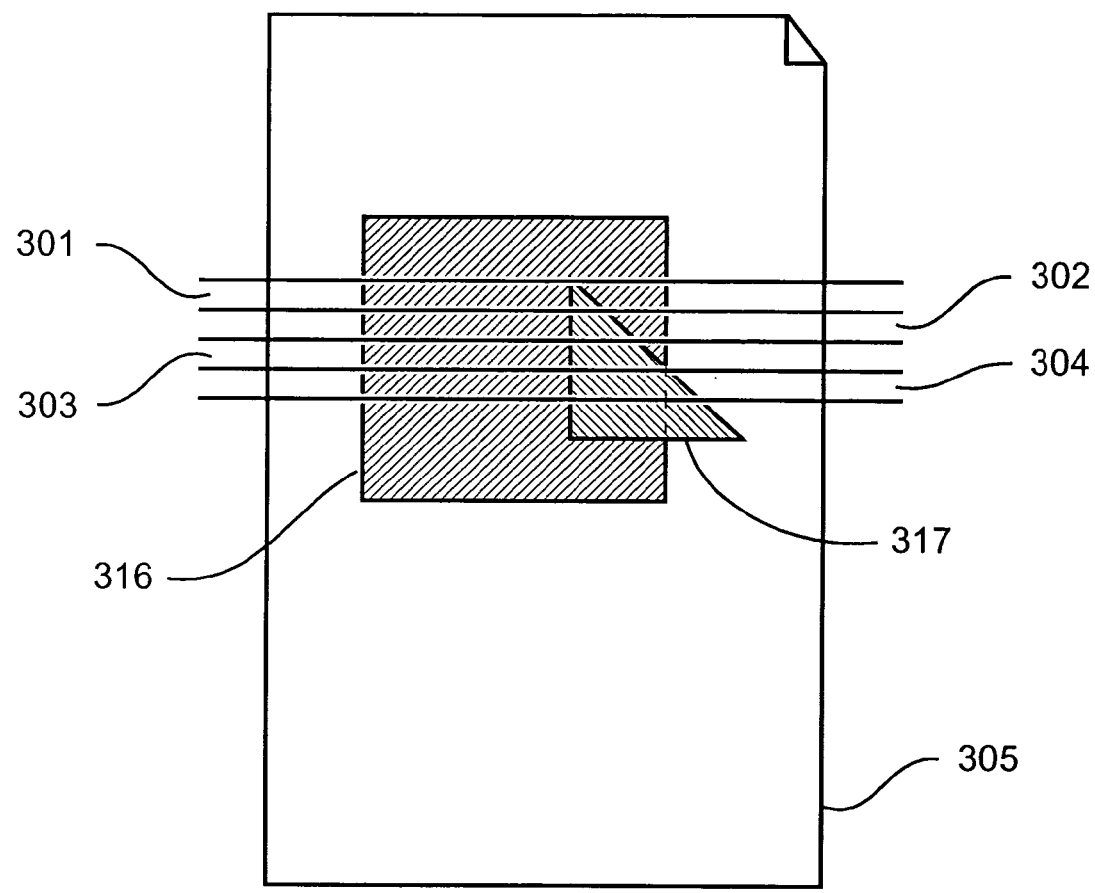
FIG. 30 shows an example of a page to be rendered.
Figure 31:
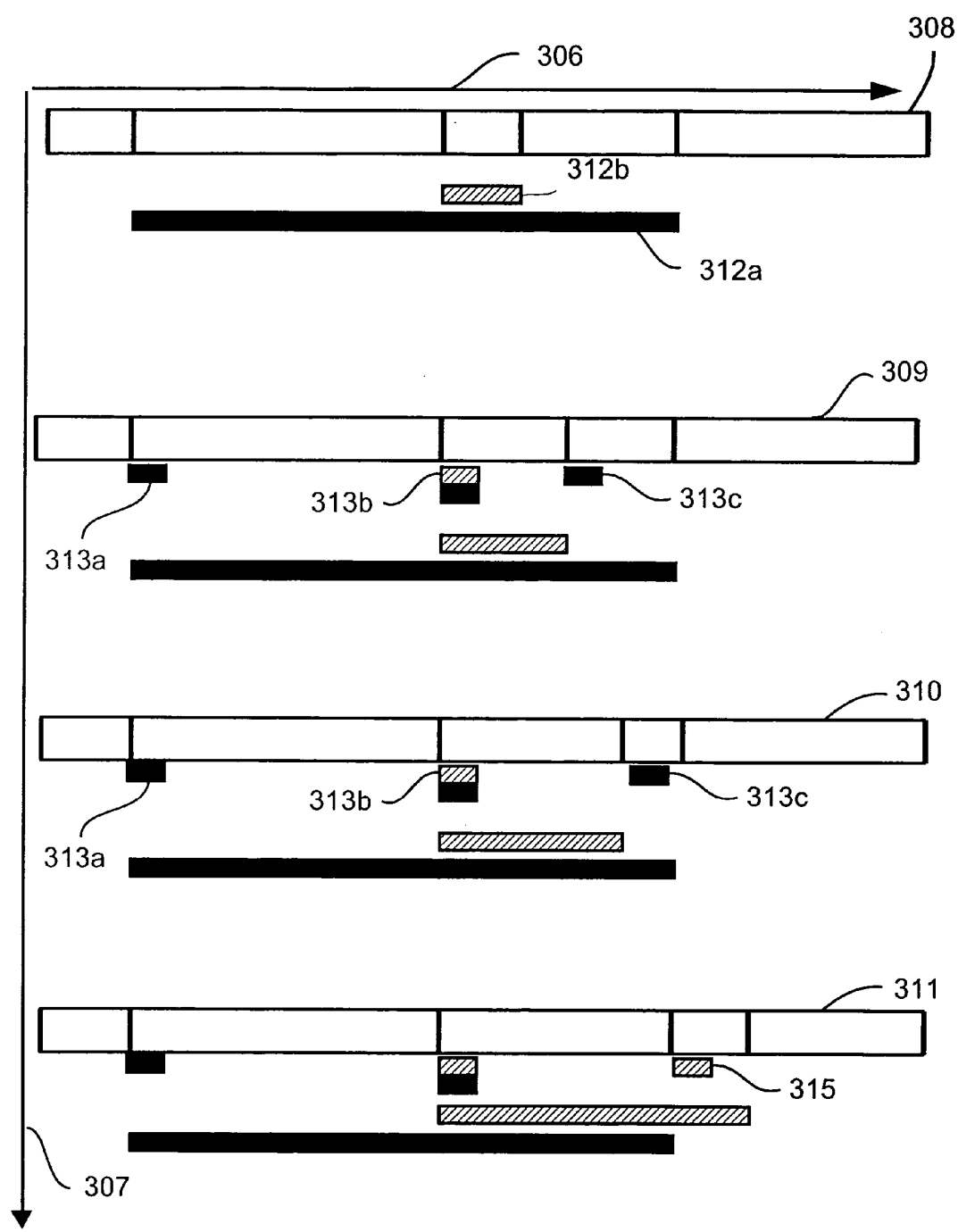
FIG. 31 illustrates the edge lists and compositing lists for scanlines of the example of FIG. 30.

FIG. 30 shows an example of a page to be rendered using the described method. Page 305 contains two objects having different fills; a transparent triangle 317 and a rectangle 316. The triangle 317 overlaps the rectangle 316. Four scanlines 301, 302, 303 and 304 will be considered, as illustrated further in FIG. 31, in which the axis 307 indicates increasing scanline order and axis 306 shows increasing pixel order along a scanline. FIG. 31 is a schematic drawing that combines information about the stored lists and the representation of objects on the page 305.

The edges of the triangle 317 are added to the active edge list for the first time in scanline 301, and consequently FLAG is TRUE for scanline 301. A composite list is therefore calculated and cached for each active edge, in accordance with steps 2706 and 2708.

The active edge list for scanline 301 contains six edges; the left edge of the page 305, the left edge of the rectangle 316, the left edge of the triangle 317, the right edge of the triangle 317, the right edge of the rectangle 316 and the right edge of the page 305. Each of the active edges is described by an edge record such as the edge record of FIG. 12A. Object 308 shows scanline 301 crossed by a total of six edges as indicated in the active edge list for the scanline. The depiction 308 illustrates the relative positions of the edges in the active edge list for scanline 301. From left to right, the edges in depiction 308 are, respectively, the left edge of the page 305, the left edge of the rectangle 316, the left edge of the triangle 317, the right edge of the triangle 317, the right edge of the rectangle 316 and the right edge of the page 305.

The active level list for scanline 301 contains two active levels. A first level is active for all pixels between the two edges of the rectangle 316, and a second level is active for all pixels between the two edges of the triangle 317. The second level has a higher z-order and is transparent. The active levels for scanline 301 are schematically depicted as rectangles 312a and rectangle 312b, respectively. Rectangle 312a is drawn as extending from the left edge of rectangle 316 to the right edge of rectangle 316. Rectangle 312b is drawn as extending from the left edge of triangle 317 to the right edge of triangle 317.

A compositing list is cached for each active edge on scanline 301.

The active edge list for scanline 302 is similar to the active edge list for scanline 301. Object 309 shows the six edge crossings on scanline 302. The position of the right edge of the triangle 317 has shifted to the right between scanline 301 and scanline 302. However, no new edges have been added, no edges have terminated, and no edges have crossed one another. Accordingly, the compositing lists cached during the processing of scanline 301 may be retrieved and used in the compositing step 2709.

The compositing list for the left edge of the rectangle 316 contains a single level, schematically represented as level 313a and depicted adjacent to the associated edge for the compositing list. The compositing list for the left edge of the triangle 317 contains two levels, schematically depicted as levels 313b, since both objects 316, 317 contribute to pixels to the right of this edge. The compositing list associated with the right edge of the triangle 317 contains a single level, schematically depicted as level 313c, since only the rectangle 316 contributes to pixels to the right of this edge. The compositing lists may be implemented as lists of pointers to descriptions of the contributing levels.

The active edge list for scanline 303 is similar to the previous active edge lists for scanlines 301, 302. Object 310 shows the edge crossings on scanline 303. The right edge of the triangle 317 has moved closer to the right edge of the rectangle 316, but has not yet crossed the edge of the rectangle. Thus, FLAG is FALSE, and the cached compositing lists represented as 313a, 313b and 313c are retrieved and used in compositing scanline 303.

In scanline 304, the right edge of the triangle 317 has crossed over the right edge of the rectangle 316. Accordingly, FLAG is set to TRUE for scanline 304 and the compositing lists for the active edges are rebuilt. Object 311 shows the edge crossings on scanline 304. The order of edges in the active edge list for scanline 304 is the left edge of the page 305, the left edge of the rectangle 316, the left edge of the triangle 317, the right edge of the rectangle 316, the right edge of the triangle 317 and the right edge of the page 305. The compositing list associated with the right edge of the rectangle 316 contains a single level, schematically depicted as level 315. The new compositing lists are cached for potential use in subsequent scanlines, and the process continues for all scanlines to be rendered.

The described method is not always faster than methods that do not cache compositing lists. For example, if every scanline of a page to be rendered contains an edge crossing or has new edges starting or terminating, the described method would have to determine the active levels for every edge and there would be no opportunity to make use of cached compositing lists.

A disadvantage with the described arrangement for caching compositing lists arises in environments having limited memory, since more memory may be required for attaching a list to every edge. This uses more memory than the arrangement described in Section 3. Furthermore, problems of large memory usage may arise when there is a deep stack depth. Large stack depths could increase memory usage significantly, but memory usage can be ameliorated by limiting the stack depth to a chosen depth.

If there is a problem with the memory such that the system 1 has no memory available for the compositing lists then, referring to FIG. 27, the FLAG is always set to TRUE, forcing the compositing lists to be determined every scanline. This action conserves memory and reduces the footprint of the software and the dynamic memory usage.

For applications that have sufficient memory, the described arrangement offers a trade-off of speed enhancement against memory usage. When the memory is available, the caching of compositing lists offers enhanced speed.

4.1 Scanning Direction

Figure 32A:
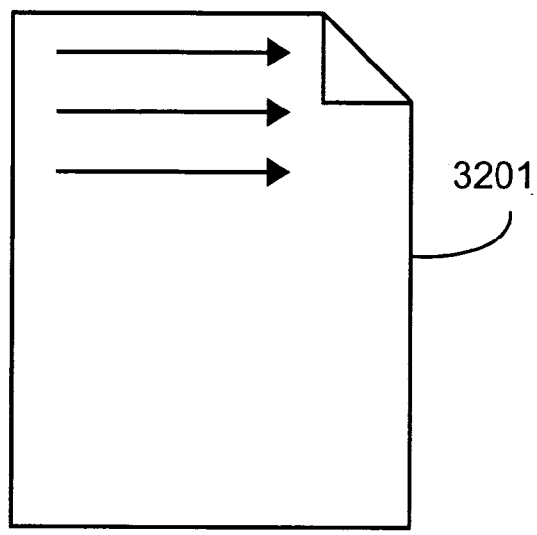
FIGS. 32A and 32B are schematic diagrams of scanline ordering for raster image processors.
Figure 32B:
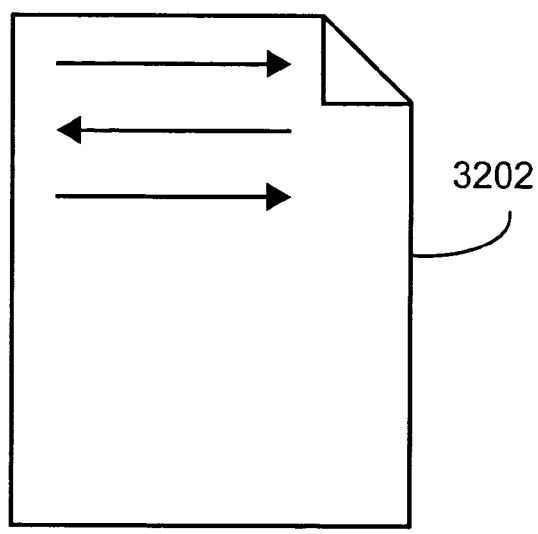

For a raster image processor, the output occurs one scanline at a time. The raster image processor may produce pixels in either a monotonically increasing x or y order or a monotonically decreasing x or y order. Increasing and decreasing orders are both acceptable as long as a line of pixels is produced. FIGS. 32A and 32B show examples of scanning directions that may be used in raster image processors.

FIG. 32A shows a page 3201 for which the rendering is always in a monotonically increasing x order, with scanlines being rendered sequentially. A trivial variation on this would be to render with monotonically decreasing x. Another variation, which could be considered a raster image processor, is shown in FIG. 32B. For page 3202, each alternate scanline has the scanning direction reversed, though the output is still a sequence of scanlines. A raster image processor generates sequential scanlines of pixel data regardless of scanning direction or orientation to the page.

4.2 Variation of Method of Caching Compositing Lists

In the method of FIG. 27, all compositing lists for the active edges of a scanline are rebuilt if the scanline has new edges, terminating edges or edges that have crossed over. However, in some cases it may not be necessary to rebuild the compositing lists for every active edge on the scanline. As described with reference to FIGS. 32A and 32B, scanning in a raster image processor proceeds along a scanline in a monotonically increasing or decreasing x-order. If there is a change to the active edge list, for example edges crossing or a new edge being added, only those edges ahead of the current position in the scanning direction need to be updated.

Where the method of FIG. 27 uses a single FLAG to indicate whether or not all the compositing lists for a scanline need rebuilding, the variation of the method has a flag associated with each edge. The flag for a particular edge indicates whether the compositing list for the edge needs to be rebuilt.

Alternatively, a register may be used to store the last edge position on the scanline that is still valid, i.e. which does not need the compositing list rebuilt.

Figure 33:
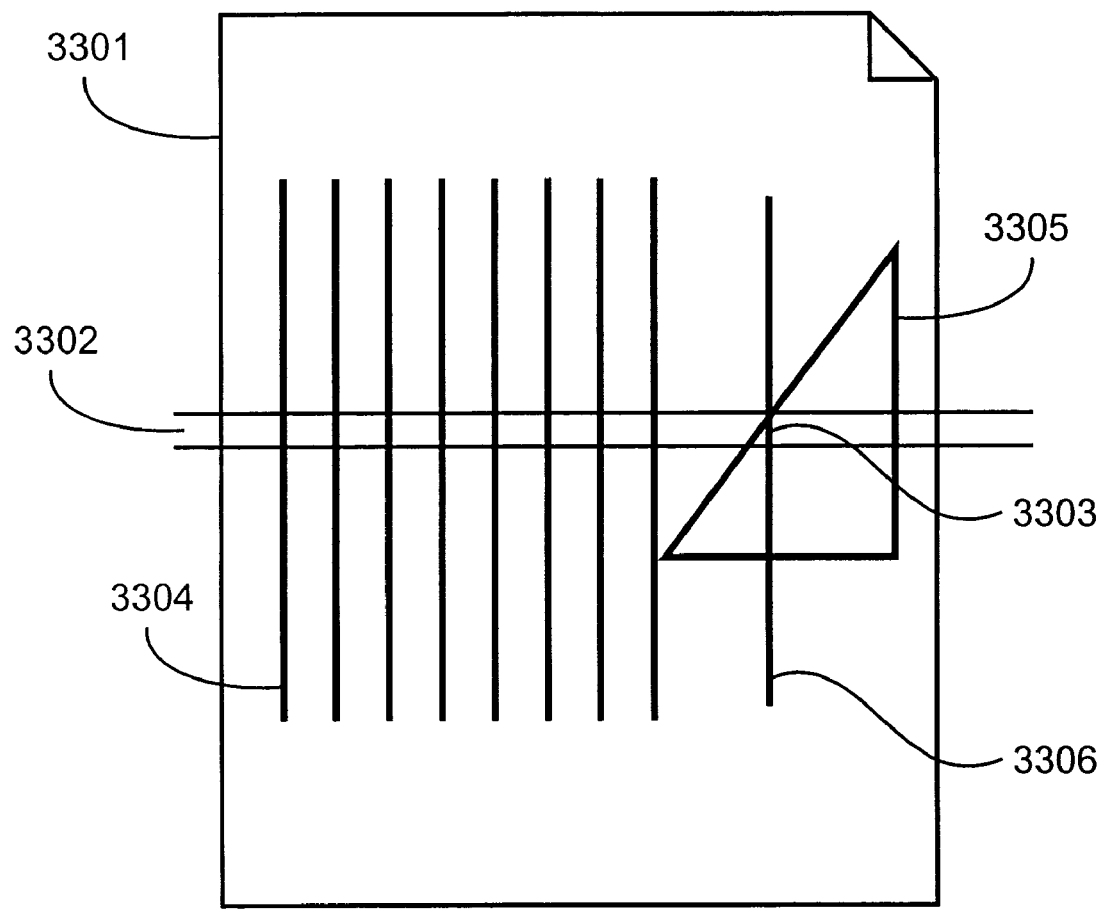
FIG. 33 is an example of a rendered page that may be processed using a variation of the method of FIG. 27.

FIG. 33 shows an example of a page for which the variation of the caching method is beneficial. Page 3301 contains nine parallel vertical lines, such as lines 3304, 3306. Page 3301 also contains a triangle 3305 that intersects line 3306, the right-most vertical line.

Scanline 3302 is the first scanline on which line 3306 intersects the left edge of the triangle 3305. Thus, for the scanlines preceding line 3302, there is no change to the active edge list and compositing is performed using compositing lists built in the first scanline.

In the present variation, all the vertical lines with the exception of line 3306 maintain their position in the active edge list and are composited using compositing lists cached in the first scanline line. Only the edges to the right of the intersection 3303 of the triangle 3305 and the line 3306 require a rebuilding of compositing lists. Thus, compositing lists are rebuilt on scanline 3302 for line 3306, the left edge of triangle 3305 and the right edge of triangle 3305.

5.0 Implementation

The arrangements described herein may be implemented using dedicated hardware or by using a general-purpose computer or other device selectively activated or reconfigured by a computer program stored in the computer. The algorithms and displays presented herein are not inherently related to any particular computer or other apparatus. Various general-purpose machines may be used with programs in accordance with the teachings herein. Alternatively, the construction of more specialized apparatus to perform the required method steps may be appropriate. The structure of a conventional general purpose computer will appear from the description below. Such general-purpose computers may be used in implementing the host processor 2 and pixel-sequential rendering apparatus 20.

Figure 34:
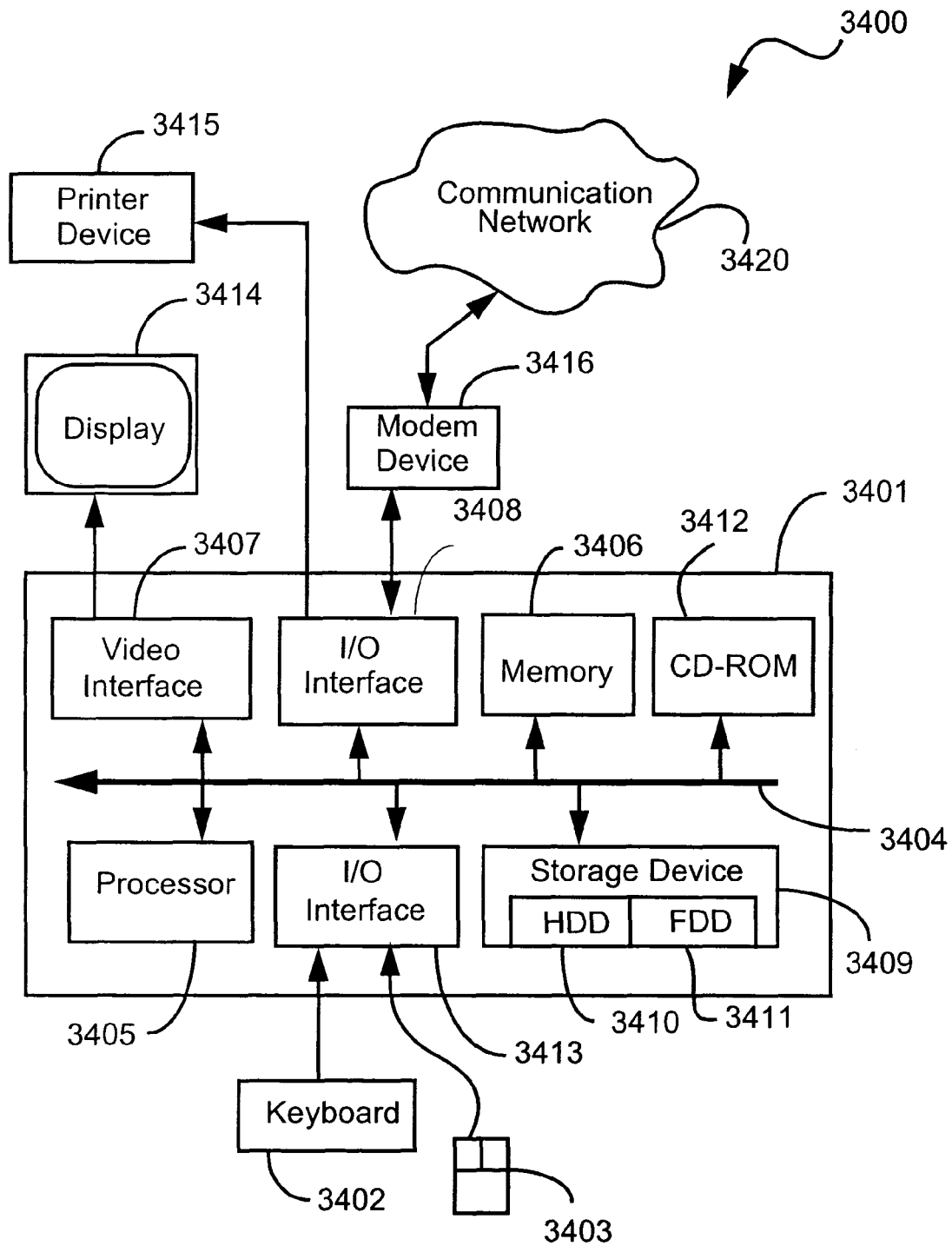
FIG. 34 is a schematic block diagram of a general-purpose computer on which the described arrangements may be executed.

The method of caching compositing lists described herein may be practiced using a conventional general-purpose computer system 3400, such as that shown in FIG. 34 wherein the processes of FIG. 27 may be implemented as software, such as an application program executing within the computer system 3400. In particular, the described method steps are effected by instructions in the software that are carried out by the computer. The software may be stored in a computer readable storage medium, including the storage devices described below. The software may be loaded into the computer from the computer readable storage medium, and then executed by the computer. A computer readable storage medium having such software or computer program recorded on it is a computer program product. The use of the computer program product in the computer preferably effects an advantageous apparatus for rendering pixels one pixel at a time in scanline order.

A transmission medium may be used for communicating the computer program between a source and a destination. The transmission medium may include a hard-wired medium such as exemplified in the Internet system, or wireless medium such as exemplified in the GSM mobile telephone system. The computer program is not intended to be limited to any particular programming language and implementation thereof. It will be appreciated that a variety of programming languages and coding thereof may be used to implement the teachings of the invention as described herein.

The computer system 3400 comprises a computer module 3401, input devices such as a keyboard 3402 and mouse 3403, output devices including a printer 3415 and a display device 3414. A Modulator-Demodulator (Modem) transceiver device 3416 is used by the computer module 3401 for communicating to and from a communications network 3420, for example connectable via a telephone line or other functional medium. The modem 3416 can be used to obtain access to the Internet, and other network systems, such as a Local Area Network (LAN) or a Wide Area Network (WAN).

The computer module 3401 typically includes at least one processor unit 3405, a memory unit 3406, for example formed from semiconductor random access memory (RAM) and read only memory (ROM), input/output (I/O) interfaces including a video interface 3407, and an I/O interface 3413 for the keyboard 3402 and mouse 3403, and an interface 3408 for the modem 3416. A storage device 3409 is provided and typically includes a hard disk drive 3410 and a floppy disk drive 3411. A magnetic tape drive (not illustrated) may also be used. A CD-ROM drive 3412 is typically provided as a non-volatile source of data. The components 3405 to 3413 of the computer module 3401 typically communicate via an interconnected bus 3404 and in a manner which results in a conventional mode of operation of the computer system 3400 known to those in the relevant art. Examples of computers on which the embodiments can be practiced include IBM-PCs and compatibles, Sun Sparcstations or alike computer systems evolved therefrom.

Typically, the application program of the described arrangement is resident on the hard disk drive 3410 and read and controlled in its execution by the processor 3405. Intermediate storage of the program and any data fetched from the network 3420 may be accomplished using the semiconductor memory 3406, possibly in concert with the hard disk drive 3410. In some instances, the application program may be supplied to the user encoded on a CD-ROM or floppy disk and read via the corresponding drive 3412 or 3411, or alternatively may be read by the user from the network 3420 via the modem device 3416. Still further, the software can also be loaded into the computer system 3400 from other computer readable medium including magnetic tape, a ROM or integrated circuit, a magneto-optical disk, a radio or infra-red transmission channel between the computer module 3401 and another device, a computer readable card such as a PCMCIA card, and the Internet and Intranets including email transmissions and information recorded on websites and the like. The foregoing is merely exemplary of relevant computer readable mediums. Other computer readable media may be practiced without departing from the scope and spirit of the invention.

The aforementioned processes implemented by the computer system 1 comprise a particular control flow. There are many other variants of the described processes, which use different control flows without departing from the spirit or scope of the invention. Furthermore one or more of the steps of the described method(s) may be performed in parallel rather than sequentially.

INDUSTRIAL APPLICABILITY

It will be apparent from the above that the arrangements described are applicable to computer graphics and printing industries.

The foregoing describes only some arrangements of the present invention, and modifications and/or changes can be made thereto without departing from the scope and spirit of the invention, the arrangements being illustrative and not restrictive.

The claims defining the invention are as follows:

1. A computer-implemented method of rendering an image one or more pixels at a time in scanline order, the computer comprising a processor configured to implement the method and a memory, wherein the image comprises objects described by one or more object levels, said method comprising the steps of:
   identifying at least one object edge, said at least one object edge intersecting a first scanline;
   building a compositing list for each identified object edge intersecting the first scanline that is associated with at least one active object level, wherein the compositing list comprises object levels that are active on the first scanline at the identified object edge and that contribute to at least one pixel to the image on the first scanline;
   caching one or more of said compositing lists of the first scanline in the memory, wherein each cached compositing list is associated with corresponding object edges of the first scanline;
   checking, for a current object edge intersecting a second scanline subsequent to the first scanline, whether any of the one or more cached compositing lists associated with a corresponding object edge of the first scanline is valid for the current object edge on the second scanline;
   retrieving an associated cached compositing list from the memory if said checking step indicates that any of the one or more cached compositing lists is valid; and
   rendering one or more pixels on the second scanline using the retrieved compositing list.

2. A method according to claim 1, comprising the step of:
   rebuilding a compositing list for the current edge on the second scanline if said checking step indicates that the cached compositing list associated with the current edge is not valid for the current edge on the second scanline.

3. A method according to claim 1, wherein the cached compositing list associated with the current edge is not valid for the current edge on the second scanline if one or more new edges commence on the second scanline.

4. A method according to claim 1, wherein the cached compositing list associated with the current edge is not valid for the current edge on the second scanline if one or more edges in the list of edges for the first scanline terminate before the second scanline.

5. A method according to claim 1, wherein the cached compositing list associated with the current edge is not valid for the current edge on the second scanline if at least one edge in the list of edges for the first scanline crosses over one or more edges on the second scanline.

6. A method according to claim 1, wherein a plurality of said identified edges form an ordered list and said method further comprises the step of:
   setting a flag for a scanline if a position of at least one edge in the list of edges for the second scanline is different from a position of the at least one edge in the list of edges for the first scanline.

7. A method according to claim 6, wherein said checking step comprises checking whether the flag has been set for the second scanline.

8. A method according to claim 7, comprising the step of rebuilding compositing lists for all edges on a current scanline if the flag is set for the current scanline.

9. A method according to claim 1, wherein a plurality of said identified edges form an ordered list and each edge has an associated flag, the method further comprising the step of:
   setting the flag for a first edge and subsequent edges in the list if a position of the first edge in the list of edges for the second scanline is different from a position of the first edge in the list of edges for the first scanline.

10. A method according to claim 9, wherein said checking step comprises checking whether the flag associated with the current edge has been set.

11. A method according to claim 1, wherein a plurality of said identified edges form an ordered list and the method comprises the step of storing an index of a highest edge in the list of edges for a current scanline for which the associated cached compositing list is valid.

12. A method according to claim 1, wherein the levels in the compositing list comprise a highest opaque level and all at least partially transparent levels that are higher in z-order than the highest opaque level.

13. A computer-implemented method of rendering an image one or more pixels at a time in scanline order, the computer comprising a processor configured to implement the method and a memory, wherein the image comprises objects described by one or more levels, said method comprising the steps of:
   identifying at least one object edge, said at least one object edge intersecting a current scanline;
   checking, for at least one object edge intersecting the current scanline, whether any of one or more cached compositing lists associated with the edge on a previous scanline is valid for the edge on the current scanline;
   retrieving an associated cached compositing list from the memory if said checking step indicates that any of the one or more cached compositing lists is valid; and
   rendering one or more pixels on the current scanline using the retrieved compositing list.

14. A method according to claim 13, wherein a plurality of said identified edges form an ordered list and wherein the cached compositing list is valid for the edge on the current scanline unless the position of one or more edges in the list is different from a position of the one or more edges in a list of edges for the previous scanline.

15. A method according to claim 13, wherein the compositing list associated with the edge comprises levels that are activated at the edge and contribute to at least one pixel on a scanline intersected by the edge.

16. An apparatus for rendering an image one or more pixels at a time in scanline order, wherein the image comprises objects described by one or more levels, said apparatus comprising:
   means for identifying at least one object edge, said at least one object edge intersecting a first scanline;
   means for building a compositing list for, each identified object edge intersecting the first scanline that is associated with at least one active object level, wherein the compositing list comprises object levels that are active on the first scanline at the identified object edge and that contribute to at least one pixel to the image on the first scanline;

means for caching one or more of said compositing lists of the first scanline, wherein each cached compositing list is associated with corresponding object edges of the first scanline;

means for checking, for a current object edge intersecting a second scanline subsequent to the first scanline, whether any of the one or more cached compositing lists associated with a corresponding object edge of the first scanline is valid for the current object edge on the second scanline;

means for retrieving an associated cached compositing list if said checking step indicates that any of the one or more cached compositing lists is valid; and means for rendering one or more pixels on the second scanline using the retrieved compositing list.

17. An apparatus for rendering an image one or more pixels at a time in scanline order, wherein the image comprises objects described by one or more object levels, said apparatus comprising:

means for identifying at least one object edge, said at least one object edge intersecting a current scanline;

means for checking, for at least one edge intersecting the current scanline, whether any of one or more cached compositing lists associated with the edge on a previous scanline is valid for the object edge on the current scanline;

means for retrieving an associated cached compositing list if said checking step indicates that any of the one or more cached compositing lists is valid; and means for rendering one or more pixels on the current scanline using the retrieved compositing list.

18. A computer readable storage medium encoded with a computer program, for controlling the operation of a data processing apparatus on which the program code executes to perform a method of rendering an image one or more pixels at a time in scanline order, wherein the image comprises objects described by one or more levels, the method comprising the steps of:

identifying at least one object edge, said at least one object edge intersecting a first scanline;

building a compositing list for said each identified object edge intersecting the first scanline that is associated with at least one active object level, wherein the compositing list comprises object levels that are active on the first scanline at the identified object edge and that contribute to at least one pixel to the image on the first scanline;

caching one or more of said compositing lists of the first scanline, wherein each cached compositing list is associated with corresponding object edges of the first scanline;

checking, for a current object edge intersecting a second scanline subsequent to the first scanline, whether any of the one or more cached compositing lists associated with a corresponding object edge of the first scanline is valid for the current object edge on the second scanline;

retrieving an associated cached compositing list if said checking step indicates that any of the one or more cached compositing lists is valid; and rendering one or more pixels on the second scanline using the retrieved compositing list.

19. A computer readable storage medium encoded with a computer program, for controlling the operation of a data processing apparatus on which the program code executes to perform a method of rendering an image one or more pixels at a time in scanline order, wherein the image comprises objects described by one or more object levels, said method comprising the steps of:

identifying at least one object edge, said at least one object edge intersecting a current scanline;

checking, for at least one object edge intersecting the current scanline, whether any of one or more cached compositing lists associated with the edge on a previous scanline is valid for the object edge on the current scanline;

retrieving an associated cached compositing list if said checking step indicates that any of the one or more cached compositing lists is valid; and rendering one or more pixels on the current scanline using the retrieved compositing list.

20. A system for rendering an image one or more pixels at a time in scanline order, wherein the image comprises objects described by one or more levels, said system comprising:

an information store for storing information;

a processing module in communication with said information store, wherein said processing module:

identifies at least one object edge, said at least one object edge intersecting a first scanline;

stores the list of edges in said information store;

builds a compositing list for said each identified object edge intersecting the first scanline that is associated with at least one active object level, wherein the compositing list comprises object levels that are active on the first scanline at the identified object edge and that contribute to at least one pixel to the image on the first scanline;

caches one or more of the compositing lists in said information store, wherein each cached compositing list is associated with corresponding object edges of the first scanline;

checks, for a current object edge intersecting a second scanline subsequent to the first scanline, whether any of the one or more cached compositing lists associated with a corresponding object edge of the first scanline is valid for the current object edge on the second scanline;

retrieves associated cached compositing list from said information store if said checking indicates that any of the one or more cached compositing lists is valid; and renders one or more pixels on the second scanline using the retrieved compositing list.

21. A system for rendering an image one or more pixels at a time in scanline order, wherein the image comprises objects described by one or more levels, said system comprising:

an information store for storing information;

a processing module in communication with said information store, wherein said processing module:

identifies at least one object edge, said at least one object edge intersecting a current scanline;

stores the list of edges in said information store;

checks, for at least one object edge intersecting the current scanline, whether any of one or more cached compositing lists associated with the edge on a previous scanline is valid for the object edge on the current scanline;

retrieves associated cached compositing list if said checking step indicates that any of the one or more cached compositing lists is valid; and renders one or more pixels on the current scanline using the retrieved compositing list.

* * * * *